US009280390B2

(12) United States Patent
Sirota et al.

(10) Patent No.: US 9,280,390 B2
(45) Date of Patent: *Mar. 8, 2016

(54) DYNAMIC SCALING OF A CLUSTER OF COMPUTING NODES

(71) Applicant: Amazon Technologies, Inc., Reno, NV (US)

(72) Inventors: Peter Sirota, Seattle, WA (US); Richard J. Cole, Seattle, WA (US); Vaibhav Aggarwal, Seattle, WA (US); Andrew J. Hitchcock, Seattle, WA (US); Jai Vasanth, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,137

(22) Filed: Jan. 15, 2015

(65) Prior Publication Data

US 2015/0135185 A1    May 14, 2015

Related U.S. Application Data

(63) Continuation of application No. 14/231,435, filed on Mar. 31, 2014, now Pat. No. 8,966,030, which is a continuation of application No. 12/825,097, filed on Jun. 28, 2010, now Pat. No. 8,719,415.

(51) Int. Cl.
*G06F 15/177* (2006.01)
*H04L 12/28* (2006.01)
*G06F 9/48* (2006.01)
(Continued)

(52) U.S. Cl.
CPC ............ *G06F 9/4881* (2013.01); *G06F 9/5011* (2013.01); *G06F 9/5061* (2013.01); *H04L 67/10* (2013.01); *G06F 2209/5011* (2013.01)

(58) Field of Classification Search
USPC ........................................................ 709/221
See application file for complete search history.

(56) References Cited

U.S. PATENT DOCUMENTS 7,716,708 B2    5/2010  Nishimura et al.
2002/0053024 A1    5/2002  Hashimoto et al.
(Continued)

OTHER PUBLICATIONS

"AmazonEC2—Hadoop Wiki," retrieved on Dec. 12, 2008, from http://wiki.apache.org/hadoop/AmazonEC2?action=print, 10 pages.
(Continued)

*Primary Examiner* — David Lazaro
*Assistant Examiner* — Mahran Abu Roumi
(74) *Attorney, Agent, or Firm* — Seed IP Law Group PLLC

(57) ABSTRACT

Techniques are described for managing distributed execution of programs, including by dynamically scaling a cluster of multiple computing nodes performing ongoing distributed execution of a program, such as to increase and/or decrease computing node quantity. An architecture may be used that has core nodes that each participate in a distributed storage system for the distributed program execution, and that has one or more other auxiliary nodes that do not participate in the distributed storage system. Furthermore, as part of performing the dynamic scaling of a cluster, computing nodes that are only temporarily available may be selected and used, such as computing nodes that might be removed from the cluster during the ongoing program execution to be put to other uses and that may also be available for a different fee (e.g., a lower fee) than other computing nodes that are available throughout the ongoing use of the cluster.

19 Claims, 15 Drawing Sheets

(51) Int. Cl.
*G06F 9/50* (2006.01)
*H04L 29/08* (2006.01)

(56) References Cited

U.S. PATENT DOCUMENTS

| | | | | |
|---|---|---|---|---|
| 2006/0268843 | A1* | 11/2006 | Spitzer | H04Q 3/0029 370/352 |
| 2007/0180490 | A1 | 8/2007 | Renzi et al. | |
| 2009/0276658 | A1* | 11/2009 | Lind | G06F 9/466 714/4.11 |
| 2010/0153955 | A1 | 6/2010 | Sirota et al. | |
| 2011/0289344 | A1* | 11/2011 | Bae | G06F 11/181 714/4.2 |

OTHER PUBLICATIONS

"An Overview of the Condor System," retrieved on Mar. 26, 2009, from http://www.cs.wisc.edu/condor/overview/, 4 pages.

"Condor Project Homepage," retrieved on Mar. 26, 2009, from http:www.cs.wisc.edu/condor/, 3 pages.

"Hadoop," retrieved on Dec. 12, 2008, from http://en.wikipedia.org/wiki/Hadoop, 5 pages.

"Hive—Hadoop Wiki," retrieved on Mar. 26, 2009, from http://wiki.apache.org/hadoop/Hive?action=print, 2 pages.

"MapReduce," retrieved on Dec. 12, 2008, from http://en.wikipedia.org/wiki/Mapreduce, 6 pages.

"Project Pig," retrieved on Mar. 26, 2009, from http://research.yahoo.com/node/90, 1 page.

"RAID," retrieved on Dec. 12, 2008, from http://en.wikipedia.org/wiki/RAID, 14 pages.

"Storage Area Network," retrieved on Dec. 12, 2008, from http://en.wikipedia.org/wiki/Storage_area_network, 5 pages.

"Welcome to Hive!" retrieved on Mar. 26, 2009, from http://hadoop.apache.org/hive/, 1 page.

"What is Condor?" retrieved on Mar. 26, 2009, from http://www.cs.wisc.edu/condor/description.html, 2 pages.

Olston et al., "Pig Latin: A Not-So-Foreign Language for Data Processing," SIGMOD, Jun. 9-12, 2008, Vancouver, BC, Canada, 12 pages.

Varia, J., "Building GrepTheWeb in the Cloud, Part 1: Cloud Architectures," Jul. 16, 2008, retrieved Dec. 12, 2008, from http://developer.amazonwebservices.com/connect/entry!default.jspa?categoryID=152&ex . . . , 8 pages.

Varia, J., "Building GrepTheWeb in the Cloud, Part 2: Best Practices," Jul. 15, 2008, retrieved Dec. 12, 2008, from http://developer.amazonwebservices.com/connect/entry!default.jspa?categoryID=152&ex . . . , 3 pages.

White, T., "Running Hadoop MapReduce on Amazon EC2 and Amazon S3," Jul. 18, 2007, retrieved Dec. 12, 2008, from http://developer.amazonwebservices.com/connect/entry.jspa?externalID=873, 7 pages.

* cited by examiner

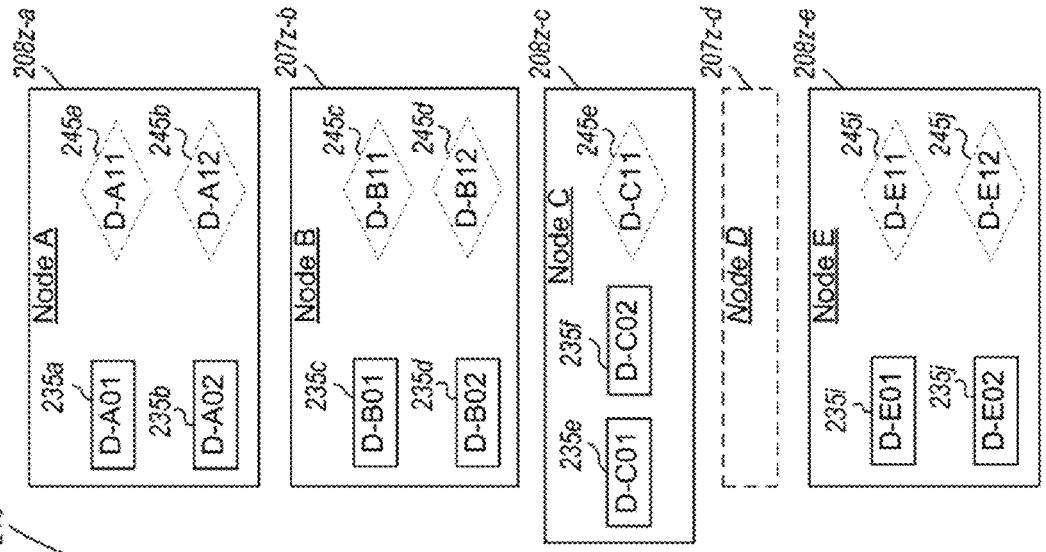

Fig. 2D

Example Distributed Execution Monitoring Information — 295

Program Z Status Information at Time 2 — 290

| Node | Job | Status (% complete) | Node Disk I/O (MB/sec) & ID | Node Disk I/O % | Network I/O (Gb/sec) & ID | Network I/O % (ID) |
|---|---|---|---|---|---|---|
| A | J-A | 40% | 70 / J | 70% | 2.0 / R | 30% (R) |
| B | J-B | 35% | 20 / K | 20% | 1.0 / R | - |
| C | J-C | 30% | 08 / L | 80% | 1.0 / S | 18% (S) |
| D | J-D | 25% | 12 / M | 12% | 0.3 / T | 80% (T) |
| E | J-E | 55% | 10 / N (NSh) | 67% | 0.5 / T | - |
| F | J-F | 20% | 1.5 / L | 15% | 0.8 / S | - |

290a 290b 290c 290d 290e 290f 290g 290h

Program Z Total: 34% (Avg.)    135    39% (Sh)    4.6 / (R,S,T)    43% (Avg.)
Program Y Total: 82% (Avg.)    24    17% (Sh)    8.6 / (R,U,V)    72% (Avg.)
Program X Total: 03% (Avg.)    06    05% (Sh)    9.2 / (V,W,X)    87% (Avg.)

...

— 291

Network Status Information at Time 2 — 292

| | I/O Capacity — 292a | I/O Usage — 292b | I/O % — 292c |
|---|---|---|---|
| Network R Total: | 10 Gb/sec | 8.7 Gb/sec | 87% |
| Network S Total: | 10 Gb/sec | 2.4 Gb/sec | 24% |
| Network T Total: | 1 Gb/sec | 0.9 Gb/sec | 90% |

...

Disk Status Information at Time 2 — 293

...

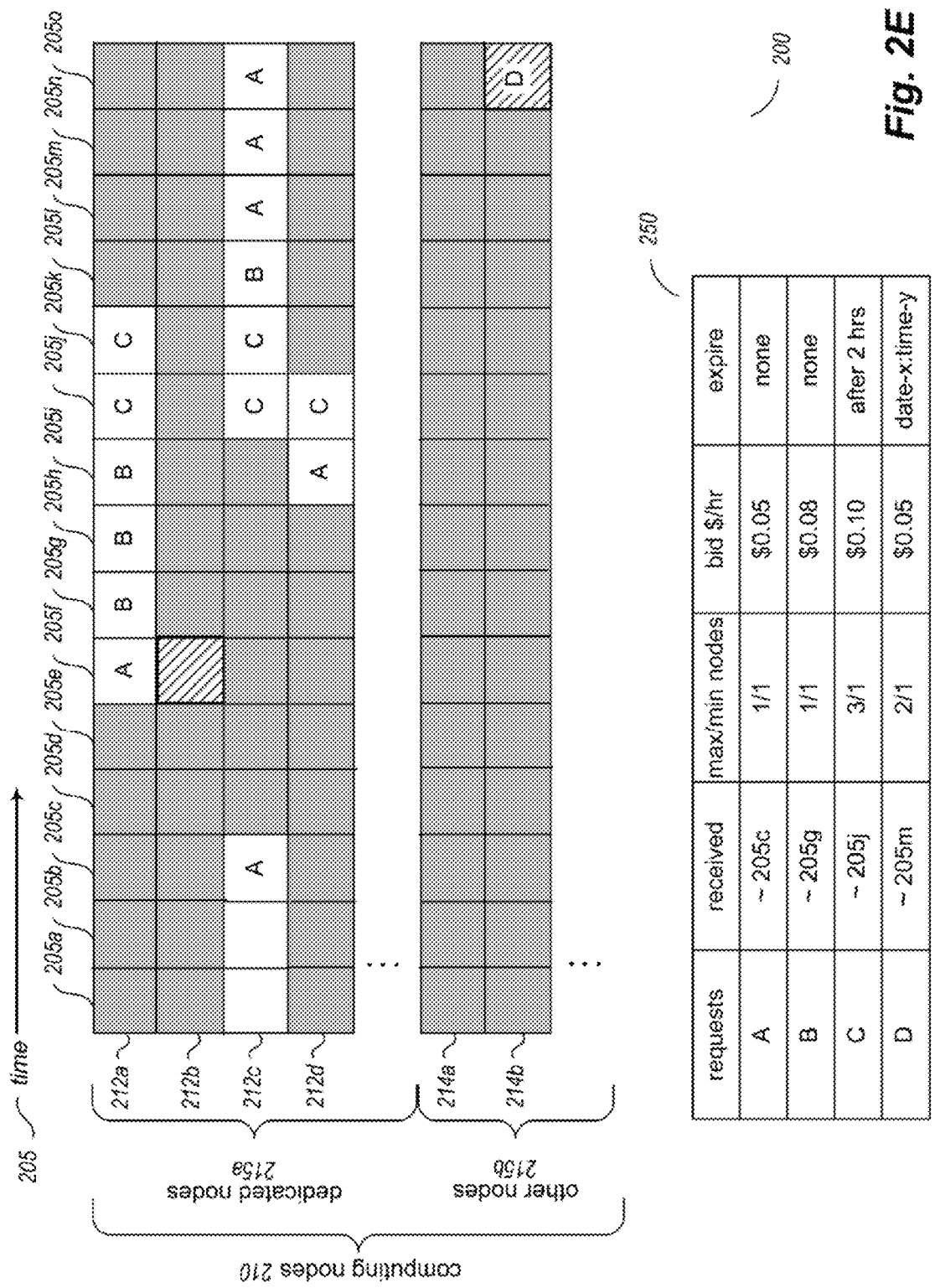

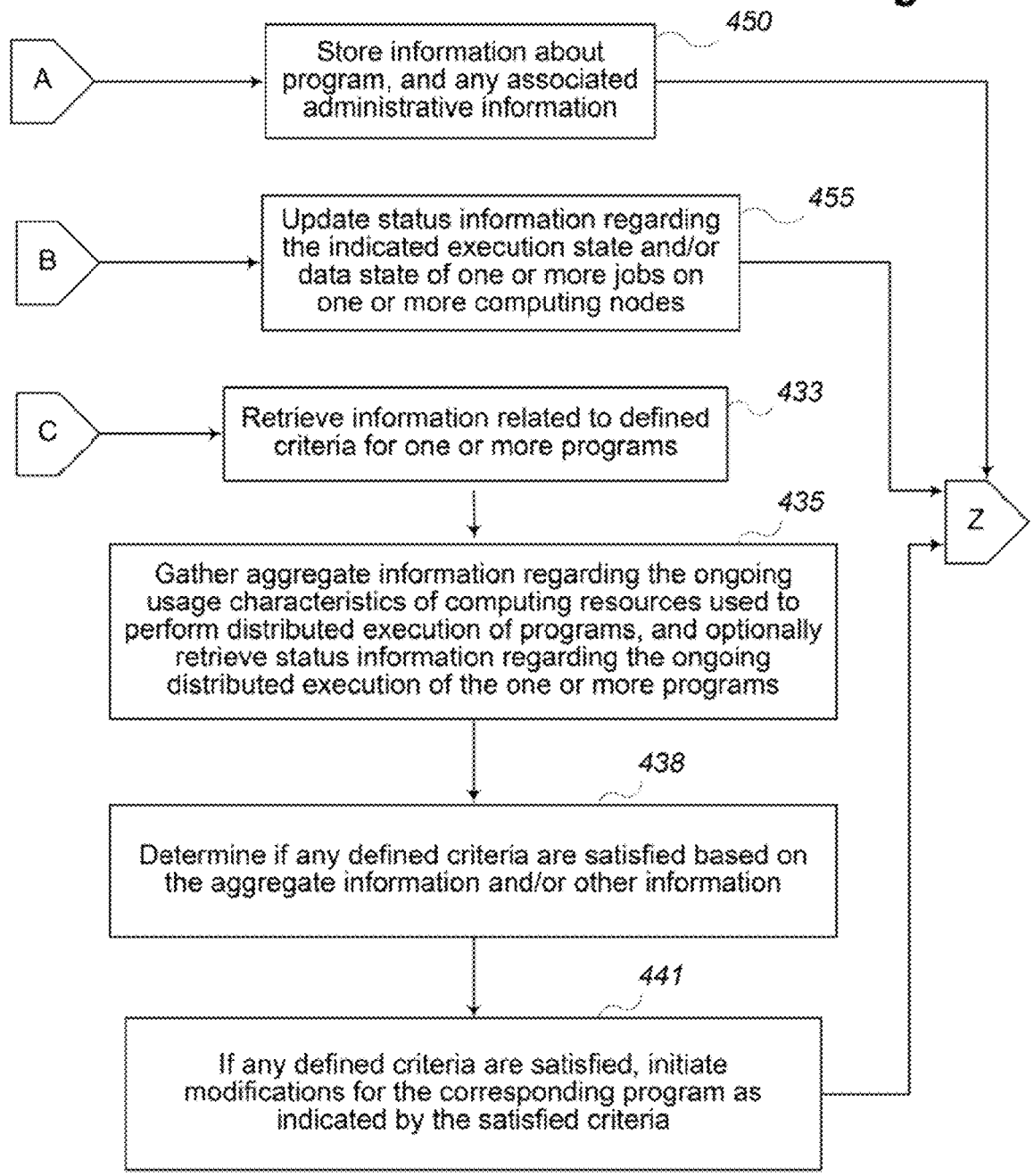

US 9,280,390 B2

DYNAMIC SCALING OF A CLUSTER OF COMPUTING NODES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or shared intermediate networks). Such groups of interconnected computing systems are increasingly useful for various reasons, including to support increasingly large software programs and input data sets that may be distributed across multiple computing systems.

Various approaches have been taken to providing groups of interconnected computing systems. For example, data centers housing significant numbers of interconnected co-located computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 2A-2E illustrate examples of managing the monitoring and modifying of distributed program execution on multiple computing nodes.

FIGS. 4A-4C illustrate a flow diagram of an example embodiment of a Distributed Program Execution Service System Manager routine.

DETAILED DESCRIPTION

Figure 1A:
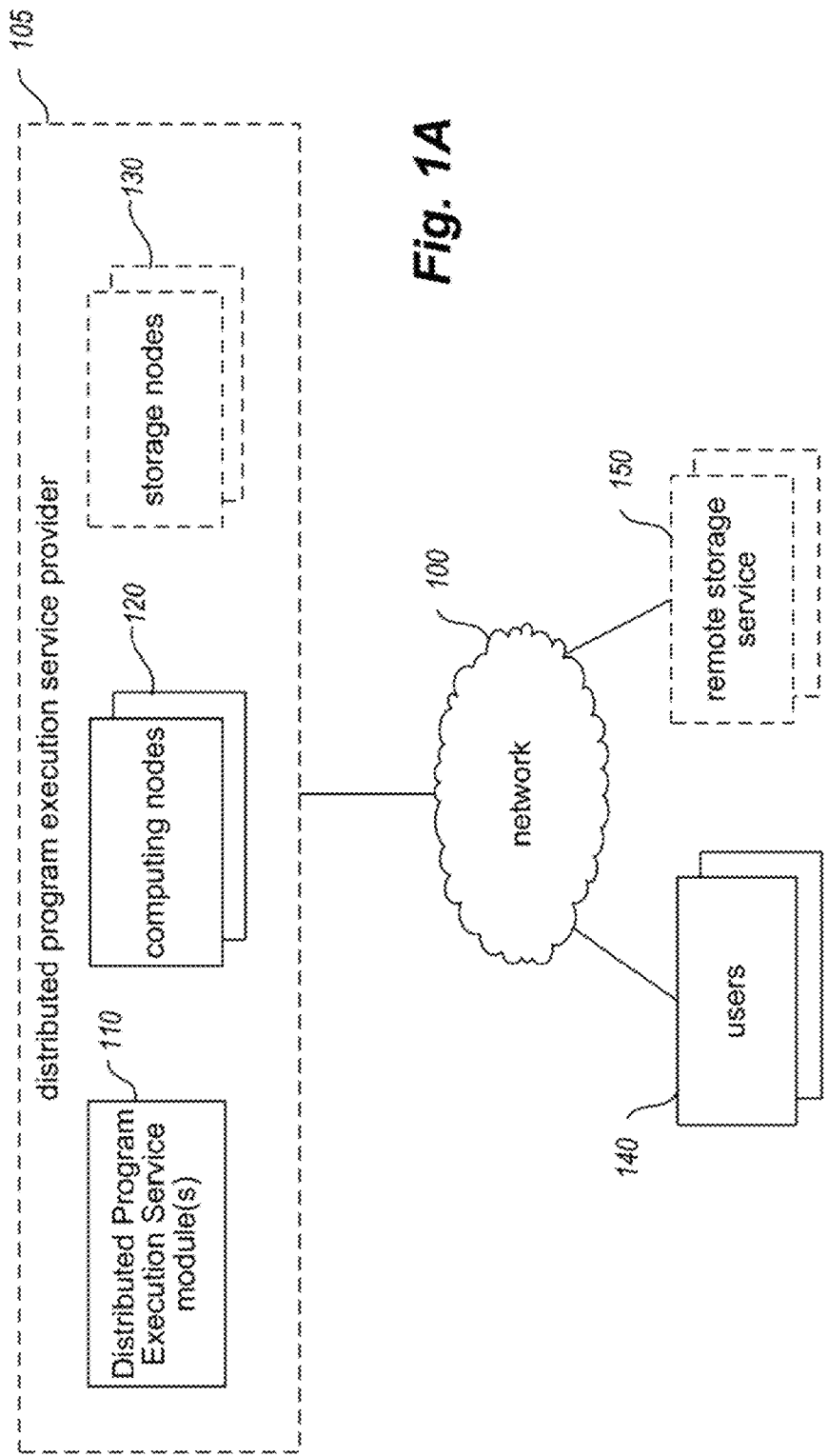
FIGS. 1A and 1B are network diagrams illustrating example embodiments of use of a distributed program execution service by remote users.

Techniques are described for managing distributed execution of programs. In at least some embodiments, the techniques include dynamically scaling a cluster of multiple computing nodes that are used to perform the ongoing distributed execution of a particular program, such as to increase and/or decrease the quantity of computing nodes in the cluster at various times and for various reasons during ongoing use of the cluster. In addition, in at least some embodiments, the managing of the distributed execution of a program on a cluster of multiple nodes includes using an architecture for the multiple computing nodes of the cluster that facilitates the dynamic scaling, including by having at least some of the computing nodes act as core nodes that each participate in a distributed storage system for the distributed program execution, and optionally having one or more other computing nodes that act as auxiliary nodes that do not participate in the distributed storage system. Furthermore, as part of performing the dynamic scaling of a cluster, the techniques may in some embodiments and situations select and use computing nodes that are only temporarily available, such as computing nodes that might be removed from the cluster during the ongoing program execution to be put to other uses (e.g., other preexisting uses to which those computing nodes were already allocated before their use in the cluster), but that may also be available for a different fee (e.g., a lower fee) than other computing nodes that are available throughout the ongoing use of the cluster. To perform the distributed execution of the program on the cluster, the program may be separated into multiple execution jobs that are each executed on one of the computing nodes of the cluster, such as by executing one or more of the execution jobs on each auxiliary node of the cluster and optionally on some or all of the core nodes of the cluster, and the architecture for the distributed program execution may further include one or more of the cluster computing nodes that act as administrative computing nodes to control or monitor at least some aspects of the distributed execution of the program on the other core and auxiliary computing nodes of the cluster. Additional details related to managing the distributed execution of programs are included below.

In at least some embodiments, some or all of the techniques may be automatically performed by a Distributed Program Execution ("DPE") service, as described in greater detail below, such as a service that is provided by a corresponding automated system and that executes multiple programs on behalf of multiple customers or other clients of the service. Moreover, in addition to managing distributed execution of programs, such a DPE service may in some embodiments provide various computing nodes having access to various computing resources (e.g., local memory, local storage, local CPU cycles, networks between computing nodes and to external computing systems, remote storage, etc.) that are available for use in executing programs for clients in a distributed manner. The computing nodes used as part of a cluster for the distributed execution of a program may have various forms in various embodiments (e.g., may each be a physical computing system and/or a virtual machine that is hosted on one or more physical computing systems), and may each have access to various computing resources. As described in greater detail below, the computing resources used to execute a particular program may include particular quantities of multiple types of computing resources (e.g., an aggregate amount of RAM or other memory of one or more physical computing systems that is used, such as by one or more computing nodes; an aggregate amount of network bandwidth capacity used on one or more networks, such as by one or more computing nodes; an aggregate amount of storage space used on one or more storage devices, such as by one or more computing nodes, and optionally by using local storage devices of multiple computing nodes; etc.). Furthermore, the computing nodes that the DPE service uses may in some embodiments be of multiple resource configuration types that may be selected and used in different situations, with each resource configuration type having a distinct combination of associated computing resources for computing nodes of that type, as discussed in greater detail below. Moreover, the computing nodes that the DPE service uses may in some embodiments be available from multiple different sources, with at least one source providing computing nodes that are only temporarily available for use in a cluster (e.g., computing nodes whose availability for ongoing use in the cluster is not guaranteed, such that the computing nodes might be removed from the cluster during the ongoing program execution to be put to other uses, but also may remain available for use in the cluster until the cluster use ends if the other uses of the computing nodes do not occur), as discussed in greater detail below.

As previously noted, a cluster for use in the distributed execution of a program may in at least some embodiments include multiple core computing nodes that participate in a distributed storage system for use by the cluster, such as to store input data used in the distributed program execution and/or output data generated by the distributed program execution. The distributed storage system may have various forms in various embodiments, such as a distributed file system, a distributed database, etc., and in some embodiments may provide various mechanisms to enhance data availability (e.g., by storing multiple copies of at least some groups of data, such as to enhance the likelihood that at least one copy of a particular group of data remains available if a core computing node storing another copy of that data group fails or otherwise becomes unavailable). When executing a particular execution job for a program on a computing node of a cluster for that program, information related to the execution may be accessed and used in various manners. For example, when the execution of the execution job is initiated on a computing node, the input data to be used by the execution job may be locally stored on the computing node (e.g., on a local hard disk or other local storage device) to facilitate access to that input data during execution, and any software instructions to be executed for the execution job may similarly be locally stored on the computing node. If the computing node on which the execution occurs is a core computing node that already locally stores the input data to be used as part of its participation in the distributed storage system (e.g., if that core computing node is selected to execute the execution job because it already locally stores that input data on a storage device of the core node), the execution may merely include retrieving and using that input data from the distributed storage system as needed, and storing any generated results in the local portion of the distributed storage system. Alternatively, if the computing node on which the execution occurs is a core node that does not already locally store the input data to be used or is an auxiliary computing node not participating in the distributed storage system, the computing node may retrieve that input data from one or more of the core nodes that do store that input data, locally store that retrieved data temporarily on the computing node, and optionally later send any generated results data to one or more core nodes for storage in the distributed storage system. Furthermore, in at least some embodiments, the input data and/or generated output data in the distributed storage system may further be exchanged with or otherwise stored in one or more remote storage locations, and in some embodiments such remote storage may be used in lieu of a local distributed storage system, as discussed in greater detail below.

The use of an architecture having core computing nodes and auxiliary computing nodes in a cluster may facilitate the dynamic scaling of the computing nodes for that cluster in various manners in various embodiments. For example, if a particular computing node will remain in a cluster until the use of the cluster ends (e.g., until the distributed execution of one or more programs by the cluster is completed), it is preferable in at least some embodiments to use that computing node as a core computing node participating in a distributed storage system for the cluster, as doing so increases the aggregate size of the distributed storage system, and may also allow that core computing node to more efficiently perform the execution of execution jobs for which it already locally stores associated input data. Alternatively, if a particular computing node will be removed from a cluster before the use of the cluster ends (whether based on a decision by or on behalf of a client associated with the cluster to remove the computing node as part of scaling the cluster, or instead based on a potential or actual removal of a temporarily available computing node in the cluster that occurs independently of the client to enable the computing node to be put to other uses), it is preferable in at least some embodiments to use that computing node as an auxiliary computing node not participating in the distributed storage system for the cluster, as removing a local portion of the distributed storage system that would have been stored on that auxiliary node if it had instead been a core node while the cluster is in use may cause one or more of the copies of data stored in that local portion to be lost (e.g., if other copies of the data are not available), may cause additional work in recreating other copies (if possible) of the data stored in the local portion, and/or in some situations may cause some or all of the aggregate functionality of the entire distributed storage system to be lost (e.g., if the structure of the distributed storage system does not support the removal of a constituent computing node while the distributed storage system is in use).

Accordingly, core computing nodes and auxiliary computing nodes may be used in various manners in various clusters. When a cluster is created, some or all of the computing nodes in the cluster may initially be selected to be core computing nodes, and optionally zero or more of the computing nodes in the cluster may initially be selected to be auxiliary computing nodes. Similarly, when a cluster is dynamically modified while it is in use, a particular one of core computing nodes and auxiliary computing nodes may be selected as a type of computing node to be modified, such as to increase the quantity of computing nodes in the cluster by adding one or computing nodes of the selected type and/or to reduce the quantity of computing nodes in the cluster by removing one or more computing nodes of the selected type. If the quantity of computing nodes in a cluster is dynamically reduced while the cluster is in use, auxiliary computing nodes may be the only computing nodes that are selected for removal in some embodiments, while in other embodiments auxiliary computing nodes may preferably be selected for removal if they are available but with core computing nodes being removed if sufficient auxiliary computing nodes are not available in the cluster. If the quantity of computing nodes in a cluster is dynamically increased while the cluster is in use, one or both of the core and auxiliary computing node types may be selected for addition in at least some embodiments, such as based at least in part on the situation surrounding the increase (e.g., if the increase in the quantity is intended to be permanent until use of the cluster ends, then add core nodes, and otherwise add some or all of the additional computing nodes as auxiliary nodes if the increase may be temporary). In some embodiments and situations, a particular cluster may include only core computing nodes or only auxiliary computing nodes. In addition, when the quantity of computing nodes in a cluster is being modified as part of dynamically scaling the cluster, temporarily available computing nodes may in some embodiments preferably be selected if they are available for one or both activities of adding and removing computing nodes, while in some embodiments temporarily available computing nodes may preferably not be selected if other computing nodes are available for one or both activities of adding and removing computing nodes, such as based on a current price for using the temporarily available computing nodes and/or on one or more other factors.

Situations in which a cluster of computing nodes may be dynamically modified while in use include the following non-exclusive examples. As a first example, the distributed execution of a program may use at least a minimum quantity of computing nodes at all times, and may occasionally use additional computing nodes (e.g., to temporarily increase the total quantity to handle temporary increases in computing load)—if so, the cluster may be created at a first time with a quantity of core computing nodes that corresponds to the minimum quantity, and with any other computing nodes that are temporarily added or subsequently removed at a later second time being auxiliary computing nodes. In such a situation, if the minimum quantity of computing nodes for the cluster is increased at a later second time while the cluster is in use, the new nodes added to reach the new higher minimum quantity may be selected to be additional core computing nodes. As a second example, the distributed execution of a program may have multiple distinct stages or phases, and different amounts of computing resources may be desired for the different stages or phases—if so, and if a later stage/phase is desired to have a lower quantity of computing nodes than an earlier stage/phase, the cluster may be initially created at a first time with a quantity of core computing nodes that corresponds to the lowest total quantity of cluster nodes that are expected for any of the stages/phases, and with any other computing nodes that are initially included at the first time or later added or removed at a second time being auxiliary computing nodes. As a third example, the distributed execution of a program may begin at a first time with a minimum quantity of computing nodes to achieve a desired goal (e.g., to be expected to complete the distributed program execution before a specified time), but may dynamically decide at a later second time to increase the quantity of computing nodes in the cluster during ongoing program execution based on current conditions at the second time (e.g., based on a cost of the additional computing nodes at the second time being sufficiently low, such as if temporarily available computing nodes are available at a price below a specified threshold; based on the status of the distributed program execution at the second time, such as having not reached a desired degree of completion; based on a particular specified second time being reached while the distributed program execution is ongoing; etc.)—if so, the cluster may be created with a quantity of core computing nodes that corresponds to the minimum quantity, and with any other computing nodes that are added at the later second time being selected to be core or auxiliary computing nodes depending on the planned permanence or temporariness, respectively, of the added nodes. It will be appreciated that a cluster may be dynamically modified while in use in various other situations and in various other manners.

As previously noted, the computing nodes that are available to be used in a cluster may in some embodiments and situations include multiple types of computing nodes having distinct computing resource configurations. If so, the different computing resource configuration computing node types may optionally be used as part of the dynamic scaling of the cluster in various manners in various embodiments. For example, in some such embodiments, all of the core computing nodes may be of a single resource configuration computing node type and all of the auxiliary computing nodes may be of a single resource configuration computing node type, but with the resource configuration computing node types being different for the core and auxiliary nodes—such a configuration may be useful if the different uses for the nodes involve different computing resource configurations (e.g., if the resource configuration computing node type for the core computing nodes includes at least a minimum amount of local storage for use within the distributed storage system, while the resource configuration computing node type for the auxiliary computing nodes includes at least a minimum amount of local memory and/or CPU cycles to facilitate the execution of execution jobs by the auxiliary nodes). In other embodiments, one or both of the core and auxiliary computing nodes may include computing nodes of multiple different resource configuration computing node types. In addition, the resource configuration computing node types may be further used as part of dynamic scaling of a cluster while the cluster is in use, such as to specify to add or to remove computing nodes of a specified resource configuration computing node type from the core and/or auxiliary computing nodes in the cluster (e.g., to add or remove a specified quantity of computing nodes of the specified resource configuration computing node type, to remove all computing nodes of the specified resource configuration computing node type from at least one of the core and auxiliary computing nodes, etc.). Computing nodes of different resource configuration computing node types may also have other differing attributes that are used to affect their selection and use in at least some embodiments, including an associated cost of use, as discussed in greater detail elsewhere.

In addition, the computing nodes that are available to be used in a cluster may in some embodiments and situations include computing nodes from different sources that have different characteristics (e.g., associated price for use, associated use conditions, etc.). For example, the multiple sources may include a first source of temporarily available computing nodes whose associated use conditions include one or more use conditions related to the circumstances of removing such computing nodes from ongoing use in a cluster due to a distinct planned use for the computing nodes, and may include at least one second source of computing nodes that are not similarly temporarily available. If multiple such sources of computing nodes are available, computing nodes from different sources may optionally be used as part of the dynamic scaling of the cluster in various manners in various embodiments. For example, in some such embodiments, all of the core computing nodes may be from a single source and all of the auxiliary computing nodes may be from a different single source. In other embodiments, one or both of the core and auxiliary computing nodes may include computing nodes from multiple different sources. In addition, the differing computing node sources may be further used as part of dynamic scaling of a cluster while the cluster is in use, such as to specify to add or to remove computing nodes from a specified source for the core and/or auxiliary computing nodes in the cluster (e.g., to add or remove a specified quantity of computing nodes from the specified source, to remove all computing nodes from the specified source from at least one of the core and auxiliary computing nodes, etc.).

Some or all of the temporarily available computing nodes may in some embodiments be allocated for one or more particular uses other than in clients' clusters, but may currently not be used for those other particular uses, such as if the temporarily available computing nodes represent excess execution or computing capacity for those other particular uses at a current time. As previously noted, such excess or otherwise unused execution capacity of a pool or other group of one or more temporarily available computing nodes may be made available to execute programs in clusters on behalf of clients on a temporary or non-guaranteed basis, such that the excess program execution capacity may be available to execute such programs until a time that the program execution capacity is desired for other purposes (e.g., for preferential or reserved use by one or more other users). If a cluster does not include sufficient computing nodes of a type other than temporarily available computing nodes to maintain the ongoing distributed execution of a program, and those temporarily available computing nodes are removed from the cluster to be put to other uses, the execution of the program by the cluster may be automatically terminated (e.g., shut down, aborted, etc.) by the DPE service in at least some such situations.

In some embodiments, at least some computing nodes that would otherwise be available for use by the DPE service in any client's cluster may be allocated to one or more clients for preferential use by those clients, such that each of those clients has priority access relative to other clients to use a respective quantity of those computing nodes. In one such embodiment, the priority access of the clients may be based on each of the clients having dedicated or exclusive access to use a particular quantity of those computing nodes (or otherwise having a respective amount of program execution capacity), such as by having one or more dedicated computing nodes and/or portions thereof that are allocated for reserved or guaranteed use by the client in executing programs. For example, in at least some such embodiments, a respective quantity of such computing nodes may be allocated to a particular client for dedicated access over a specified period of time, such as in a manner analogous to a lease of one or more physical computing systems so that a corresponding amount of program execution capacity is available for executing programs on behalf of the client throughout the specified period of time. In addition, in some embodiments, a client may be given preferential or other dedicated access to execute programs based on one or more factors, such as fees paid by the client, an agreement to a contractual obligation for using the dedicated access for a period of time and/or subject to other conditions, etc.

In at least some embodiments, at least some of the computing nodes that are allocated to one or more clients for dedicated or other preferential use may be used as excess program execution capacity during some times, such as when the allocated capacity is not being used for a preferential use and/or when the client to whom the capacity is allocated makes the allocated capacity available for use by other clients. In this manner, at least some computing nodes that are allocated to a first group of clients may become available from time to time to temporarily execute programs on behalf of other clients. When the demand for excess computing capacity of such temporarily available computing nodes from multiple clients is greater than the currently available supply, particular clients and programs may be selected to use the excess capacity in various ways. For example, in some embodiments, a client who requests excess computing capacity to execute a program may be given priority over other such clients based on one or more factors, such as fees offered and/or paid by the client, a time that a request to use the excess capacity is submitted, a time at which or by which excess capacity use is requested to start, an amount of time or a deadline by which excess capacity use is requested to be completed, a type and/or amount of excess capacity requested (e.g., a specified quantity of computing nodes), etc. Additional details related to the use of dedicated program execution capacity as excess program execution capacity are included below.

In addition, in some embodiments, the DPE service may further include on-demand variable program execution capacity from particular computing nodes that is available to satisfy dynamically received requests of clients to execute programs (e.g., immediately upon request of those clients, at an indicated future time, at some time during an indicated future time period, etc.), such that the one or more programs indicated by such a request may be executed if computing resources sufficient to satisfy the requested execution are available at (or near) the requested time, but without such a request being guaranteed to be satisfied. For example, after a variable program execution capacity request is received to dynamically execute one or more programs on behalf of a client (e.g., for immediate execution), the one or more programs may be executed for the client if an appropriate amount of program execution capacity is currently available for executing those programs (e.g., if it is determined that there is a sufficient number of available computing nodes with resources to satisfy the request), and otherwise the request may be denied (or in some cases, postponed). Thus, in some such embodiments, such a request for variable program execution capacity may be unsuccessful, such as if the appropriate amount of program execution capacity is not available to execute the one or more programs at the time of the requested execution (e.g., if it is determined that there are not enough currently available computing nodes with sufficient resources to satisfy a request for immediate execution).

In some embodiments, the computing nodes used to provide the on-demand variable program execution capacity may be distinct from the computing nodes used to provide dedicated program execution capacity and/or from the computing nodes used to provide excess program execution capacity—thus, if some of the computing nodes used to provide the on-demand variable program execution capacity are not in use, in some embodiments they may be used to provide excess program execution capacity until on-demand variable program execution capacity requests are received, while in other embodiments they may not be used to provide excess program execution capacity. In addition, in some embodiments, after a variable program execution capacity request for immediate (or scheduled) execution is satisfied and successfully initiates execution of one or more programs on behalf of a respective client, the ongoing use of the variable program execution capacity may be guaranteed to continue until some future time, such as a time of the respective client's choosing (e.g., based on an indication received from the respective client to terminate use of and/or release the program execution capacity) and/or a time based upon design by the client (e.g., the one or more programs executing on behalf of the client automatically terminate the execution, such as upon completion of a task or otherwise; an application and/or other client interacting with the one or more programs executing on behalf of the respective client terminates the execution, such as if the one or more programs executing for the respective client are provided for interactive use of others; etc.). Alternatively, in some embodiments, the guaranteed ongoing use of the variable program execution capacity may be subject to certain limitations, such as to be guaranteed that the DPE service will not preempt the use for other purposes, but not to be guaranteed against failure or other unavailability of the computing nodes executing the programs.

In addition, as previously noted, in at least some embodiments dedicated program execution capacity functionality of a DPE service may be available for one or more clients, such that each of the one or more clients may have some dedicated amount of program execution capacity that is allocated by the DPE service and guaranteed to be available for executing programs on behalf of the one or more clients (e.g., a dedicated number of one or more computing nodes provided by the DPE service, a dedicated portion of the computing resources provided by one or more of the computing nodes of the DPE service, etc.). For example, the guaranteed availability of the dedicated program execution capacity may be provided in conjunction with one or more QoS ("Quality Of Service") criteria, such as that the dedicated program execution capacity will be available within a specified period of time after a request to initiate execution of an indicated program (e.g., a period of time that corresponds to terminating execution of other programs using excess computing capacity and to initiating execution of the indicated program). In contrast to the variable program execution capacity functionality and excess program execution capacity functionality, a client of dedicated-capacity functionality may always have some specified amount of program execution capacity available for executing programs on behalf of the client during a specified use period, barring unforeseen and/or occasional events rendering services of the DPE service unavailable (e.g., service failure, maintenance, cancellation, etc).

The determination of whether and how to perform dynamic scaling for a cluster, including to add and/or remove core or auxiliary computing nodes that are optionally of a particular resource configuration computing node type and/or optionally from a particular source, may be made in various manners in various embodiments. For example, in some embodiments, a user who is a client of the DPE service may interactively specify various information for use in the distributed execution of an indicated program, such as via a GUI (graphical user interface) of the DPE service. Such user-specified information may include instructions to perform one or more of the following non-exclusive list: to start a cluster at the current time (or at a different specified future time) with an indicated quantity of computing nodes (optionally with an indication of how many, if any, of the computing nodes are to be auxiliary computing nodes, although in some embodiments the use of auxiliary computing nodes may not be indicated to some or all clients); to dynamically modify a cluster at the current time (or at a different specified future time) by adding and/or removing an indicated quantity of computing nodes (optionally with an indication of whether the computing nodes are to be auxiliary computing nodes and/or core computing nodes, although in some embodiments the use of auxiliary computing nodes may not be indicated to some or all clients); and to perform other operations for a cluster (e.g., to suspend some or all of the execution, to resume previously suspended execution, etc.); to use one or more computing nodes of a specified resource configuration type in a specified manner, including to add and/or remove computing nodes of that type for a particular cluster; to use one or more computing nodes from a specified source in a specified manner, including to add and/or remove computing nodes from that source for a particular cluster; etc. In addition, in some embodiments, one or more scaling-related criteria may be defined for a cluster, whether by an associated client or by the DPE service, that specify particular actions to be performed if specified conditions are satisfied, including to dynamically modify a cluster by adding and/or removing an indicated quantity of computing nodes (optionally with an indication of whether the computing nodes are to be auxiliary computing nodes and/or core computing nodes). If a user instruction or defined scaling criteria specifies to add or remove one or more computing nodes without indicating whether the modification applies to core and/or auxiliary computing nodes, the DPE service may in at least some embodiments automatically select which type of computing nodes to use for the modification, such as by using rules or factors described in greater detail elsewhere. As is also discussed in greater detail elsewhere, the user-specified instructions and/or defined scaling criteria may in some embodiments further specify particular resource configuration computing node types and/or particular computing node sources to be used in various manners when adding or removing computing nodes. The defined scaling criteria may have various forms in various manners, including in some embodiments to be provided or analyzed by the DPE service by executing software instructions (e.g., as part of a program, applet, etc.) provided by a client.

In order to determine if one or more defined scaling criteria for the distributed execution of a program on a cluster are satisfied, as well as to otherwise track the distributed program execution, the DPE service may in some embodiments dynamically monitor the distributed program execution for some or all clusters. Such dynamic monitoring may include, for example, determining the status of execution of the program on each of the multiple computing nodes of a cluster, and may be performed in various manners in various embodiments. For example, in some embodiments, each cluster may include at least one administrative node selected to act as a master computing node for the cluster, and the master node may gather some types of status information regarding the ongoing distributed program execution by the cluster, such as from the execution jobs executing on other cluster computing nodes (e.g., a stage or phase of execution of an execution job, such as with respect to particular operations that are performed; an estimate of the amount of execution that has been performed and/or is remaining, such as measured by time or a percentage completeness; etc.), and if so the DPE service may automatically obtain some or all of that status information from the master node. In other embodiments, the DPE service may automatically gather other types of status information, such as directly from execution jobs executing on the cluster computing nodes, by interacting with manager modules of the DPE service that are local to various of the cluster computing nodes to determine status information for that computing node, etc. Furthermore, in at least some embodiments, the dynamic monitoring may include automatically gathering information about various types of resource usage by the distributed execution of a program on a cluster, such as resource usage specific to one or more particular cluster computing nodes that execute the program and/or aggregate resource usage from the distributed execution of the program across the entire cluster of computing nodes. The types of resource usage that are monitored and measured may vary in various embodiments, such as to include one or more of the following non-exclusive list, and may further be measured in absolute terms (e.g., a measured quantity of use) and/or in relative terms (e.g., a percentage used of the total available, to reflect the difference between an amount used by one program and the amount used by another program, etc.): network bandwidth capacity used, such as between two or more computing nodes of the cluster or more generally for any network resources used by the DPE service; disk I/O ("input/output") capacity used for a particular cluster computing node and/or for a particular hard disk or other storage device used by one or more cluster computing nodes; amount of volatile or non-volatile memory used; amount of non-volatile storage used; amount of CPU cycles used or other measure of CPU utilization; bus bandwidth capacity specific to a particular cluster computing node; etc. In addition, in at least some embodiments, the dynamic monitoring may further include automatically determining whether the execution of one or more programs by the DPE service is contributing to a bottleneck with respect to access of one or more types of computing resources for other programs, such as for other programs of the DPE service. Such bottleneck detection may be performed in various manners, including by detecting when usage of particular computing resources rises above predefined thresholds, by detecting when performance of one or more other programs are having their execution delayed or otherwise hindered due to lack of available computing resources, etc. Additional details related to dynamically monitoring the ongoing distributed execution of a program on a cluster of multiple computing nodes are included below.

In addition, the dynamic modifying of the ongoing distributed execution of a program on a cluster of multiple computing nodes may be performed in various manners in various embodiments, including in some embodiments and situations based on information obtained from dynamic monitoring activities (e.g., to reflect defined scaling criteria that are satisfied, to reduce or eliminate bottlenecks, etc.). As previously noted, in some embodiments and for some types of programs, the dynamic modifying may include automatically scaling a cluster being used for distributed execution of a program while the distributed execution is ongoing, such as to expand the cluster during ongoing execution by adding one or more additional computing nodes and/or to shrink the cluster during ongoing execution by removing one or more of the computing nodes from the cluster. Cluster expansion may be performed, for example, to enable program execution to complete sooner, such as if execution on one or more cluster computing nodes is taking longer than expected, if execution of the program is being hindered by lack of sufficient computing resources and the additional computing nodes will provide access to additional computing resources that were lacking, if a master node or other cluster computing node has failed or otherwise become unavailable and the additional computing node(s) are configured to automatically take the place of the unavailable computing nodes, if the cost of using additional computing nodes is sufficiently low (e.g., for temporarily available computing nodes, such as if their current associated price for use is below a defined threshold), etc. Cluster shrinking may be performed, for example, to more efficiently use resources, such as if the distributed program execution is progressing faster than expected, if one or more cluster computing nodes are using too many computing resources and those computing nodes are shut down to throttle the excess computing resource usage, if one or more cluster computing nodes are not currently being used (e.g., have completed their portion of the distributed program execution and are removed from the cluster so as to be available for other uses and/or to prevent the ongoing distributed program execution from being responsible for ongoing fees for the computing node if it was part of the cluster), to remove all computing nodes from a cluster if a sufficient subset of the cluster computing nodes are not available for the ongoing execution (e.g., during an initial phase of the distributed program execution if a minimum percentage of cluster computing nodes and/or a minimum absolute quantity of cluster computing nodes have not completed their initialization and begun program execution within a predetermined period of time), if the cost of using current computing nodes is sufficiently high (e.g., for temporarily available computing nodes, such as if their current associated price for use is above a defined threshold), etc.

Furthermore, in at least some embodiments, the dynamic modifying of the ongoing distributed execution of a program on a cluster of multiple computing nodes may include actions other than dynamic scaling of the cluster. For example, the dynamic modifying of the distributed execution of a program may include replacing computing nodes in the cluster that is executing the program with other computing nodes that have different resource configurations and/or capabilities, may include replacing computing nodes in the cluster that is executing the program with other computing nodes from different sources, may include changing a particular use of one or more computing nodes that are currently in a cluster (e.g., switching a particular computing node between use as a core node and as an auxiliary node), etc. More generally, the dynamic modifying of the ongoing distributed execution of a program on a cluster may include otherwise automatically adjusting resource usage by the distributed program execution. For example, in at least some embodiments, the usage of one or more types of resources by one or more cluster computing nodes may be increased or decreased in various manners, such as by interacting with a module of the DPE service that is local to those cluster computing nodes to temporarily or permanently expand or restrict access to one or more types of computing resources by the execution jobs of the program being executed on those computing nodes (e.g., to limit network bandwidth usage by restricting how many communications are allowed to be sent over the network on behalf of the program; to expand storage space available to the program by changing an amount of storage allocated to the program and/or by reducing the amount of storage on a shared storage device that is being used by one or more other programs; etc.). In addition, in at least some embodiments, resource usage by one or more cluster computing nodes for distributed execution of an indicated program may be modified in other manners, such as by directly interacting with the indicated program to indicate a change in resource usage limits that are in use by the indicated program, by reducing or expanding the amount of resource usage by one or more other programs that share one or more types of computing resources with the indicated program so as to correspondingly expand or reduce the amount of resources available to the indicated program, by moving portions of the distributed program execution within the computing nodes of the cluster (e.g., to balance computing resource usage if some cluster computing nodes are under-utilized with respect to one or more types of computing resources and other cluster computing nodes are over-utilized with respect to those types of computing resources, by moving computing-resource intensive portions of the distributed program execution to cluster computing nodes that are configured or otherwise specialized for that type of computing resource usage, etc.), by moving portions of the distributed program execution to different computing nodes outside the cluster (e.g., if the aggregate computing resource usage for distributed execution of an indicated program is high with respect to network bandwidth capacity but low with respect to other types of resource usage, changing the computing nodes of the cluster so that the total quantity stays the same but the new cluster computing nodes are located closer together within the network or are provided with access to network bandwidth that is not used by or is under-utilized by other programs), etc. Such resource usage modification may be performed for various reasons, and may in some situations include temporarily throttling usage of computing resources by the distributed program execution (e.g., if the distributed program execution is using more computing resources than allocated or otherwise expected, if one or more bottlenecks exist with respect to executing programs of other users), terminating or temporarily suspending execution of the program (e.g., if an insufficient quantity of computing nodes of the cluster are available to perform execution), etc. Additional details related to dynamically modifying the ongoing distributed execution of a program on a cluster of multiple computing nodes are included below.

As previously noted, the techniques may include managing the initial configuration to be used in the execution of an indicated program in various manners, including using configuration parameters such as a quantity of computing nodes and/or other measures of computing resources to be used for the executing. The distributed execution of a program may be initiated and configured in various manners in various embodiments, such as by a user interacting with an embodiment of a DPE service to request the execution of the program in a manner specified by the user. For example, the DPE service may provide a GUI ("graphical user interface") that a remote user interactively uses to make the execution request (e.g., a Web-based GUI with which a user interacts via a client-side application, such as a Web browser, executing on a client device of the user), and/or the DPE service may provide one or more APIs ("application programming interfaces") that enable a computing device and program of the user to programmatically interact with the DPE service to make the request (e.g., one or more APIs that are also used by the provided GUI). The user may specify various information as part of such a request, such as an indication of the program to execute (e.g., by supplying an executable copy of the program, by indicating a program previously registered by the user with the DPE service, by indicating a program made available by the DPE service for use by users, etc.), and an indication of input data for use by the executing program (e.g., by supplying the input data or by indicating an accessible location from which the input data may be obtained). An executable copy of a program may be supplied in various manners and formats, such as, for example, a Java ARchive ("JAR") file.

In addition, the user may further specify other configuration parameters for the distributed program execution in at least some embodiments, such as one or more of the following: an indication of a quantity of computing nodes to use for the requested execution; an indication of one or more resource configuration types of computing node to use for the requested execution (e.g., if the DPE service provides different types of computing nodes with different capabilities, such as different amounts of memory, storage and/or processing power); an indication of one or more sources of computing node to use for the requested execution (e.g., if the DPE service provides computing nodes from different sources with different prices and/or other use characteristics); defined scaling criteria for use in determining whether and how to dynamically modify the ongoing distributed execution of the program; one or more other execution criteria to use in performing the requested execution (e.g., a user-specified QoS, or Quality of Service, level associated with the requested execution; an indication of a time by which the requested execution is to be completed; etc.); information about a location or layout of some or all of the computing nodes to use for the requested execution, such as relative to each other, to indicated data and/or to some other location (e.g., to be within a specified degree of geographical or network distance), or instead in an absolute manner (e.g., at a particular data center or other geographical location, within the boundaries of a country or other indicated geographical area, etc.); access information for use in communicating with one or more of the computing nodes, such as an SSH ("secure shell") key; configuration information for use in configuring a particular instance of the program for use with the requested execution; an indication of multiple execution jobs into which the indicated program execution is to be separated for parallel or other distributed execution, or instead an indication of how the DPE service is to automatically determine those multiple execution jobs (e.g., if the indicated program is designed to be separable in a defined manner into distinct execution jobs, such as based on an execution methodology used by or other design of the program); etc. More generally, in at least some embodiments, a user may be able to specify other more general high-level execution criteria (e.g., to complete execution as cheaply as possible within some indicated time period, to complete execution as quickly as possible with a specified maximum associated fee, to complete execution in a manner that attempts to optimize one or more other types of indicated factors, etc.), and the DPE service may automatically determine preferred or otherwise appropriate execution configuration parameters to use to satisfy those execution criteria, including by attempting to use temporarily available computing nodes with sufficiently low associated prices if available. Furthermore, in at least some embodiments, the DPE service may further automatically determine some or all such configuration parameters to otherwise use for the distributed execution of a particular program, such as for use in warning a user if user-specified configuration parameters are suboptimal or otherwise problematic (e.g., are insufficient to complete the execution by a desired time indicated by the user), or for otherwise recommending configuration parameters to the user. The automatic determining of such configuration parameters may be performed in various manners in various embodiments, such as based on the DPE service monitoring and assessing previous related program executions for various users that use differing configuration parameters (e.g., execution of the same program, such as for a program provided by the DPE service for use by users; execution of other programs of the same or similar type, such as that use the same design or execution methodology; etc.) in order to identify one or more preferred sets of configuration parameters for a particular program or particular program type. Additional details related to configuring the distributed execution of a program are included below.

The ongoing distributed execution of one or more programs for a user may also be tracked and modified in various manners in various embodiments, such as by a user interacting with an embodiment of a DPE service to modify ongoing distributed program execution in a manner specified by the user. For example, the DPE service may provide a GUI that a remote user may interactively use to view status information related to ongoing distributed program execution (e.g., based on dynamic monitoring of the ongoing distributed program execution that is performed by the DPE service, based on status information gathered by a master node that is controlling the program execution or otherwise provided by the program, etc.) and/or to make a distributed program execution modification request (whether the same GUI as used for configuring program execution or instead a distinct GUI), and/or may provide one or more APIs ("application programming interfaces") that enable a computing device and program of the user to programmatically interact with the DPE service to obtain such tracked information and make such modification requests (e.g., one or more APIs that are also used by the provided GUI for use in modifying execution). Information that is provided to a user may include, for example, one or more of the following: information about current use of different types of computing nodes within a cluster, including information specific to core nodes and/or auxiliary nodes, information specific to computing nodes of one or more resource configuration types, information specific to one or more computing node sources, etc.; information about computing nodes that are available to be used within a cluster, including information about computing nodes of one or more resource configuration types and/or current price and/or other information about computing nodes available from one or more sources, including temporarily available computing nodes; etc. The types of distributed program execution modifications that may be initiated by a user may vary in various embodiments and situations, including to modify various previously specified configuration parameters for an distributed program execution (e.g., a quantity of computing nodes to use for the ongoing distributed execution), to suspend and optionally later resume some or all of the ongoing distributed execution, etc. Additional details related to modifying the ongoing distributed execution of a program are included below.

FIG. 1A is a network diagram that illustrates an example of a DPE service that manages distributed execution of programs for multiple users. For illustrative purposes, some examples and embodiments are described below in which specific types of management of distributed program execution are provided in specific manners. These examples are provided for illustrative purposes and are simplified for the sake of brevity, and it will be appreciated that the inventive techniques may be used in a wide variety of other situations, some of which are described in greater detail below. For example, while particular examples of how to dynamically scale clusters used for the ongoing distributed execution of programs are described, other types of activities may be performed in other manners in other embodiments. In addition, while in some embodiments users initiate the execution of indicated programs in a distributed manner and/or modify the ongoing distributed execution of indicated programs, in other embodiments an embodiment of the DPE service may automatically initiate the execution and/or modification of such indicated programs and/or may determine to execute a program indicated by a user in a distributed manner (e.g., without knowledge of the user). Furthermore, in some embodiments at least some of the described techniques may be used with at least some programs that are not executed in a distributed manner, such as to configure, monitor and/or modify execution of such a non-distributed program.

In the example of FIG. 1A, a number of users 140 are interacting over a network 100 with an illustrated embodiment of a Distributed Program Execution service that is implemented by one or more modules 110, such as to initiate distributed execution of programs on one or more computing nodes 120 that are available for executing programs of the users. The network 100 may have various forms, such as, for example, to be a publicly accessible network of linked networks, possibly operated by various distinct parties (e.g., the Internet). In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the DPE service modules 110 and the computing nodes 120 are provided by a DPE service provider 105 as part of an embodiment of a DPE service, as well as one or more optional other storage nodes 130, and the DPE service modules 110 may execute on one or more other computing systems (not shown).

Figure 1B:
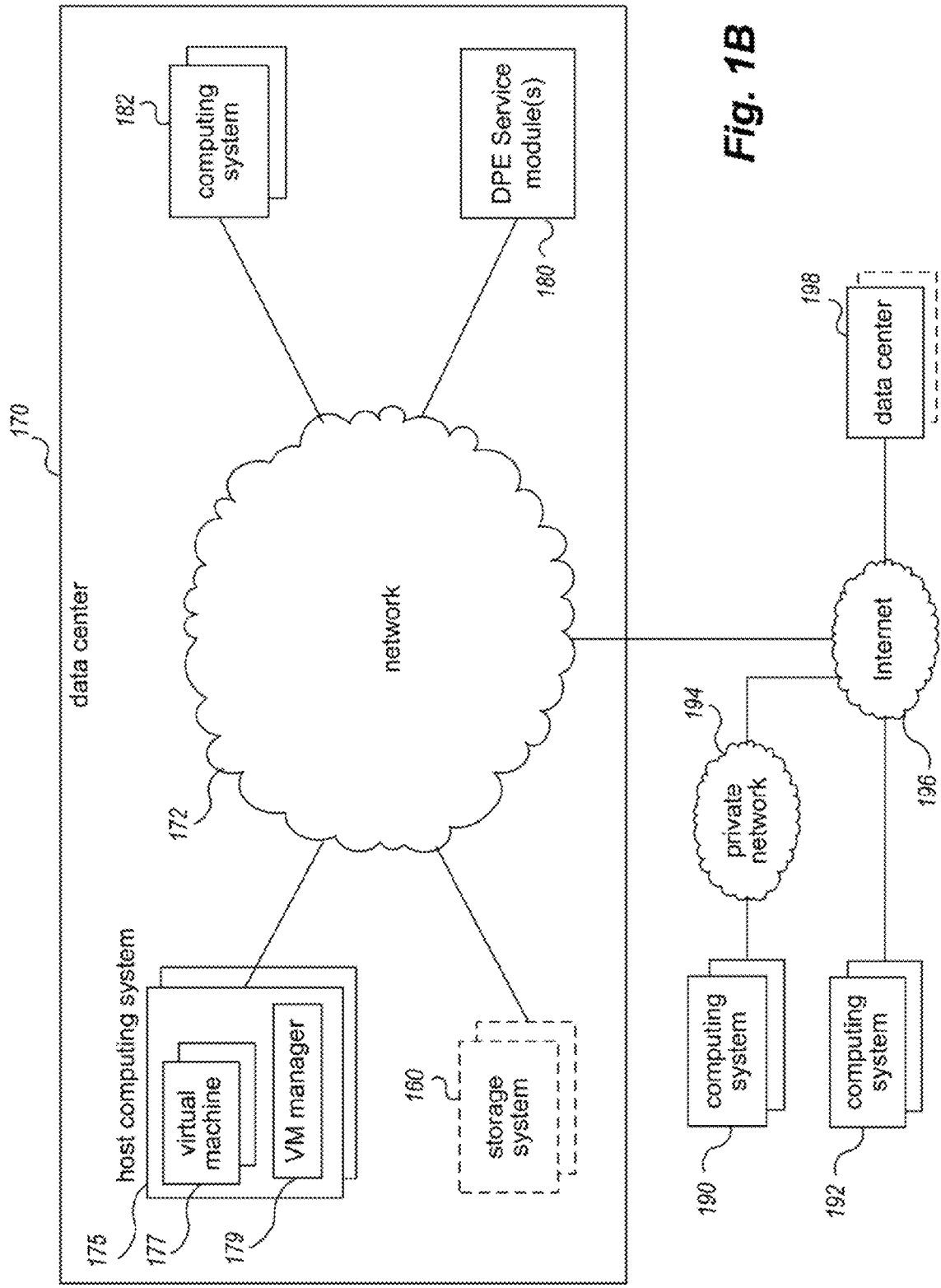
Figure 2A:
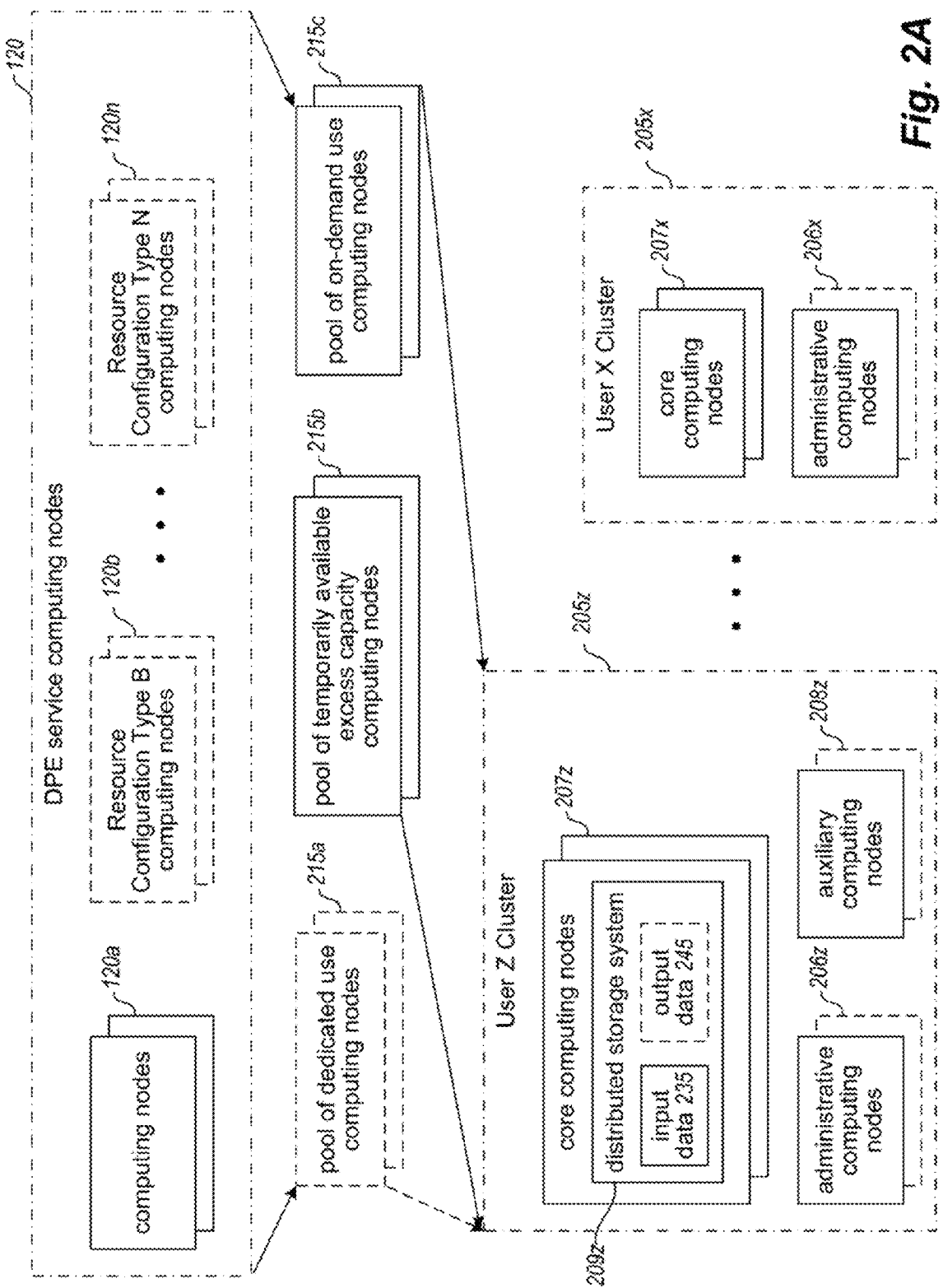

In some embodiments, the illustrated computing nodes 120 are provided by the DPE service provider 105 for distributed execution of programs on behalf of the users, and may include multiple physical computing systems and/or multiple virtual machines that are hosted on one or more physical computing systems (e.g., as is described in more detail with respect to FIG. 1B for one example embodiment). Each of the computing nodes 120 has some amount of computing resources available for executing one or more programs, such as may be measured, for example, by a combination of one or more of processing capacity (e.g., number and/or size of processing units), memory capacity, storage capacity, disk I/O ("input/output") capacity, etc., and other components (not shown) provided by the DPE service may provide other computing resources (e.g., network bandwidth capacity of one or more networks, additional storage capacity of network storage devices or other storage remote from particular computing nodes, etc.). In some embodiments, the DPE service provider 105 may provide preconfigured computing nodes, with each preconfigured computing node having similar and/or equivalent amounts of computing resources available for executing programs on behalf of users, while in other embodiments, the DPE service provider 105 may provide a selection of various different computing nodes, such as with different types or groups of computing nodes having varying amounts and/or types of computing resources (e.g., size, speed and/or type of processing units; number of processing units; amount of memory and/or storage; platform configuration, such as 32-bit or 64-bit; etc.). In addition, the computing nodes 120 may include computing nodes that are available from multiple sources and that have differing use characteristics. FIG. 2A provides additional details regarding an example embodiment in which the computing nodes 120 include computing nodes of multiple resource configuration types and computing nodes from multiple different sources.

In the illustrated embodiment, the various users 140 may interact with the DPE service modules 110 to make requests and specify various information. Such user requests and specifications may be made at various times, such as when a user registers to use services of the DPE service and/or at later times. For example, the DPE service modules 110 may provide subscription and/or registration services to one or more users, such that a user may specify information related to one or more programs to execute on behalf of the user (e.g., programs, source code, network addressable locations of one or more programs, etc.), account information (e.g., user name, billing information, etc.), terms of use, etc. In some embodiments, after a user interacts with the DPE service modules 110 to subscribe and/or register for services, the user may be issued one or more identifiers (e.g., keys, tokens, user names, etc.) that are associated with the user and are to be used in conjunction with executing programs on behalf of the user.

In addition, the users may interact with the DPE service modules 110 to initiate and configure execution of programs in various ways in various embodiments, such as by specifying a quantity and/or resource configuration type of computing nodes for execution of programs, a minimum and/or maximum quantity of computing nodes to use, an initial configuration of core computing nodes and/or auxiliary computing nodes to use for a cluster, one or more defined scaling criteria for use in determining whether to perform subsequent dynamic scaling of the quantity of computing nodes in a cluster or other modification of the cluster computing nodes, a preferred execution time and/or period of execution, an expiration time for the program execution request, a selection of one of multiple priorities for the execution (e.g., with associated fees that increase with increased priority), information about one or more resource configuration types of computing nodes to use, information about one or more sources of computing nodes to use, etc. Furthermore, in some embodiments, a user may interact with the DPE service modules 110 to request immediate execution of one or more programs on a specified number of computing nodes and/or to schedule such execution at one or more future times, such that the DPE service modules 110 may initiate the requested execution on the specified number of computing nodes at a specified time or when one or more specified execution criteria are satisfied (e.g., when it is determined that a specified number of computing nodes are available).

In this illustrated embodiment, the DPE service provides a variety of functionality for managing distributed execution of programs for multiple users on the computing nodes 120. For example, as previously noted, a particular user may use a GUI or API provided by the modules 110 to submit a request for execution of an indicated program using indicated input data, optionally along with a variety of other types of configuration information. After the request for execution of the program is received, the DPE service modules 110 may select which of the available computing nodes 120 to use for the requested execution in various ways. For example, in some embodiments, the modules 110 may simply select an appropriate quantity of computing nodes from any of the available computing nodes with sufficient resources, such as, for example, by randomly selecting from a single pool of available computing nodes. In other embodiments, one or more specific computing nodes may be selected on the basis of one or more other factors, such as, for example, a predicted length of and/or likelihood of continued availability of the one or more computing nodes, a physical proximity of the one or more specific computing nodes to one or more other computing nodes, a geographic location of the one or more specific computing nodes and/or of one or more other computing nodes, a resource configuration type of the computing nodes, one of multiple computing node pools or other sources of computing nodes, etc. In addition, after the request is received, the modules 110 may determine whether to use the multiple selected computing nodes for a cluster as core computing nodes and/or auxiliary computing nodes, and may further determine how to separate the indicated program into multiple execution jobs to be executed on some or all of the multiple selected computing nodes, such as by using information supplied by the user and/or in an automatic manner based on previously obtained information about the design of the indicated program. Similarly, in at least some embodiments and situations, the modules 110 may determine how to separate the indicated input data into multiple subsets for use by the multiple execution jobs. For example, in some situations, each execution job may include executing a full copy of the indicated program but on a particular subset of input data, while the other execution jobs similarly execute the full program copy functionality on other input data subsets. Alternatively, in some situations, various execution jobs may perform different functions on a single common set of input data. The modules 110 may further determine which computing nodes of a cluster execute which execution jobs in various manners, including in some situations based on the location in which input data to be used by an execution job is stored. As one example, an execution job may preferably be executed on a core computing node that already stores some or all input data for the execution job in some embodiments. As another example, if the computing nodes of a cluster are located in multiple distinct geographical and/or network locations (e.g., in multiple distinct data centers), a particular execution job may in some embodiments preferably be executed on one of one or more computing nodes that are at a particular location that stores at least one copy of the input data to be used for the execution job.

As the execution jobs execute on the various computing nodes of a cluster, the execution jobs store various information locally on the computing nodes in at least some embodiments, including as part of a distributed storage system on multiple core computing nodes, as discussed in greater detail elsewhere. In addition, the DPE service may optionally provide one or more storage nodes 130 that are used by the DPE service to store information related to program execution and/or for other purposes, such as to provide a reliable backup copy of data in case one or more computing nodes of the cluster become unavailable. As discussed in greater detail elsewhere, such information stored on the storage nodes 130 may include status information regarding the intermediate state of partial execution of various execution jobs for various programs, and in some embodiments may optionally include output data that is generated by completed execution jobs.

In addition, as the execution jobs of a program execute in a distributed manner on the various computing nodes of a cluster for that program, the DPE service may automatically perform various actions to dynamically monitor and/or modify the ongoing distributed execution of the program, with FIGS. 2A-2E illustrating examples of types of dynamic monitoring and modifying that may occur in some situations. For example, as discussed in greater detail elsewhere, the dynamic modifying of the ongoing distributed execution of the program on the multiple computing nodes of the cluster may include optionally performing various types of changes in certain situations, and the DPE service modules 110 may select which types of actions to pursue in which situations (e.g., based on predefined scaling criteria specified generally for the DPE service, or defined scaling criteria specified specifically for the program being executed or client on whose behalf the program is being executed). For example, if the DPE service modules 110 automatically determine to dynamically add and/or remove computing nodes from the cluster, the DPE service modules 110 may further select which computing nodes to add or remove, such as based on whether core computing nodes and/or auxiliary computing nodes are in use in the cluster, and/or in a similar manner to the selections made initially by the modules 110 in selecting particular computing nodes for the cluster. In addition, if the DPE service modules 110 automatically determine to make other types of changes to the ongoing distributed program execution, the DPE service modules 110 may similarly determine which types of changes to make (e.g., how to reduce bottlenecks corresponding to resource usage of the distributed program execution by altering the distributed program execution in one or more ways, such as by altering which execution jobs and/or input data are used by particular computing nodes, throttling resource usage on some or all computing nodes of the cluster, stopping the distributed program execution if sufficient cluster computing nodes are not available, etc.). Additional details related to the dynamic monitoring and modifying of ongoing distributed program execution are described elsewhere.

Furthermore, as discussed in greater detail elsewhere, in some embodiments the modules 110 may provide indications to cause the intermediate state of partial execution of one or more execution jobs to be persistently stored before the partial execution of the execution job is temporarily terminated or otherwise suspended. Such intermediate state information for the partial execution may be stored in various manners remotely from the computing node on which the partial execution occurred, such as by copying such intermediate state information to one or more of the optional storage nodes 130 and/or by using one or more optional remote storage services 150 that are accessible over the network 100. In some embodiments, the modules 110 coordinate the storage of the intermediate state information from the computing node to the remote persistent storage location, such as by using information that the modules 110 track about the intermediate state of the partial execution, while in other embodiments the activities in performing the persistent storage of the intermediate state information may instead be performed by management software executing on the computing node to locally manage the execution of the execution job. Alternatively, if a particular executing execution job is able to store its own intermediate execution state, the modules 110 may instead notify the execution job to perform its own intermediate execution state storage actions before shutting down its own execution. After the intermediate state of partial execution of an execution job has been persistently stored and the partial execution has been terminated, the partial execution may be resumed from that suspended intermediate state at a later time, such as substantially immediately (e.g., if the execution of the execution job is being moved from a first computing node to a second computing node, as quickly as the intermediate state information may be stored and retrieved), or instead after a longer period of time (e.g., at a later scheduled time, a later time when one or more specified execution criteria are satisfied, etc.). At the time of execution resumption, the stored intermediate state information may be retrieved from the persistent storage location, and locally stored on or otherwise made available to the computing node on which the execution job execution is to resume, and may include storing the data in a distributed storage system provided using multiple core computing nodes of the cluster. In addition, the partial execution of the execution job may be resumed in various manners, such as by indicating to the execution job not to perform a subset of operations that were previously completed (e.g., if the execution job supports such functionality), by modifying the execution job to only perform a subset of the operations that were not previously completed, etc. Additional details related to the suspension and resumption of execution of execution jobs are described elsewhere.

FIG. 1B illustrates an embodiment in which a DPE service may be provided using one or more data centers that include multiple physical computing systems. In particular, FIG. 1B is a network diagram illustrating an example embodiment in which one or more DPE service modules 180 of a DPE service manage distributed execution of programs on behalf of users at an example data center 170. The example data center 170 is connected to the Internet 196 external to the data center 170, which in this example provides access to various external computing systems, such as computing systems 190 via private network 194 and other directly accessible computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196 and may each include additional computing systems, such as may further be used by the DPE service in at least some embodiments. For example, the distributed execution of a particular program may include simultaneous and/or sequential execution using computing nodes at multiple data centers or other distinct geographical locations, including to select a particular location at which to execute an execution job in various manners (e.g., based at least in part on a location at which corresponding data is stored and/or at which one or more particular computing nodes of interest to be used are located), and to optionally move execution of an execution job from a computing node at one geographical location to a computing node at another geographical location.

The example data center 170 includes a number of physical host computing systems 175, physical computing systems 182, optional storage systems 160, and one or more DPE service modules 180 that provide an embodiment of the DPE service. In this example, host computing systems 175 each provide multiple virtual machines 177 and have a virtual machine ("VM") manager module 179 to manage those virtual machines (e.g., a hypervisor or other virtual machine monitor), and some or all of the computing systems 182 may similarly have one or more such virtual machines and/or VM manager modules (not shown). Such virtual machines may each act as a computing node for use by the DPE service, and a VM manager module on a host computing system provides one example of a type of module that the DPE service may use to dynamically monitor the host computing system (e.g., to obtain status information about one or more of the virtual machine computing nodes hosted by that host computing system) and/or to dynamically modify ongoing distributed program execution on one or more of the virtual machine computing nodes hosted by that host computing system (e.g., by throttling computing resources used by one or more of the hosted virtual machine computing nodes, by changing computing resources allocated to or otherwise available to one or more of the hosted virtual machine computing nodes, etc.). Alternatively, in other embodiments, some or all of the physical host computing systems at the data center may not provide any virtual machines, such as to instead each act as a computing node that directly executes one or more programs on behalf of end user customers of the DPE service, and such other host computing systems may similarly execute a module of the DPE service that monitors and/or modifies distributed program execution in which that host computing system participates. In addition, in some embodiments, the physical host computing systems 175 and/or physical computing systems 182 may each include management software (e.g., a management module of the DPE service, such as part of or distinct from the VM manager modules) to manage the execution of execution jobs on the computing systems, whether as part of or instead distinct from the DPE service module that performs the dynamic monitoring and/or modifying. Furthermore, in some embodiments various of the computing systems 175 and 182 may have differing capabilities, may have different associated fees for use, may support different types of user programs (e.g., virtual machine software image instances of different sizes, or programs with different types of computing resource usage, such as differing patterns of I/O and memory access and network usage), etc. If so, one or more such factors may further be used as constraints and/or preferences regarding which computing systems to select for executing particular programs. The optional storage systems 160 may also have various forms, such as computing systems with attached storage (e.g., that may also be used as computing nodes at times), network storage devices that are not used as computing nodes, etc. The example data center 170 further includes an internal network 172 that may include multiple networking devices (not shown), such as switches, edge routers, and core routers, with computing systems 175 and 182, storage systems 160, and the DPE service modules 180 connected to the internal network 172.

The illustrated DPE service modules 180 perform at least some of the described techniques in order to manage distributed execution of programs using the computing systems 175 and 182 (and optionally other external computing systems), and to optionally persistently store at least some program execution results on storage systems 160. For example, the DPE service modules 180 may provide a GUI or other functionality that enables remote users to configure distributed program execution and/or to track and optionally modify ongoing distributed program execution, such as for users (not shown) of computing systems 190 or 192 or at one of the other data centers 198. When a particular computing node or system is selected to execute one or more execution jobs of a program, the DPE service modules 180 may in some embodiments initiate execution of the execution jobs by interacting with a VM manager module or other manager module that controls execution of programs for that selected computing node/system, or may alternatively directly execute the execution jobs on the selected computing node/system. The DPE service modules 180 may further in some embodiments take various actions to dynamically monitor and/or modify the ongoing distributed execution of various programs executing on the computing nodes of the data center 170 that are used by the DPE service. In addition, some of the computing systems 190 or 192 or at one of the other data centers 198 may be used to provide one or more network-accessible remote storage services (not shown) that are accessible by the DPE service and used to persistently store at least some intermediate results or other information.

It will be appreciated that the data center of FIG. 1B is provided for illustrative purposes only, and that an embodiment of a DPE service and other software execution services may be provided in other manners in other embodiments. For example, DPE service modules 180 may instead be provided using one or more other computing systems external to the data center 170, such as computing systems 190, 192 or at a data center 198. In addition, in at least some embodiments, the programs for which distributed execution is provided may include executable software images, such as virtual machine images that are bootable or otherwise loadable on one or more virtual machine computing nodes, and that each may include operating system software, software for one or more application programs, and/or configuration information, etc. At least some such programs may be stored by the DPE service and/or by users on the storage systems 160 and/or using a remote storage service, and if so are retrieved by or supplied to the DPE service when they are to be executed on behalf of a user or as otherwise initiated. Furthermore, while only a limited number of devices are illustrated in this example, it will be appreciated that in a typical arrangement, data center 170 may include hundreds or thousands of host computing systems such as those illustrated here, organized into a large number of distinct physical networks with a large number of networking devices (e.g., in a hierarchical manner).

As previously noted, FIGS. 2A-2E illustrate examples of types of dynamic monitoring and modifying that some embodiments of a DPE service may perform to manage the ongoing distributed execution of indicated programs.

In particular, FIG. 2A illustrates additional example information regarding using the computing nodes 120 of FIG. 1A to perform the distributed execution of one or more programs for one or more clients of a DPE service embodiment. In this example, the computing nodes 120 include at least one type 120*a* of computing nodes, and optionally include computing nodes of one or more additional distinct resource configuration types 120*b*-120*n*. Each resource configuration type may have one or more computing nodes of that type, with each of the computing nodes of that type having a configuration of computing resources that differs from computing nodes of other resource configuration types, as discussed in greater detail elsewhere. In addition, while not illustrated here, the available computing nodes 120 may further include computing nodes that differ in one or more manners other than their resource configuration, such as to have different associated costs, different conditions of use (e.g., a minimum period of time and/or other specified conditions under which the computing node will continue to be available for use as part of the cluster, or the absence of any such associated ongoing availability guarantees), etc.

Furthermore, the computing nodes 120 in this example are separated into multiple different pools 215 of computing nodes that may each act as a distinct source of computing nodes for various client clusters, with each pool having differing associated prices for using its computing nodes and/or having other differing use conditions related to using its computing nodes. The multiple pools 215 in this example include a pool 215*b* that may at various times include zero or more computing nodes that are temporarily available for use in client clusters. Some or all of the computing nodes in the temporarily available pool 215*b* may, for example, represent excess capacity for computing nodes of a pool 215*a* that may at various times include zero or more computing nodes that are allocated for one or more other dedicated uses. While such dedicated use computing nodes in pool 215*a* may in some embodiments be used by the DPE service in various manners (e.g., to allow clients to use their own dedicated use computing nodes within their own clusters, such as for an ongoing fee that is less than a fee for using other on-demand computing nodes), the DPE service may in some embodiments and situations not directly use such computing nodes from pool 215*a* in client clusters for other clients to whom the computing nodes are not allocated. In this example, the computing node sources further include a pool 215*c* that may at various times include zero or more computing nodes that are allocated for on-demand variable capacity use by clients, as discussed in greater detail elsewhere.

Figure 2C:
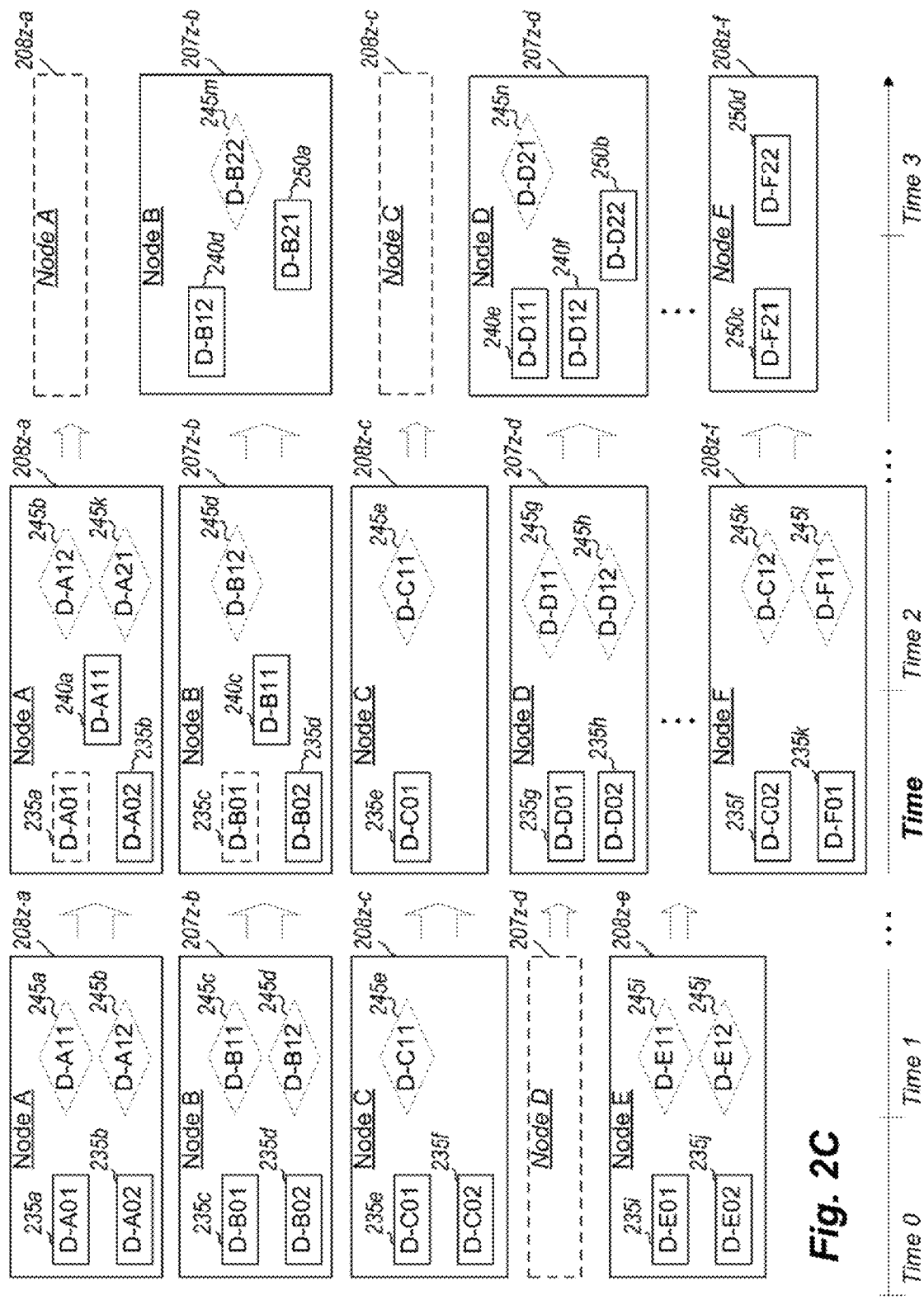

In FIG. 2A, the computing nodes 120 are being used in multiple clusters 205, including an example cluster 205*z* that the DPE service uses to perform distributed execution of an example Program Z for example client User Z, as well as one or more other example clusters 205*x*. FIGS. 2B-2D provide further example details regarding the distributed execution of one or more such programs. In the example of FIG. 2A, the cluster 205*z* includes multiple core computing nodes 207*z*, one or more auxiliary computing nodes 208*z*, and one or more administrative computing nodes 206*z*, although other clusters may have other configurations, including example cluster 205*x* that currently does not include any auxiliary computing nodes 208*z*. The core computing nodes 207*z* together provide a distributed storage system 209*z* for use with cluster 205*z*, with the distributed storage system 209*z* in this example storing various input data 235 to be used in the distributed execution of Program Z by cluster 205*z* and optionally storing various output data 245 that is generated by the ongoing distributed execution of Program Z. While not illustrated here, the auxiliary computing nodes 208z and optionally zero or more of the core computing nodes 207z may each be executing one or more execution jobs for Program Z. In addition, one or more of the core computing nodes 207, auxiliary computing nodes 208, and/or administrative computing nodes 206 of each cluster may include nodes of one or more resource configuration types 120a-120n. Similarly, one or more of the core computing nodes 207, auxiliary computing nodes 208, and/or administrative computing nodes 206 of each cluster may include nodes from one or more pool sources 215a-215c.

In addition, the administrative computing nodes 206z may include one or more master nodes that manage the distributed execution of Program Z using the core computing nodes 207z and auxiliary computing nodes 208z, such as with at least one such administrative computing node acting as a name node to manage where copies of particular pieces or groups of input data are stored, and with at least one such administrative computing node acting as a job tracker node to manage the execution of particular execution jobs on particular computing nodes. For example, a job tracker node may identify that a particular execution job is available to be executed, select a particular available core or auxiliary computing node to execute that execution job, and assign that selected node to perform that execution job using indicated data. That selected node may then interact with the name node to identify a location of the indicated data if needed (e.g., if the selected node does not already store that indicated data), obtain the indicated data from the identified location if needed (e.g., if the selected node does not already store that indicated data), optionally obtain execution code for the indicated execution job if needed (e.g., if the selected node does not already store that execution code), and initiate execution of the indicated execution job using the indicated data.

As previously noted, the excess capacity computing nodes of pool 215b may represent excess and/or unused program execution capacity that may be otherwise allocated for other uses. A request for using excess capacity computing nodes of pool 215b may be made in various ways in various embodiments, such as by specifying one or more of the following: an exact number, a preferred number, a minimum number and/or a maximum number of computing nodes to use; an expiration time for the request; a preferred execution time and/or period of execution; one or more monetary bids (e.g., a bid per each use of a computing node, a bid per use of one or more computing nodes per some unit of time, a minimum and/or maximum bid, etc), etc.

In addition, as is further discussed with respect to FIG. 2E, the illustrated embodiment of the DPE service may determine when to include and/or remove one or more computing nodes 120 from the pool 215b. In various embodiments, the DPE service may determine that one or more computing nodes are unused and/or or otherwise available in various ways. For example, in some embodiments, the DPE service may receive indications from various users or other clients that one or more computing nodes are not being used or are otherwise available for excess capacity use, such as indications from one or more users of dedicated capacity pool 215a computing nodes that they are not using some number and/or portion of those computing nodes. In some such embodiments, such dedicated capacity pool 215a users may indicate one or more times at which their dedicated computing nodes are likely to be or are committed to be unused and/or available (e.g., particular times of day, particular days, periods of time, etc.). In other embodiments, the DPE service may automatically determine when computing nodes are available for excess capacity use, such as, for example, by monitoring some or all computing nodes 120 to determine when the computing nodes are not being used and/or by tracking usage patterns of one or more users of such computing nodes. In some such cases, determining whether computing nodes are unused or otherwise underutilized may include determining and/or predicting a likelihood that the computing nodes will remain unused for at least a period of time sufficient to execute programs of one or more users, such as, for example, based on an analysis of past use patterns of the computing nodes by one or more users. In various embodiments, a period of time sufficient to execute programs of one or more users may be based on one or more considerations, such as a time to stop/start programs on behalf of users, a time to configure computing nodes for use, a type of program executed on behalf of users (e.g., some types of programs may perform useful amounts of work in short periods of time, such as various types of data processing, etc., while other programs use longer periods of time), etc.

After it is determined that one or more computing nodes 120 are available for use in excess capacity pool 215b, such computing nodes may be tracked to determine if another use of the computing nodes arises (e.g., such as priority usage of one or more types). The DPE service may determine that one or more of the excess capacity computing nodes are no longer available for use in pool 215b in various ways in various embodiments. For example, in some embodiments, the DPE service may receive indications that one or more computing nodes are no longer available, such as based on explicit requests to stop use of the computing nodes from a user to whom those computing nodes are allocated, based on requests to execute programs of priority users on the one or more computing nodes, based on an expiration of a specified period of availability, etc. As another example, in some embodiments, the DPE service may automatically determine other uses for the computing nodes, such as, for example, based on received requests from one or more users that correspond to the other uses, or based on determining a likely demand for one or more computing nodes 120 (e.g., based on detecting an increased usage of other resources and/or programs for which the computing nodes may be used, etc.).

In some embodiments, a client may interact with the DPE service to request immediate use of a specified number of excess computing nodes in an indicated cluster and/or to schedule such use at one or more future times, such that the DPE service may initiate the use of the specified number of excess computing nodes if it is determined that the specified number of excess computing nodes are available at the time of the requested execution. In addition, in some embodiments, a client may interact with the DPE service to configure a request for use of a specified number of excess computing nodes in a cluster that is to be performed in the future if the specified number of excess computing nodes becomes available, such as during an indicated future period of time, and in some such embodiments the DPE service may initiate the requested use of the specified number of excess computing nodes when it determines that the specified number of excess computing nodes are available during that period of time. In some embodiments, a client may specify a minimum and/or maximum number of excess computing nodes to use for an indicated cluster, such that the requested use is initiated if the DPE service determines that at least the minimum number of excess computing nodes are available, and the DPE service may initiate the requested use of up to the maximum (if specified) number of excess computing nodes based on availability of the excess computing nodes.

After a request for use of one or more excess capacity computing nodes is received, and if the DPE service determines that there are an appropriate number of computing nodes with sufficient computing resources to satisfy the request, the DPE service may select which of the available computing nodes in the pool 215b to use for the request in various ways. For example, in some embodiments, the DPE service may simply select an appropriate number of excess computing nodes from any of the available computing nodes with sufficient resources in the pool 215b, such as, for example, by randomly selecting from the pool. In other embodiments, one or more specific computing nodes may be selected from the pool 215b on the basis of one or more other factors, such as, for example, a predicted length of and/or likelihood of continued availability of the one or more specific computing nodes, a physical proximity of the one or more specific computing nodes to one or more other computing nodes, a geographic location of the one or more specific computing nodes and/or one or more other computing nodes, etc.

As previously noted, use of excess computing nodes in a cluster may be temporary, such that the DPE service may automatically terminate such use when other preferred uses for the excess computing nodes arise (e.g., such as if the excess computing nodes are reclaimed by a dedicated capacity user who previously was not using his/her dedicated computing node, etc.). In such cases, the execution state of one or more execution jobs on such excess computing nodes may be saved before the termination of use in some embodiments, such as to enable a later restart of those execution jobs. Furthermore, in some such embodiments, there may be multiple excess computing nodes of the pool 215b that are currently in use in clusters that may be capable of satisfying the number of computing nodes for the other purposes, and in such cases, the DPE service may determine which of those excess computing nodes to free for the other purposes based on various factors (e.g., by using a determined priority among the current requests of the clients of the excess capacity nodes, such as based on time submitted, bid prices, etc.). In some embodiments, at least some of the terminated use may be reinitiated on one or more other available excess computing nodes (if any), such as immediately or at a later time (e.g., automatically as other excess computing nodes become available).

In at least some embodiments, access to excess computing nodes of pool 215b for use in client clusters may be based on priority among the clients, such that if there is contention for some amount of the excess computing nodes between two or more requests, the request having a higher associated priority will be provided access to use the contended amount of excess computing nodes. In at least one illustrative embodiment, requests with the highest bid amounts (e.g., a highest maximum bid) may be given priority over requests with lower bids, with ties between bid amounts being resolved based on other factors (e.g., which request was received earlier). In some embodiments, one or more clients may interact with an embodiment of the DPE service to bid (e.g., auction-style) on access to one or more available excess computing nodes (e.g., currently available and/or available at one or more future times), such that the client with the winning bid may receive the access to the one or more available excess computing nodes. In some embodiments, the DPE service may automatically terminate use of one or more of the excess computing nodes associated with lower priority requests in favor of higher priority requests for the one or more excess computing nodes. In some other embodiments, such as non-priority based embodiments, the DPE service may instead occasionally rotate through pending requests to use excess computing nodes, such that each request may be provided some amount of use of one or more of the excess computing nodes.

In some embodiments, the DPE service may provide interactive feedback to one or more of the client that are interacting with the DPE service to configure and/or request use of some amount of excess computing nodes. For example, in some such embodiments, interactive feedback may include indications of when and/or for how long use of the indicated amount of excess computing nodes is likely to last, such as based on current and/or predicted demand, current and/or likely amounts of excess computing nodes, one or more bid-levels, etc. In one illustrative embodiment, the DPE service may indicate suggested bid levels along with corresponding information indicating when requested use will likely occur and/or complete, such that the client may reconfigure (e.g., by specifying a different bid, a different amount and/or type of computing nodes, a different duration of execution, etc.) a request to meet the desires of the client, such that the request may be performed at an earlier time, etc.

As previously noted, one or more of the client may be charged various fees in conjunction with use of excess capacity computing nodes, such as based on computing nodes used and/or one or more use factors (e.g., number of times used, amount of shared resources consumed, amount of time computing nodes are used, etc.), and/or based on one or more bids from the one or more clients for use of the computing nodes. In some embodiments, a portion of the fees charged to the one or more clients may be supplied to one or more other users who provided computing nodes for use by the clients (e.g., one or more users of dedicated capacity computing nodes in pool 215a). For example, in some embodiments, such other users may be paid a proportional share of some amount of the fees that are collected from clients, such as a proportional share reflective of the amount of computing nodes contributed by the other users over time. In some cases, such fees supplied to the other users may be automatically credited and/or paid to the other users by the DPE service, such as to offset other charges incurred by those other users, such as charges incurred by for use of dedicated capacity nodes in pool 215a. In addition, in at least some additional embodiments, unused portions of a single one of the computing nodes in pool 215b (e.g., unused processing unit clock cycles, unused portions of memory, etc.) may be made available for use by one or more clients, such that a cluster of a first client may be sharing resources of a single computing node with a user to whom a dedicated capacity computing node is allocated and/or with other client clusters.

In addition, although some embodiments are described with respect to a DPE service and execution capacity of computing nodes, it will be appreciated that the described techniques may be used to manage access to various types of computing-related resources. A non-exclusive list of examples of other types of computing-related resources that may be managed for use by multiple users may include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; CPU cycles or other instruction execution capabilities; etc.

FIG. 2B illustrates various example status information 210 that corresponds to the ongoing distributed execution of an example program at a particular time, and in particular of Program Z on cluster 205z of FIG. 2A at Time 1. In the example of FIG. 2B, various example computing nodes of cluster 205z are participating in the distributed execution of Program Z, as discussed in greater detail with respect to FIG. 2C, and one or more other computing nodes (not shown) may also be part of the cluster and acting as master computing nodes to control various actions of other cluster computing nodes. The status information 210 may reflect status information that is gathered by automatic monitoring by an embodiment of the DPE service (not shown) and/or by one or more of the master computing nodes. The status information 210 may be stored and used in various manners, and in some embodiments may be used by the DPE service in automatically modifying the distributed execution of Program Z.

In the example of FIG. 2B, the status information 210 is displayed as part of a GUI screen 285 that also includes various user-selectable controls 220. Such a GUI may be displayed to, for example, a human operator user of the DPE service, and/or User Z of the DPE service who initiated the distributed execution of Program Z. In this example, the user-selectable controls include a "Modify" control 220a via which the user may supply instructions to modify the ongoing distributed execution of Program Z in one or more manners as specified by the user (e.g., to add or remove computing nodes from the cluster, to modify computing resource usage of Program Z, etc.). In addition, in this example, the user may use the "Suspend" control 220b to temporarily suspend the ongoing in-progress distributed execution of Program Z, the "Terminate" control 220c to permanently terminate the ongoing in-progress execution of Program Z, and the "Duplicate" control 220d to initiate execution of a new program by duplicating at least some of the specified configuration information of a selected program via control 220b. In some embodiments, other controls may be available, such as a "Resume" control (not shown) to resume the execution of a previously suspended program, whether immediately or at an indicated future time, or more detailed controls to control the dynamic scaling of the cluster (e.g., separate controls to increase or decrease the quantity of computing nodes in the cluster; controls that affect the use of core and auxiliary nodes, such as to select a particular type of node whose quantity will be modified or to more generally indicate whether a particular scaling operation is intended to be permanent or temporary; etc.). It will be appreciated that other types of controls may be displayed in other embodiments, and that controls may be displayed and used in various manners in various embodiments.

In this example, the status information 210 includes various execution state information regarding the distributed execution of Program Z, such as to track the status of execution of execution jobs on the multiple computing nodes used for the distributed execution. In particular, in this example, the example time of Time 1 reflects a time that is shortly after distributed execution of Program Z has been initiated (e.g., 10 minutes), and thus the distributed execution of Program Z is not yet fully using the cluster computing nodes. In particular, computing node Node D 207z-d has not yet begun executing any execution jobs for Program Z, such as if Node D is still being initialized for Program Z (e.g., is still obtaining input data to be used, is still obtaining software code corresponding to one or more execution jobs of Program Z to be executed on Node D, is still configuring the Program Z software code before execution begins, is still establishing access to the master node and/or to other cluster computing nodes, etc.), or has encountered one or more problems (e.g., a failure or other unavailability, a bottleneck caused by another executing program, etc.). Computing node Node E 208z-e is similarly not yet executing any execution jobs for Program Z, but has just completed its initialization process, and is ready to begin executing its allotment of Program Z execution jobs. The other 3 computing nodes 207z and 208z that are included in the initial cluster for Program Z have already begun their respective portions of the distributed execution of Program Z at Time 1, with those other nodes being Node A 208z-a, Node B 207z-b, and Node C 208z-c. In this example, nodes A, C and E are auxiliary computing nodes 208z and nodes B and D are core computing nodes 207z, although the distributed storage system 209z is not illustrated, and the local storage by each node of its corresponding input data 235 and output data 245 is shown.

In addition, in this example, each line or entry in the information 210 corresponds to the performance of a particular operation for a particular execution job on a particular computing node, with information being tracked that in this example includes an identification 210a of the computing node, of the execution job 210b, of the operation 210c, of the status of performance 210f of the operation, of input data 210d to be used by the operation, of output data 210e to be produced by the performance of the operation, and optionally of various other information 210g. Such other status information may include, for example, information about dependencies or other inter-relationships between operations (e.g., operation B cannot be executed until after operation A is completed, operations C and D are to be executed simultaneously, etc.), information about expected completion of performance of an operation being performed (e.g., an expected completion time, an expected amount of time until completion, a percentage completion of an operation, a percentage of the operation that remains to be performed, etc.), information about expected initiation of performance of operations that are not yet being performed, etc. Various other types of information may similarly be displayed for Program Z, such as information about a current stage or phase of the execution, about the one or more master nodes that control execution of the execution jobs on the various cluster computing nodes and that may optionally gather and store various status information for the distributed execution, a graphical depiction of some or all of the various multiple computing nodes, etc.

While not illustrated in this example, in some embodiments and situations, different users or other entities may be involved in different parts of the distributed execution of a program, such as to have a first user initiate distributed execution of a program, a second user initiate a first suspension of execution of that program, a third user initiate a first resumed execution of that program, etc. Such two or more different users may, for example, represent a single client, not represent the same client but be affiliated in one or more other manners (e.g., based on working together), have authorization that has been granted to perform specified actions for other users, etc.

In the example of FIG. 2B, the execution of an example execution job J-A has been initiated on computing node Node A. Execution job J-A includes operations to be performed in this example that include at least example operations A01, A02, A03, and A04, and the first four entries in the status information 210 correspond to these operations for this execution job and computing node. In this example, operations A01 and A02 have begun and are in progress, with operation A01 using input data D-A01 and with operation A02 using input data D-A02. The graphical indications of cluster computing nodes 207z and 208z are provided in FIG. 2B for illustrative purposes to indicate information about the current status of the computing nodes, but are not displayed as part of the GUI screen 285 in this example. In particular, the graphical display of Node A 208z-a indicates the input data D-A01 235a and D-A02 235b that are currently loaded on Node A and being used, as well as indications 245a and 245b of output data for operations A01 and A02 that are in the process of being produced. In particular, operation A01 will produce output data D-A11 245*a*, which operation A03 uses as input data—since that data D-A11 245*a* is not yet available, operation A03 is queued to be executed while Node A is waiting for that data to be available (and optionally for sufficient computing resources to be available on Node A to execute the operation). Similarly, operation A02 is in progress and is using input data D-A02 to eventually produce output data D-A12, and since operation A04 uses that output data D-A12 as input data, operation A04 is similarly queued and ready to be executed when its input data and Node A are available to perform it. Similar status information is illustrated for other computing nodes, execution jobs and operations.

FIG. 2C continues the example of FIG. 2B, and in particular illustrates the changing status of the distributed execution of Program Z over time. The left portion of FIG. 2C corresponds to Time 1, and thus the graphical depictions of the computing nodes 207*z* and 208*z* match those shown in FIG. 2B at the same time. As discussed in greater detail elsewhere, in some embodiments the distributed execution of Program Z may be stopped at Time 1 or a prior time, such as if the 3 example computing nodes that have begun executing portions of Program Z just prior to Time 1 (those being Node A, Node B and Node C) are not determined to be a sufficient quantity or percentage of the cluster computing nodes (e.g., less than 90% participating in the distributed execution of Program Z within 10 minutes of the Time 0 initialization time for the Program Z distributed execution).

In the illustrated example, however, the distributed execution of Program Z is not stopped (or is stopped but is later resumed or restarted prior to Time 2), and the status of the distributed execution of Program Z at Time 2 is illustrated in the center of FIG. 2C. In this example, the progression of the distributed execution on the various cluster computing nodes has progressed. For example, with respect to Node A, operation A01 has now been completed, as reflected by the output data D-A11 240*a* as being shown as now being stored on Node A, and further being used as input for the now in-progress performance of operation A03 that is in the process of generating additional output data D-A21 245*k*. Since input data D-A01 has now been used, it may optionally have been removed from Node A, and operation A02 is continuing to be performed and in the process of generating output data D-A12 245*b*. The other computing nodes have similarly progressed in their distributed execution of Program Z, including that Node D and Node E are both now participating in the distributed execution of Program Z.

However, some modifications have been automatically made to the ongoing distributed execution of Program Z since Time 1 in this example. In particular, the cluster has been dynamically scaled to increase the total quantity of cluster computing nodes by at least 1, with new auxiliary computing node Node F 208*z-f* being illustrated and in use at Time 2 as part of the distributed execution of Program Z. The dynamic scaling may have been initiated in various manners, such as by an explicit instruction received from User Z or by the satisfaction of one or more defined scaling criteria for the cluster. In addition, the node added may have been of any of the resource configuration types 120*a*-120*n* that are available and/or from any of the pools 215*a*-215*c* or other sources, such as is indicated by the instruction or defined scaling criteria, or is instead automatically selected by the DPE service. If one or more defined scaling criteria were used to initiate the dynamic scaling, the defined scaling criteria may, for example, have been satisfied based on the execution status of one or more particular nodes or based on the aggregate execution status of the cluster. In this example, Node C may have experienced slower performance than expected (e.g., based on Node C having less available computing resources as compared to other cluster computing nodes; based on a bottleneck being created on a host physical computing system, not shown, that provides Node C, such as by another computing node provided by that host physical computing system as part of the distributed execution of another program; etc.), and/or the overall distributed execution of Program Z may be taking longer than expected (e.g., based solely on the unexpected delay with respect to Node C, based on unexpected slowness of one or more cluster computing nodes other than Node C; etc.). If so, the DPE service may have proceeded to automatically add Node F to the cluster, and in this example has distributed a portion of the Program Z operations that were previously assigned to Node C to now be performed by Node F. In particular, Node C continues to perform the operation C01, as was previously occurring at Time 1, but operation C02 has been transferred to Node F and is currently being performed by Node F at Time 2 (as demonstrated by the input data D-C02 235*f* being loaded on Node F and the output data D-C12 245*k* being in the process of being generated on Node F by operation C02). Node F also in this example is executing one or more other operations that were not previously assigned to any of the cluster computing nodes at Time 1, such as operation F01 (not shown) that uses input data D-F01 235*k* and is in the process of generating output data D-F11 245*f*.

FIG. 2C further illustrates the status of the distributed execution of Program Z at a later Time 3, which is illustrated on the right side of FIG. 2C. In the illustrated example, much of the distributed execution of Program Z has been completed, and dynamic scaling has been used to reduce the quantity of computing nodes in the cluster by Time 3. As with the dynamic scaling that occurred prior to Time 2, the later dynamic scaling may have been initiated in various manners, such as by an explicit instruction received from User Z or by the satisfaction of one or more defined scaling criteria for the cluster. In addition, as with the adding of Node F, the nodes to be removed may have been of any of the resource configuration types 120*a*-120*n* that are available and/or from any of the pools 215*a*-215*c* or other sources, such as is indicated by the instruction or defined scaling criteria, or is instead automatically selected by the DPE service (e.g., to remove a node from pool 215*b* because it is planned to be put to a different higher priority use). In this example, Node A and Node C have completed the portions of the distributed execution assigned to them (both the initial assignments, and any later assignments) before Time 3, and are also auxiliary computing nodes 208*z* that are preferably selected for dynamic removal in lieu of any core computing nodes 207*z*. Accordingly, while other cluster computing nodes continue the ongoing distributed execution of Program Z, the DPE service has automatically selected Node A and Node C to be removed from the cluster. Thus, in this manner, the DPE service may automatically modify the ongoing distributed execution of Program Z and the corresponding cluster used for that distributed program execution at various times and for various reasons. Clusters may be dynamically scaled in various other manners and for various other reasons, as discussed elsewhere.

FIG. 2D continues the examples of FIGS. 2B and 2C, and in particular illustrates additional status information regarding the ongoing distributed execution of Program Z, as well as other programs by the DPE service. In this example, status information 290 and 291 is shown that indicates status at Time 2, such as may be automatically gathered by automatic monitoring activities of the DPE service. In addition, the status information 290 and 291, as well as other status information 292 and 293, may be part of a GUI screen 295 that is displayed to one or more users in a manner similar to that previously discussed with respect to FIG. 2B, although no user-selectable controls are illustrated in the example of FIG. 2D, and/or the various status information may be used internally by the DPE service as part of automatically determining whether to perform dynamic scaling for the distributed execution of Program Z, such as based on the satisfaction of one or more defined scaling criteria. While not illustrated in FIG. 2D, in some embodiments the status information that is displayed may further include a variety of types of information about different types of computing nodes used in a cluster or that are otherwise available (e.g., about core computing nodes versus auxiliary computing nodes of a cluster; about computing nodes of different resource configuration types in a cluster, optionally in a manner that is also specific to core computing nodes and auxiliary computing nodes; about computing nodes in a cluster that are available from different sources, such as with different associated prices and/or use conditions, optionally in a manner that is also specific to core computing nodes and auxiliary computing nodes; about computing nodes that are available to be added to a cluster, such as computing nodes of different resource configuration types and/or that are available from different sources; etc.), including to display such information about ongoing execution of a program on a cluster to a client associated with the cluster in order to enable the client to dynamically modify the ongoing execution of the program on the cluster.

In the example of FIG. 2D, various status information 290 has been monitored regarding the distributed execution of Program Z at Time 2, including various aggregate computing resource usage information. In particular, in this example, each line or entry in the information 290 corresponds to a particular one of the cluster computing nodes, with information being tracked that in this example includes an identification 290a of the computing node, of one or more corresponding execution jobs 290b being executed on that computing node, of the status of performance 290c of the execution job(s), and various computing resource usage information 290d-290h. The example computing resource usage information that is shown in this example includes a quantity 290d of disk I/O for an indicated hard disk that the computing node is using (e.g., an average over a prior period of time, a current point-in-time value, etc.) and a percentage 290e of the total disk I/O for that indicated hard disk that the computing node is using, a quantity 290f of network bandwidth I/O for an indicated local network that the computing node is using (e.g., an average over a prior period of time, a current point-in-time value, etc.) and a percentage 290g of the total network bandwidth capacity for that indicated network that the computing node is using, etc. Various other types of computing resource usage information 290h may similarly be shown, and it will be appreciated that the various types of computing resource usage information may be displayed in various manners in various embodiments.

In addition to the computing resource usage data for the distributed execution of Program Z that is shown for each of the cluster computing nodes, the bottom of the status information 290 also shows aggregate computing resource usage information for the entire distributed execution of Program Z. For example, the illustrated data includes a total quantity 290d of disk I/O used by all of the cluster computing nodes, an average percentage 290e of the total disk I/O used by all of the cluster computing nodes, a total quantity 290f of network bandwidth I/O used by all of the cluster computing nodes, and an average percentage 290g of the total network bandwidth capacity used by all of the cluster computing nodes. In this example, most of the hard disks and networks being used by the cluster computing nodes are shared computing resources used by other computing nodes (e.g., other computing nodes of the same cluster, other computing nodes of other clusters that are executing other programs, etc.), although example hard disk N used by Node E is not shared ("NSh") by others (e.g., is a remote logical network disk that is used only by Node E), and thus in this example the usage of that non-shared computing resource is not included in the aggregate computing resource usage information. In other embodiments, all computing resources may be shared or may be not shared, and the aggregate information may or may not include both types of computing resource usage information.

In addition to the status information 290 illustrated for the ongoing distributed execution of Program Z, FIG. 2D also illustrates other status information 291 corresponding to the ongoing distributed execution of other programs of the DPE service, although only aggregate computing resource usage information is shown for these other example programs. Furthermore, FIG. 2D also illustrates various status information 292 from monitoring the total usage of networks of the DPE service by the various programs being executed, and may similarly include status information 293 from monitoring the total usage of hard disks by the various programs of the DPE service being executed, as well as optionally other types of computing resource usage.

The various status information of FIG. 2D may be used in various manners, including by the DPE service as part of automatically determining whether to modify ongoing distributed execution of one or more programs of the DPE service, such as in accordance with one or more defined scaling criteria for particular programs and their clusters. For example, with respect to the ongoing distributed execution of Program Z, the usage of disk J (by Node A, at 70% of the total disk I/O) and aggregate usage of disk L (by Nodes C and F, at an aggregate 95% of the total disk I/O) may exceed an allocation or other expected usage for shared disks, and thus may create a bottleneck for any other programs that are attempting to use those disks. As such, the DPE service may determine to take various actions, such as to throttle the usage of those disks by those computing nodes (e.g., of the usage by one or both of Nodes C and F of disk L), or to take other actions to accommodate the actual or potential bottleneck (e.g., temporarily prevent any other computing nodes from using disk L, so that the aggregate 95% total disk I/O that is being used by Program Z does not create any actual bottlenecks for other programs). In other embodiments and situations, the DPE service may not take action until an actual bottleneck arises—for example, if other computing nodes are not attempting to use 30% or more of the total disk I/O for disk J, then Node A's use of 70% of the total disk I/O may be allowed until additional I/O capacity of disk J is requested by other computing nodes. Similarly, with respect to network bandwidth usage, the aggregate use of network T by Nodes D and E is 80% of the total network bandwidth capacity, and another 10% is being used by one or more other programs (as shown in the I/O capacity 292a, I/O usage 292b and I/O % 292c of status information 292). Accordingly, such network T usage by Nodes D and E may be throttled due to the potential or actual bottleneck caused by the use of network T for the distributed execution of Program Z. As another alternative, one or both of Nodes D and E may be automatically determined by the DPE service to be replaced or supplemented by one or more other computing nodes to be added to the cluster for Program Z that are part of other local networks of the DPE service, such as based on network T having relatively low total bandwidth capacity compared to other networks of the DPE service (e.g., network S with ten times more bandwidth capacity and a current total bandwidth usage of 24%).

FIG. 2E illustrates an example of techniques for managing use of excess computing nodes that are temporarily available for use in clusters when not otherwise being used, such as that may be automatically performed by an embodiment of the DPE service. In particular, FIG. 2E includes a time-based table 200 that illustrates information about usage of a number of computing nodes 210 by various users over time 205, with use of each computing node 210 being illustrated at consecutive time intervals 205a-205o. In addition, table 250 illustrates information about example requests A, B, C and D received to use computing nodes on behalf of users. In the illustrated table 200, a time interval having a solid gray background (e.g., time interval 205a of dedicated computing node 212b, and all time intervals of other computing node 214a) indicates that the respective computing node is not available to be used for excess program execution capacity during that respective interval of time (e.g., it is being used for one or more other purposes and/or is otherwise not available); a time interval having a solid white background (e.g., time intervals 205b and 205c of dedicated computing node 212c) or having a diagonal-lined background (e.g., time interval 205f of dedicated computing node 212b and time interval 205o of other computing node 214b) indicates that the respective computing node is available for use as excess program execution capacity during that respective interval of time; and a time interval containing a letter A, B, C or D (e.g., time intervals 205f-205k of dedicated computing node 212a) indicates that programs of the respective request for excess program execution capacity are executing on the respective computing node during that time interval.

As previously noted, table 250 illustrates various requests received at various indicated times, such that each of the various requests is to use a specified amount of excess computing nodes as part of a client cluster. In addition, each of the requests has various specified configuration information in this example, including a specified minimum and maximum number of computing nodes for the request; a bid fee amount that the user is willing to pay for use of each of the computing nodes (e.g., such as a dollar amount per use hour of a single computing node); and an indication of a time at which the request is to expire (e.g., such as a specified total duration of execution time after which a request is to expire, a specified time at which a request is to expire, etc.). As one illustrative example, request A is received at a time that approximately corresponds to time interval 205c (e.g., just before time interval 205c or during time interval 205c), with a minimum and maximum number of computing nodes both indicating a preference to execute on a single excess capacity computing node, with a bid price of $0.05 per hour of use of the single excess computing node, and with no specified expiration (e.g., indicating that the request is to continuously be considered until it is fully satisfied). In other embodiments, the various requests may be configured in other ways, such as to include one or more of a specified particular type or source of computing node to use, a minimum and/or maximum bid amount, and/or one or more other configurations (e.g., fault tolerance requirements, execution locality and/or proximity preferences, etc.).

The illustrated table 200 includes a number of dedicated capacity computing nodes 215a, such as computing nodes that have been allocated for dedicated access to one or more specific users. For example, a dedicated capacity user (not shown) may have priority access to the specific computing node 212a for a specified period of time (e.g., a year), such that the user may access computing node 212a on behalf of the user at any time during the specified period of time, although such access may be subject to a delay period and/or one or more interactions on the part of the user to gain access (e.g., notifications of an intent to use the computing node 212a at a particular time, a request to use computing node 212a as part of a particular cluster, etc.). In other embodiments, the dedicated capacity user (not shown) may instead have priority access to a computing node with equivalent computing resources as computing node 212a (e.g., equivalent processing capacity, memory, etc.), but not have a particular allocated computing node 215a, such that the user may be provided access to any of the computing nodes 215a that are equivalent to 212a for executing programs on behalf of the user and that are available for use. In various such embodiments, the DPE service may ensure that a sufficient number of dedicated computing nodes equivalent to 212a are available for use by dedicated users who may have priority access to such computing nodes in various ways (e.g., maintaining a pool of such computing nodes and/or otherwise reserving a specific amount of such nodes, etc.).

In addition, the illustrated table 200 indicates a number of other computing nodes 215b, such as computing nodes that may be available for other types of program execution capacity (e.g., on-demand variable program execution capacity). In this illustrated embodiment, all the computing nodes 210 are treated as being equivalent (e.g., having equivalent computing resources), although other embodiments may exist where various of the computing nodes 210 may be of different types, such that various of the requests may include indications of one or more specific types of the computing nodes to use for executing programs in satisfaction of the requests.

In table 200, during interval 205a-c, dedicated computing node 212c has been determined to be excess capacity, such as based on being unused by a dedicated capacity user to whom computing node 212c is allocated, and has thus been made available for excess capacity use (e.g., been added to a pool of temporarily available excess capacity computing nodes). For example, the dedicated capacity user may have interacted with the DPE service to indicate that computing node 212c is available for excess program execution capacity, such as at some time prior to time interval 205a, or the DPE service may have instead automatically determined that the computing node 212c was unused. In the illustrated example, all other of the illustrated computing nodes (e.g., 212a-b, 212d, and 214a-b) have not been determined to be available during the interval 205a-205c. During time interval 205c, request A is received, and the DPE service determines to satisfy request A using the available excess capacity computing node 212c, for the user-specified fee of $0.05/hour, and initiates execution of the program on computing node 212c, such as by adding computing node 212c to a client cluster (not shown) associated with request A (e.g., as an auxiliary node). In other embodiments, the DPE service may instead have a fixed price fee for some or all excess capacity use.

At time interval 205d, the DPE service determines that computing node 212c is no longer available to satisfy excess program execution capacity requests (e.g., based on an indication received from a dedicated capacity user reclaiming use of the computing node), and so the use of the excess capacity node associated with request A is terminated for computing node 212b (e.g., computing node 212b is removed from the cluster associated with request A). At interval 205f, the DPE service determines that two computing nodes with sufficient resources to satisfy request A (e.g., dedicated computing nodes 212a and 212b) are available as excess capacity computing nodes, and determines to continue satisfaction of request A by using dedicated computing node 212a as an excess capacity node added to the respective client cluster. In the illustrated embodiment, the diagonal lines at time interval 205f with respect to dedicated computing node 212b indicate that node 212b is available during that time interval for use as excess computing capacity, but is not preferred for excess computing capacity use, and thus is not selected to satisfy request A. Computing node 212b may not be preferred for various reasons, such as it having a short and/or uncertain duration of availability (e.g., as determined by the DPE service, such as based on indications from the dedicated capacity user to whom it is allocated, based on prior history of use, based on forecasted use, etc.), whereas node 212a may be determined to have an availability that is likely to be relatively longer than node 212b. In such a situation, the DPE service may have a preference for selecting a computing node with a longer likely availability for satisfying a request for an excess capacity computing node, such as to minimize having to start/stop use of the various computing nodes 210 within clusters, etc. Thus, in this example, computing node 212b is not used during time interval 205f, but if another excess computing capacity request had been received prior to time interval 205f, node 212b may have nonetheless been used for that other request.

In this example, request B is received at interval 205g, as illustrated by table 250. In this case, there is only one excess computing node available at that time (e.g., dedicated computing node 212a), and the DPE service determines to terminate the satisfaction of request A in lieu of request B, such as based on request B having a higher bid amount (e.g., $0.08/hour) than request A (e.g., $0.05/hour) or otherwise having a higher priority. In this example, request B is satisfied continuously using dedicated computing node 212a for a fee of $0.08/hour over the time intervals 205g-205i. At time interval 205i, two computing nodes are available as excess computing nodes (dedicated computing nodes 212a and 212d), each having sufficient resources for satisfying requests A and B, and in the illustrated embodiment request B continues to use node 212a while satisfaction of request A is reinitiated on node 212d.

At time interval 205j, three dedicated computing nodes are determined to be available as excess capacity computing nodes (computing nodes 212a, 212c and 212d), and request C is received. In this embodiment, the satisfaction of requests A and B using dedicated computing nodes 212d and 212a, respectively, is terminated, and all three of the available excess computing nodes are selected for use in satisfying request C based on request C having an indicated preference to execute on a maximum of three nodes and having a relatively higher bid amount (e.g., $0.10/hour) than requests A and B. At time interval 205k, two dedicated computing nodes are determined to be available as excess computing nodes (computing nodes 212a and 212c), such as based on computing node 212d having been reclaimed for other purposes or otherwise having become unavailable. The use of computing node 212d for request C is terminated but the use of nodes 212a and 212c for request C continues, such as based on the preferred maximum and minimum number of computing nodes for request C, and request C having a higher priority than requests A and B. After time interval 205k, the DPE service determines that request C has been satisfied for at least two hours over the time intervals 205j-205k, and has thus expired. Accordingly, the DPE service terminates use of the excess capacity computing nodes for request C, and request C is no longer treated as a pending request to be satisfied. At time interval 205l, one computing node (dedicated computing node 212c) is determined to be available for use as excess program execution capacity, and the satisfaction of request B is reinitiated on the computing node.

At time interval 205m, an indication is received (not shown) to cancel request B (e.g., an indication from the client who submitted request B), such that the use of computing node 212c with request B is terminated, and request B is treated as no longer being a pending request to be satisfied. In addition, at or near this time, request D is received, having a bid amount equivalent to previously received request A (e.g., $0.05/hour). In this case, the DPE service determines to reinitiate satisfaction of request A on available dedicated computing node 212c rather than request D, based on request A having been received at an earlier time than D. Request A continues to use node 212c until some unknown future time after time interval 205o. At interval 205o, one of the other computing nodes 214b becomes available for use as excess program execution capacity, and is determined to be a non-preferred excess capacity computing node, but the program of request D is nonetheless executed on the other computing node 214b since no other excess computing nodes are currently available.

In the illustrative example of FIG. 2E, the DPE service may further track usage of the computing nodes 210 corresponding to the various requests A-D, such that the various associated client are charged fees corresponding to the bid amounts indicated by the various requests. In addition, the DPE service may also track which of the computing nodes 210 were used and/or were made available for use by excess capacity users, such that one or more users associated with those computing nodes may be given some portion of the fees collected from the excess capacity users.

It will be appreciated that the preceding example is provided for illustrative purposes, and that other embodiments may differ in various ways from the example. For example, although the computing nodes 210 are depicted as being equivalent (e.g., having equivalent computing resources), other embodiments may be provided where various of the computing nodes 210 may be of different types with varying characteristics (e.g., different amounts of processing capacity, memory, platform specification, etc.). In some such embodiments, various of the requests may include indications of one or more specific types of the computing nodes for use in executing programs associated with the requests, and those requests may only be executed on the corresponding specified type of computing node. In addition, in some embodiments, rather than excess computing capacity being based on unused dedicated computing nodes and other computing nodes as illustrated, embodiments may exist where only one group of computing nodes and/or additional groups of computing nodes may contribute to excess capacity computing nodes available for executing requests of excess capacity users. Furthermore, in some embodiments, at least some of the other computing nodes 215b may include computing nodes provided to the DPE service by one or more third parties.

It will be appreciated that the illustrated and other types of status information may be automatically monitored by the DPE service in various manners, and may be automatically used by the DPE service in determine modifications to make to ongoing distributed execution of programs. In addition, it will be appreciated that the information in the examples of FIGS. 2A-2E has been provided for illustrative purposes only, and various details have been shown in an abstract manner or not illustrated for the sake of understanding. Furthermore, it will be appreciated that while only a limited number of computing nodes and execution jobs have been illustrated, in actual embodiments the actual quantities may be much larger, such as to include hundreds or thousands or millions of computing nodes and/or execution jobs.

As previously noted, the DPE service may provide various functionality to perform distributed execution of programs for users. For example, after program execution is requested or otherwise initiated, whether by a user or in another manner, that program execution may be separated into multiple execution jobs for parallel or other distributed execution in various manners in various embodiments. As previously noted, the program may be designed to be separable in a defined manner into distinct execution jobs (e.g., to support task-level parallelism), and if so a user may indicate how to generate multiple execution jobs and/or the DPE service may automatically generate the multiple execution jobs. Furthermore, some types of programs may perform various operations on each of a number of pieces of input data, and in such situations, data parallelism techniques may be used to separate the group of input data for use in the program execution into multiple subsets that are each supplied to a distinct execution job (e.g., with each execution job performing some or all of the same operations on the input data subset used for that execution job). As one simple example, a particular program execution may include searching a large number of Web pages for two particular terms (or alternatively indexing the Web pages for use in later searches), and the program execution may be separated into a large number of execution jobs that execute simultaneously in parallel to each search (or index) a distinct subset of the Web pages (e.g., a single Web page, or a small number of the Web pages) for one or both of the terms. Non-exclusive examples of types of programs that may be separated into multiple execution jobs (e.g., to support task parallelism and/or data parallelism) include the MapReduce program for processing and generating large data sets by performing at least a first phase of various map functions and a second phase of various reduce functions, the Hadoop program implementation of MapReduce execution methodology, the Hive data warehouse infrastructure that uses Hadoop, the Pig structured query language for use with HDFS ("Hadoop Distributed File System") data, the HBase open-source distributed database, various types of image, video and speech processing, various types of analysis of and searching through textual data sets or other types of input data, etc. Additional details related to the MapReduce program are included in "MapReduce: Simplified Data Processing on Large Clusters" by Jeffrey Dean and Sanjay Ghemawat, December 2004, Proceedings of OSDI'04: Sixth Symposium on Operating System Design and Implementation, which is incorporated herein by reference in its entirety, and which is also available at the time of application filing at labs<dot>google<dot>com<slash>papers<slash>mapreduce-osdi04.pdf (where "<dot>" and "<slash>" are replaced with corresponding characters "." and "/").

In addition, in at least some embodiments, the dynamic monitoring of the ongoing distributed execution of a program may include monitoring some or all execution jobs for the program, such as to determine when particular execution jobs begin execution and complete execution. Such monitoring of the execution of execution jobs may provide various benefits, such as to determine when to later initiate execution of other execution jobs (e.g., if the output data generated by a first execution job is at least some of the input data for a second execution job, so as to assist in determining when to execute the second execution job), and/or to determine when all execution jobs of a program have been completed. Furthermore, in at least some embodiments, some or all execution jobs may each have multiple distinct operations (which also may be referred to as "tasks" in some situations) that are to be performed, such as in a sequential and/or parallel manner, and the monitoring or other tracking of the ongoing execution of such execution jobs may further include determining information about the status of the partial performance of some or all such operations, such as to reflect intermediate data that is generated by completed performance of some such operations. Such tracking of the performance of particular operations for an execution job may further provide various benefits, such as to enable the ongoing intermediate execution and data state from the partial execution of the execution job to be tracked and used, as described in greater detail below. The monitoring may include using a system manager module to initiate execution of execution jobs on particular computing nodes, and to subsequently obtain status information from the computing nodes (e.g., by the system manager module pulling status information from the computing nodes, such as by periodically requesting status information from each computing node, and/or by the computing nodes pushing status information to the system manager module, such as periodically or when particular events occur).

When executing an execution job for a program on a computing node, various information related to the execution may be stored in various manners. For example, when the execution is initiated, the input data to be used by the execution job may be locally stored on the computing node (e.g., temporarily on a local hard disk or other local storage device) to facilitate access to that input data during execution, and any software instructions to be executed for the execution job may similarly be locally stored on the computing node, such as if with one or both types of data being retrieved from a distributed storage system for a cluster that is executing the program. As one example, if a distributed program is being executed using an implementation of MapReduce execution methodology, the input data and/or output data used by a computing node may be stored on a local portion of a distributed HDFS storage system on that computing node. After the execution of the execution job of the program is completed, the local storage on the computing node may in some embodiments be erased or otherwise cleared after any output data from the execution is copied back to the distributed storage system and/or to a remote long-term storage location used by the DPE service, such as in preparation for or as part of initiating execution of another execution job on the computing node (e.g., another execution job of a different program for a different user). In other embodiments, the local storage on the computing node may instead be maintained even after the execution of an execution job is completed (e.g., until execution of the program is complete). Furthermore, in at least some embodiments, various intermediate output data and other intermediate results from the partial execution of an execution job on a computing node may be temporarily stored locally on the computing node during the execution, such as to correspond to output data produced by a subset of the operations of the execution job whose performance is completed, and/or to correspond to partial or incomplete output data produced by one or more operations whose performance has been initiated but not completed. In at least some embodiments in which a long-term storage location of the DPE service is used, such intermediate results are not stored on the DPE service's long-term storage location (e.g., to minimize execution delay and network traffic involved in copying such intermediate results to the DPE service's long-term storage location), while in other embodiments some or all such intermediate results may be stored on the DPE service's long-term storage location.

As one example of intermediate results, referring back to the prior simplified example of an execution job that involves searching through multiple Web pages for two terms, each operation of the execution job may correspond to searching through a single Web page for a single term, with the intermediate output data from performance of such an operation being information about any occurrences of that term in that Web page (e.g., a cumulative number of times that the term is located; information about each occurrence of the term in that Web page, such as its location in the Web page; etc.). Alternatively, as another example, a particular execution job may involve searching through a Web log or other transaction record that has numerous entries (e.g., with each line in the Web log representing an entry) for a particular term, and each operation of the execution job may involve searching a particular input data entry for that term, with the intermediate output data from performance of such an operation similarly including information about whether the input data entry includes the term.

By storing the output data from the completed execution of an execution job in the DPE service's long-term storage location, the availability of that output data may be maintained even if one or more particular computing nodes subsequently fail or otherwise become unavailable, such as if those computing nodes are core computing nodes whose failure affects the use of the distributed storage system in which they participate. However, if intermediate results from partial execution of an execution job are not stored on the DPE service's long-term storage location, a termination of the execution of that execution job before completion may result in those intermediate results being lost, such that the execution job would need to later be executed again from the beginning (e.g., to repeat performance of all operations of the execution job, even if some of the operations were previously completed). Accordingly, distributed execution of a program is managed by the DPE service in at least some embodiments in such a manner as to store and use such intermediate results from partial execution of an execution job that is temporarily terminated or otherwise suspended before completion, so that a later resumption of the execution of the execution job may resume at or near the intermediate point of partial execution before termination. For example, if a determination is made to terminate execution of one or more execution jobs of a program on one or more computing nodes before the execution of those execution jobs is complete, a module of the DPE service may initiate the persistent storage of the intermediate results from the partial execution of those execution jobs, such as at a location remote from those computing nodes. When the execution of those execution jobs is later resumed, whether on those same computing nodes or other computing nodes, the persistently stored intermediate results from the prior partial executions may be retrieved and used in the resumed execution in various ways. For example, if multiple operations of a particular terminated execution job had been completed before the termination, the intermediate results from the performance of those operations may be retrieved for the resumed execution, and those completed operations need not be performed again for the resumed execution.

The termination of partially completed execution jobs may be performed for various reasons in various embodiments. For example, in some embodiments a user who has requested execution of a program may request that the execution of some or all execution jobs for the program be suspended, such as for an indicated period of time or until the user later requests a resumption of the program suspension. In other embodiments, the DPE service may initiate the termination of the execution of one or more execution jobs of a program. For example, the execution of an execution job on a first computing node may be terminated and moved to another second computing node, such as if the first computing node is to be shut down for maintenance, is to be used for another execution job or other program (e.g., another execution job or other program with a higher priority), is being over-utilized, is showing signs of possible failure, is over-using one or more types of computing resources, etc. In addition, in a manner similar to that of the indicated user request, the DPE service may determine to suspend all execution of a program for a period of time.

In addition, as previously noted, in at least some embodiments, execution of an execution job that is automatically terminated may be automatically resumed at a later time by the DPE service. For example, in some such cases, the DPE service may continue to try to execute such an execution job until completion of the requested execution, until execution is cancelled or otherwise explicitly terminated by a user, until occurrence of a specified time (e.g., until occurrence of an expiration time, until occurrence of a cumulative execution time, etc), until occurrence of a specified number of executions, indefinitely, etc. In addition, in at least some such embodiments, at least some execution jobs that are automatically terminated may be automatically resumed on behalf of the user at a future time when a sufficient amount of program execution capacity again becomes available to continue the execution. Similarly, if the ongoing distributed execution of a program is stopped due to an insufficient quantity of computing nodes of a cluster being available to perform the distributed execution or otherwise having insufficient computing resources to perform the distributed execution, the DPE service may reschedule the distributed execution for a later time and/or automatically restart the distributed execution at a future time when a sufficient quantity of computing nodes or other sufficient amount of program execution capacity again becomes available to continue the execution.

As previously noted, various information may be locally stored on a computing node during execution of an execution job, and the locally stored information may be stored in various manners. For example, in some embodiments, a distributed file system or other distributed data store may be created on multiple core computing nodes of a cluster used for distributed execution of a program, with a particular core computing node's locally stored data being stored in the local portion of that distributed data store. Furthermore, if the distributed data store for a particular embodiment includes redundant data that allows for recovery of the data locally stored on a particular computing node that fails or otherwise becomes unavailable, then the availability of the output data from the execution of an execution job may be maintained in many situations for that embodiment even without the use of separate long-term storage for the DPE service. In other embodiments, some or all information may be stored in other manners, such as by not using a long-term storage location of the DPE service (e.g., by maintaining locally stored data on computing nodes until all execution for the program is completed) and/or by not using local storage on the computing nodes selected to assist in the distributed execution of a program (e.g., by storing any information that is not loaded in volatile memory on the computing node at a remote location, such as the DPE service's long-term storage location).

In addition, when intermediate results of partial execution on a computing node are persistently stored remotely from the computing node, the intermediate results may be stored in various manners. In some embodiments in which the DPE service uses a long-term storage location, the intermediate results may be stored in the DPE service's long-term storage location along with other completed results of execution jobs that have been completed. Alternatively, in some embodiments, the intermediate results for a particular computing node may be stored together, but in a manner distinct from the intermediate and/or completed results of other computing nodes. For example, in some embodiments, a remote logical storage volume may be created to mirror some or all of a local hard disk or other block data storage device for the computing node that was used to store the intermediate results, including a local portion of a distributed file system or other distributed data store. When the partial execution of the execution job for the computing node is later resumed, such a remote logical storage volume may be attached to the computing node on which the resumed execution is to occur, such as to allow the information in the attached logical storage volume to be copied to a physical block storage device of that computing node for use during the resumed execution, or the attached logical storage volume may instead be used during the resumed execution in lieu of any physical block storage device of that computing node. In some such embodiments in which logical storage volumes are available for use, the logical storage volumes may be created at the time of termination of an execution job on a computing node, while in other embodiments the logical storage volume for an execution job may be created at the beginning of the initial execution of the execution job on a computing node and used throughout the entire execution (e.g., in lieu of any physical block storage device of that computing node), even if the execution of the execution job is terminated and resumed one or more times.

Additional details related to the operation of examples of remote storage services that may be used to persistently store program state information and/or other information, including logical storage volumes, are available in U.S. patent application Ser. No. 12/188,943, filed Aug. 8, 2008 and entitled "Providing Executing Programs With Reliable Access To Non-Local Block Data Storage;" and in U.S. patent application Ser. No. 11/371,304, filed Mar. 8, 2006 and entitled "Distributed Storage System With Web Services Client Interface" and claiming priority benefit of U.S. Provisional Patent Application No. 60/754,726 filed Dec. 29, 2005, each of which is hereby incorporated by reference in its entirety. In addition, additional details related to example embodiments of executing different programs of different priorities at different times and to techniques for suspending and resuming distributed execution of programs are included in U.S. patent application Ser. No. 12/334,022, filed Dec. 12, 2008 and entitled "Managing Use Of Program Execution Capacity," and in U.S. patent application Ser. No. 12/334,004, filed Dec. 12, 2008 and entitled "Saving Program Execution State," each of which is hereby incorporated by reference in its entirety. Furthermore, additional details related to enabling users to configure and modify distributed program execution are included in U.S. patent application Ser. No. 12/415,649, filed Mar. 31, 2009 and entitled "Managing Distributed Execution Of Programs;" in U.S. patent application Ser. No. 12/415,725, filed Mar. 31, 2009 and entitled "Dynamically Modifying A Cluster Of Computing Nodes Used For Distributed Execution Of A Program;" and in U.S. patent application Ser. No. 12/415,773, filed Mar. 31, 2009 and entitled "Dynamically Monitoring And Modifying Distributed Execution Of Programs;" each of which is also hereby incorporated by reference in its entirety.

In addition, as previously discussed, the managing of distributed execution of programs may be performed in various manners in various embodiments. For example, the determination of which computing nodes to use for execution of a program may be made in a variety of ways, including based on any preferences and/or requirements specified in configuration information that accompanies initiation of program execution or otherwise specified for the program and/or associated user (e.g., at a time of registration, etc.). For example, if preferred and/or required resources for execution of a program are identified (e.g., memory and/or storage; CPU type, cycles or other performance metric; network capacity; platform type, etc.), the selection of appropriate computing nodes to use may be based at least in part on whether the computing nodes have sufficient resources available to satisfy those identified resources. In at least some situations, the initiation of the distributed execution of the indicated program on a cluster by the DPE service includes some or all of the following non-exclusive actions: selecting multiple computing nodes to be used as the cluster to perform the distributed execution of the indicated program; identifying one or more of the multiple nodes of the cluster to act as master nodes that control the execution of the program on the other nodes of the cluster; provisioning the multiple computing nodes of the cluster if needed to prepare them to receive software to be executed and input data to be used; obtaining the indicated input data to be used by the distributed execution of the indicated program; separating the obtained input data into multiple subsets that are each to be used on one of the multiple computing nodes of the cluster; separating the indicated program into multiple execution jobs to be executed on the multiple computing nodes of the cluster; for each of the multiple computing nodes, loading on the computing node software and optionally input data to be used for the distributed execution of the indicated program (e.g., software to execute at least one execution job for the computing node and a determined subset of the indicated input data to be used by the computing node); optionally configuring the loaded software on the various computing nodes (e.g., configuring the software loaded on the one or more master computing nodes to be able to use the other computing nodes of the cluster); establishing access controls for the multiple computing nodes of the cluster that enable the multiple computing nodes to inter-communicate as part of the executing of the indicated program; etc. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In some embodiments, fees may be associated with the use of a DPE service, such that the DPE service may perform distributed execution of programs on behalf of a user in exchange for payment of one or more fees by that user. For example, in some embodiments, fees may be charged to a user based on an amount and/or type of distributed program execution capacity allocated for executing one or more programs on behalf of a user, such as based on one or more of the following non-exclusive list: a number of computing nodes in a cluster, a number of processing units, an amount of memory, an amount of storage, an amount of network resources, etc. In some embodiments, fees may be based on other factors, such as various characteristics of the computing resources used to execute programs, such as, for example, based on CPU capabilities or performance, platform type (e.g., 32-bit, 64-bit, etc.), etc. Fees may also be charged on the basis of a variety of use factors in some embodiments, such as a price per use of the service, a price per unit of time that computing services are used, a price per storage used, a price per data transferred in and/or out, etc. In at least some embodiments, a provider of a DPE service may offer one or more of various tiers, types and/or levels of services or functionality for distributed execution of programs on behalf of multiple users, and in some such embodiments, various fees may be associated with the various tiers, types and/or levels of services. Additional details related to various fees associated with a distributed program execution service are included in pending U.S. patent application Ser. No. 11/963,331, filed Dec. 21, 2007 and entitled "Providing Configurable Pricing for Execution of Software Images," which is hereby incorporated by reference in its entirety.

In addition, as previously noted, in at least some embodiments the DPE service provides an API to enable users to programmatically configure the distributed execution of programs and to modify ongoing distributed program execution. The following include non-exclusive examples of functions that may be provided as part of such an API: describe-cluster; run-cluster; terminate-cluster; set-cluster-proxy; upload-mapped-jar; upload-data; start-program; cancel-program; and get-program-status, in which "jar" refers to a file containing the indicated program to be executed. Furthermore, in at least some embodiments users may be enabled to configure a variety of characteristics for their clusters, including, for example, a degree of replication regarding how many copies (if any) to maintain of intermediate data during program execution, memory allocation to be used for particular programs (e.g., for use with a Java virtual machine), a loglevel for which information is tracked during debugging, etc. It will be appreciated that an API may include other functionality and be defined in other manners in other embodiments, and that the various functions of the API may each have appropriate variables or parameters whose values are specified as part of invoking the function.

In addition, in at least some embodiments, the DPE service may provide other types of functionality in at least some situations. For example, a user may initiate the distributed execution of a first program on a cluster of multiple computing nodes, but may maintain the cluster of multiple computing nodes even after the distributed execution of the first program has ended. One reason that the user may maintain the cluster is to execute a distinct second program on the existing cluster after the first program has ended, such as a second program that uses the same or similar configuration (e.g., the same type of program but with a new input data set), or instead a second program that uses generated results or other output data from the execution of the first program as input data for the distributed execution of the second program. As another example, in some embodiments, a user may be allowed to specify input data for use in the distributed execution of a program that is not static, such as if the input data continues to expand or otherwise change while the program is executing— one example is a log file for a Web site or data that indicates ongoing transactions, with the distributed execution of the program analyzing each entry in the log or transaction data, such that the new log/transaction entries are analyzed as they are received (or later if the processing of the log/transaction data has not yet reached those new entries at the time of their receipt), and another example is a program performing transaction processing services for ongoing transactions. Furthermore, in some embodiments a user may specify one or more types of limits regarding the distributed execution of a program (e.g., an amount of execution time; a cost of execution; an amount of usage of one or more types of computing resources, such as memory, storage, disk I/O, network I/O; etc.), with various specified types of actions that the DPE service is to take if a specified limit is reached (e.g., to notify the user, to suspend or terminate execution of the program, to reduce usage of a type of resource corresponding to the limit, etc.).

Furthermore, various other types of functionality may be provided and used by a DPE service in various embodiments, as discussed in greater detail elsewhere.

Figure 3:
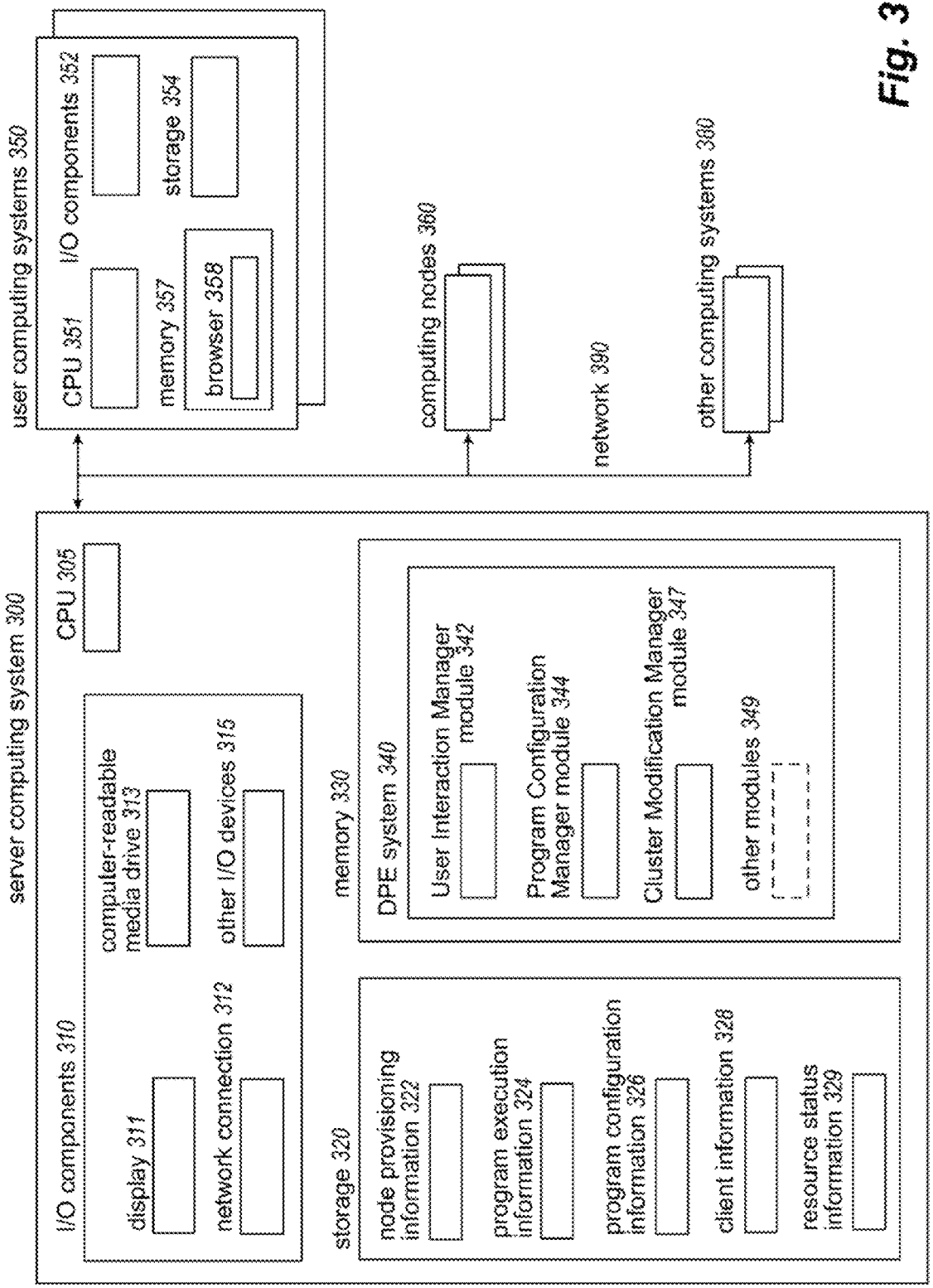
FIG. 3 is a block diagram illustrating an example embodiment of a computing system for managing distributed program execution.

FIG. 3 is a block diagram illustrating an example embodiment of a system suitable for performing techniques to manage distributed execution of programs. In particular, FIG. 3 illustrates a server computing system 300 suitable for executing an embodiment of a Distributed Program Execution system 340, as well as various user computing systems 350, computing nodes 360, and other computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352 (although particular components are not illustrated), storage 354, and memory 357. The other computing systems 380 and computing nodes 360 may also each include similar components to some or all of the components illustrated with respect to server computing system 300, but such components are not illustrated in this example for the sake of brevity. In addition, the computing nodes 360 may be of multiple types in at least some embodiments, including of multiple resource configuration types, and/or may be available from multiple sources, including at least one source of temporarily available computing nodes, as discussed in greater detail elsewhere.

An embodiment of the Distributed Program Execution system 340 is executing in memory 330, such as under control of CPU 305 as programmed with software instructions of the system 340, and it interacts with computing systems 350 and 380 and computing nodes 360 over the network 390 (e.g., via the Internet and/or the World Wide Web, via a private cellular network, etc.). In this example embodiment, the DPE system 340 includes functionality related to managing distributed execution of programs on computing nodes 360 by various users (not shown) who are interacting with user computing systems 350, such as in conjunction with a network-accessible DPE service provided by the DPE system 340. The other computing systems 350 and 380 and computing nodes 360 may be executing various software as part of interactions with the DPE system. For example, user computing systems 350 may each be executing a Web browser 358 or other software in memory 357, such as to interact with a User Interaction Manager module 342 of the DPE system 340 in order to configure and/or request execution of programs on behalf of the users of those systems on one or more computing nodes 360 in various ways, to track and optionally request modifications to ongoing distributed execution of programs, and/or to perform various other types of actions.

Various information related to the operation of the DPE system 340 may be stored in storage 320, such as information 322 related to the computing nodes used to execute particular programs, information 328 about clients of the distributed program execution service, information 324 that includes information about program execution (e.g., final execution results from program execution that has been completed, status information about the intermediate state of partial execution of various programs, etc.), user-specified and other configuration information 326 used to configure distributed execution of programs (e.g., specified execution configuration parameters, defined scaling criteria related to dynamic cluster modification, etc.), and information 329 regarding the status of resource usage by executing programs and indications of detected bottlenecks. As discussed elsewhere, at least some of the illustrated information may be stored in other manners, such as if some or all of the program execution information 324 is stored in a distributed storage system (not shown) provided using various of the computing nodes 360, whether instead of or in addition to storing that information on storage 320. In addition, various intermediate state information and other information may be persistently stored in various manners, as discussed in greater detail elsewhere, including on a distributed storage system provided using various of the computing nodes 360 and/or on storage 320 of server computing system 300. In addition, in some embodiments other storage systems may be used to provide long-term storage of information for some or all clusters, as described elsewhere, including by using local or remote other computing systems 380 and/or other computing nodes/systems or storage nodes/systems (not shown).

After the DPE system 340 receives requests (or other indications) to execute one or more programs on one or more computing nodes 360, along with specified configuration information, the DPE system 340 selects the computing nodes for the cluster that will perform the distributed execution of the one or more programs, determines whether to use the selected computing nodes as core nodes or auxiliary nodes for the cluster, and initiates execution of execution jobs of those programs on at least some of those computing nodes 360 of the cluster. In addition, the DPE system 340 may further interact with computing nodes 360 to temporarily terminate or otherwise suspend execution of execution jobs on the computing nodes and to resume previously terminated execution, such as in response to user instructions. The DPE system 340 may also dynamically monitor or otherwise interact with one or more of the computing nodes 360 to track use of those computing nodes, such as under control of one of the optional other modules 349 of DPE system 340, and may further dynamically modify the ongoing distributed execution of programs on the computing nodes 360, such as to dynamically scale the cluster of computing nodes under control of the Cluster Modification Manager module 347 of DPE system 340. In some embodiments, the modules 347 and 349 may interact in various manners, such as if the module 347 requests or otherwise obtains information from one or more of the modules 349, while in other embodiments one of the modules 349 may store monitored information as part of information 329 and/or 324, and the module 347 may retrieve and use such stored information as desired. Furthermore, in some embodiments the DPE system 340 may optionally include a Program Configuration Manager module 344 that uses information gathered from the monitoring of the distributed execution of various programs to facilitate configuring the distributed execution of other programs, such as by determining preferred execution configuration parameters for particular predetermined types of programs and/or by determining recommended execution configuration parameters for particular indicated programs, although in other embodiments the module 344 may not be provided. If present, the Program Configuration Manager module 344 may further interact with the User Interaction Manager module 342 in some situations, such as to provide determined configuration information to the module 344 for presentation to users, while in other embodiments such determined configuration information may be stored by module 344 as part of configuration information 326, and retrieved and used by module 342 from the stored configured information 326. Additional details related to these operations are included elsewhere.

The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the DPE system 340 may interact with one or more other computing systems 380 to initiate, suspend or resume execution of one or more programs on those computing systems, such as if the computing systems 380 are provided by one or more third-party participants. As described elsewhere, the computing nodes 360 may be of multiple types in at least some embodiments, including of multiple resource configuration types and/or in multiple distinct locations, and may in some embodiments be available from various sources that have differing associated fees for use and/or associated use conditions, including a pool of temporarily available computing nodes.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated DPE system 340 may in some embodiments be distributed in additional modules. Similarly, in some embodiments some of the functionality of the DPE system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
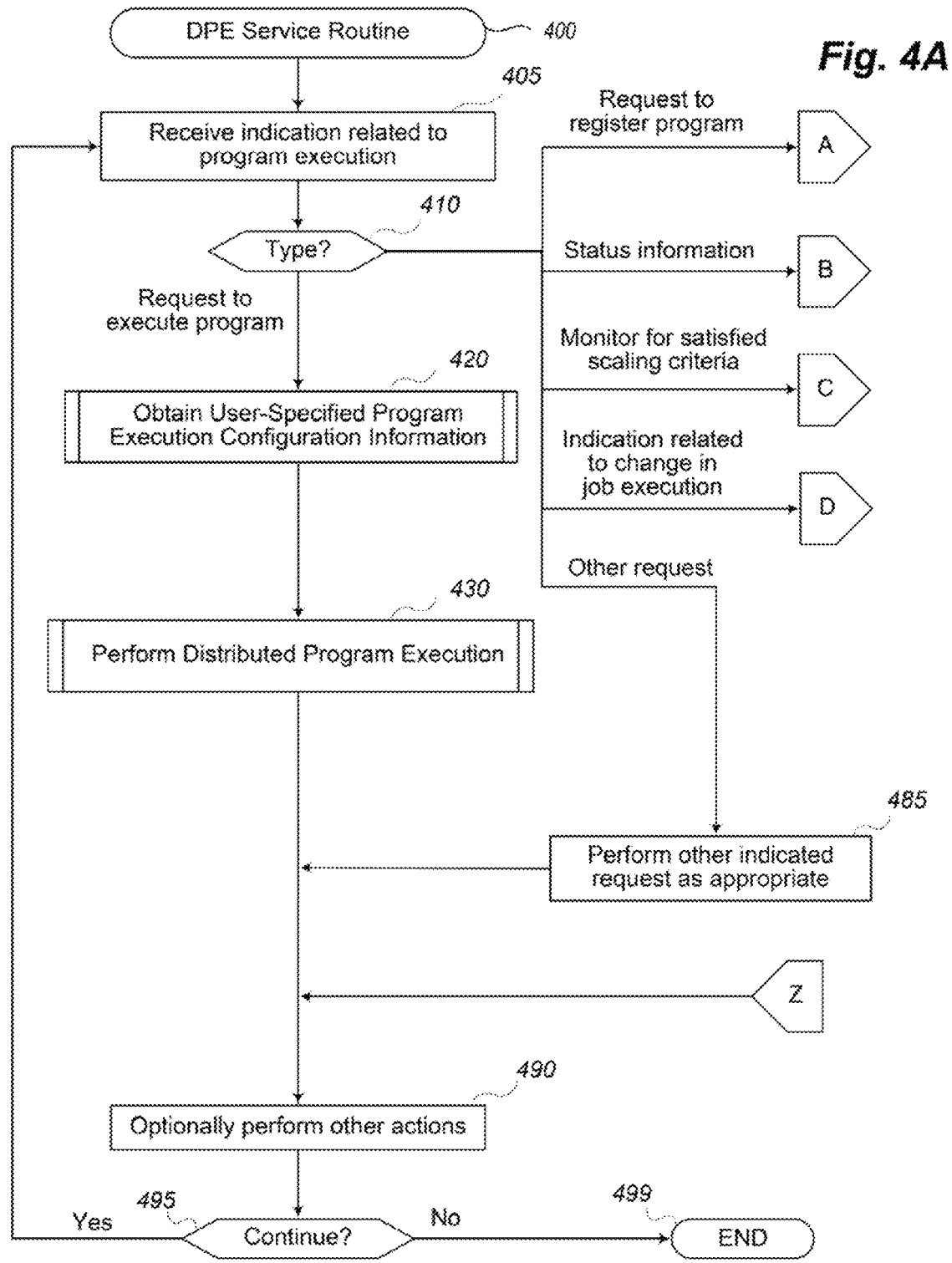
Figure 4C:
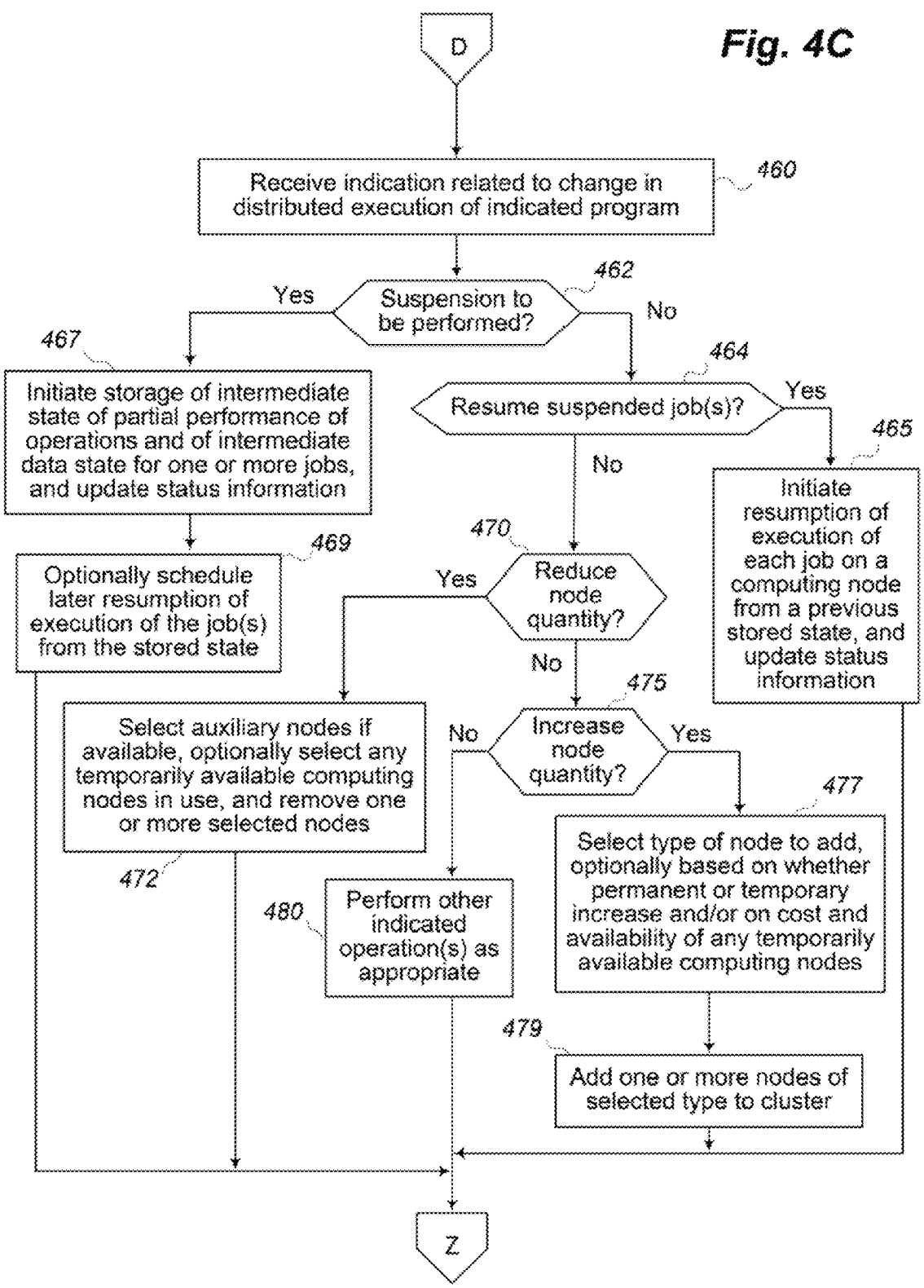

FIGS. 4A-4C are a flow diagram of an example embodiment of a Distributed Program Execution Service routine 400. The routine may be provided by, for example, execution of the DPE service modules 110 and 180 of FIGS. 1A and 1B, respectively, the DPE system 340 of FIG. 3, and/or the DPE service (not shown) that performs the activities described with respect to FIGS. 2A-2E, such as to manage distributed execution of programs and perform dynamic scaling of particular clusters, as well as to perform other types of actions in some situations. In this illustrated embodiment, the routine 400 manages various aspects of use of a DPE service that performs distributed execution of programs on behalf of multiple users.

In the illustrated embodiment, the routine begins at block 405, where information related to distributed program execution is received. The routine continues to block 410 to determine the type of received information. If it is determined in block 410 that a request is received to initiate execution of a program, such as from a user, the routine continues to block 420 to execute an Obtain User-Specified Program Execution Configuration Information routine, with one example of such a routine being described in greater detail with respect to FIG. 5. After the program execution configuration information is obtained in block 420, the routine continues to block 430 to execute a Perform Distributed Program Execution routine, with one example of such a routine being described in greater detail with respect to FIG. 6. While the obtaining of program execution configuration information and performing of distributed program execution in blocks 420 and 430 are illustrated as being performed in a synchronous manner, such that the routine 400 does not perform other operations during those blocks, it will be appreciated that the routine may continue to perform other operations asynchronously and simultaneously with the actions of blocks 420 and 430, including to monitor and modify ongoing program execution with respect to those blocks, as well as to perform other actions with respect to executing other programs for other users, as described elsewhere.

If it was instead determined in block 410 that the information received in block 405 was a request to register a program for later use, such as from a user, the routine instead continues to block 450 to store information about the program, along with associated administrative information (e.g., information about the user who submitted the program; information about execution of the program, such as how to separate the program into multiple execution jobs, a type of the program, etc.; optionally information about input data to be used during later execution of the program; optionally defined scaling criteria for later use in determining whether to dynamically scale a cluster being used for distributed execution of the program, etc.). In some embodiments, such programs may be registered by users before they are used, such as to increase the speed of executing the program when such a program execution request is later received. Furthermore, in some embodiments, such a request to register a program may include a request to schedule later execution of the program, such as at an indicated time or when one or more indicated execution criteria are satisfied (e.g., when sufficient excess computing capacity of the DPE service is available to execute the program at a low priority).

If it is instead determined in block 410 that the information received in block 405 is status information related to execution of one or more execution jobs as part of distributed execution of a program, such as may be supplied by those execution job(s) or associated computing node(s) performing the execution (e.g., after being previously requested by the routine 400 as part of block 430), the routine continues to block 455 to update status information that is maintained by the routine 400 regarding the intermediate state of execution of that execution job and program. As discussed in greater detail elsewhere, the status information may include information about particular operations that have been initiated, completed, or are in progress, information about input data that has been used by the execution, information about output data that has been generated by completion of some or all operations, information about partial intermediate data that reflects ongoing execution of the execution job, etc.

If it is instead determined in block 410 that the information received in block 405 is an indication related to modifying the ongoing distributed execution of one or more programs, such as from a user who initiated that execution and/or as previously specified by the routine 400 with respect to blocks 441 or 490, the routine continues to block 460 to receive information related to the execution modification. In block 462, the routine then determines whether the request relates to a temporary termination or other suspension of one or more currently executing execution jobs. If so, the routine continues to block 467 to, for each of one or more execution jobs to be suspended, obtain information about the current intermediate state of the partial execution of the operations being performed for the execution job by its associated computing node and about the current data state for the execution job on the associated computing node, and initiate the storage of the intermediate state information on one or more storage volumes remote from the computing node that will persistently store the information for later use. As previously discussed, in some embodiments the suspension may include temporarily terminating all execution jobs currently being executed for a program, such as to temporarily suspend execution of the program. In addition, if the computing node includes management software to perform such intermediate state storage actions or if the execution job itself is configured to save its own intermediate state when instructed, the routine 400 may instead send a message to the computing node and/or execution job to initiate such storage and then shut down. Furthermore, previously saved status information about the execution job may in some situations be used to determine what intermediate state information is be stored, and any new information obtained in block 467 (e.g., by communicating with the computing node and/or execution job) may be used to update the status information for that execution job. After block 467, the routine continues to block 469 to optionally schedule a later resumption of the execution of some or all of the execution jobs from the stored intermediate state. For example, in situations in which one or more execution jobs are being moved from a first group or one or more computing nodes to a second group or one or more other computing nodes, the later scheduled resumption of the execution of those execution jobs may occur in a substantially immediate manner, such that a user may be unaware of the termination and resumption of execution or of the movement of the execution job between computing nodes. In addition, the scheduling of the later resumption may include initiating a new request to be received in block 405 at the time of the later resumption that will prompt resumption activities for those execution jobs.

If it was instead determined in block 462 that the request was not to perform suspension of one or more execution jobs, the routine continues to block 464 to determine whether the request is instead related to resuming execution of one or more previously suspended execution jobs. If so, the routine continues to block 465 to initiate the resumption of execution of each of one or more previously suspended execution jobs on a computing node, such as by using previously stored state information about the intermediate results from the previous partial execution of the execution job, or instead schedules a later such resumption of the execution job if so indicated in the information received in block 460.

If it is instead determined in block 464 that the request is not related to resuming execution of previously suspended execution jobs, the routine continues to perform blocks 470-480 related to dynamic scaling of a cluster, such as under control of the Cluster Modification Manager module 347 of FIG. 3. In particular, in block 470, the routine determines if the request is to dynamically scale a cluster by reducing the quantity of computing nodes in the cluster. If so, the routine continues to block 472 to perform the reduction by selecting one or more computing nodes and removing them from the cluster. In this illustrated embodiment, the routine selects to remove auxiliary nodes if they are available and to remove core computing nodes otherwise, but in other embodiments may proceed in other manners (e.g., to not remove core nodes if sufficient auxiliary nodes are not available). In addition, in this illustrated embodiment, the routine selects to remove temporarily available nodes being used in the cluster if they are available, but in other embodiments may proceed in other manners (e.g., to not remove temporarily available nodes if sufficient other nodes are not available). In other embodiments, the request may include additional information related to how to perform the reduction, such as a type of auxiliary or core node to be selected for reduction, a resource configuration type of computing node to be selected for reduction, an indication that computing nodes of a particular source are to be selected or not selected (e.g., an indication to perform the reduction by removing one or more computing nodes that were previously temporarily added to the cluster), an indication of a particular geographical and/or network location of computing nodes that are to be selected, etc., and if so the routine may perform the reduction in accordance with the instructions. In addition, in some embodiments, an intermediate execution state may be saved for some or all nodes being removed (e.g., in a manner similar to that described with respect to block 467), such as to enable later completion of the execution jobs being performed on those removed computing nodes by resuming from the intermediate state on other computing nodes of the cluster, although in other embodiments those execution jobs may instead be later completed by restarting the execution jobs from the beginning on other computing nodes of the cluster.

If it is instead determined in block 470 that the request is not to reduce the quantity of computing nodes in a cluster, the routine continues instead to block 475 to determine if the request is to dynamically scale a cluster by increasing the quantity of computing nodes in the cluster. If so, the routine continues to blocks 477-479 to perform the increase by selecting a type of computing node to add and by adding one or more computing nodes of that type to the cluster. In particular, in the illustrated embodiment, the routine selects in block 477 whether to add core or auxiliary nodes to the cluster, such as based on whether the adding of the nodes is intended to be a permanent or temporary increase, respectively, and/or based on one or more other factors. In addition, in the illustrated embodiment, the routine selects in block 477 whether to add any temporarily available node to the cluster, such as based on their current price and availability and/or on other factors (e.g., based on whether core or auxiliary nodes are being added). In some embodiments, the selection may include other determinations and/or be made in other manners, such as to select a resource configuration type to use for the nodes being added, to otherwise select a particular source of the computing nodes to add based on an associated fee and/or associated use conditions for nodes from that source, to select a particular geographical and/or network location of computing nodes to be added, etc. In some embodiments, the request may include additional information related to how to perform the increase, such as a type of auxiliary or core node to be selected, a resource configuration type of computing node to be selected, an indication of whether the increase is temporary or permanent, an indication of a particular source to use and optionally fee-related factors to use in determining whether to add computing nodes of that source, etc., and if so the routine may perform the increase in accordance with the instructions. In addition, in some embodiments, if one of the added computing nodes begins to perform an execution job that was previously partially completed (e.g., by a computing node removed in block 472), that computing node may obtain and use a previously saved intermediate execution state to enable completion of the execution job by resuming from the intermediate state. If it is instead determined in block 475 that the request is not to dynamically scale a cluster by increasing the quantity of computing nodes in the cluster, the routine continues instead to block 480 to optionally perform one or more other indicated actions related to dynamic scaling of one or more clusters, such as to otherwise initiate the removal of one or more computing nodes from a cluster that were previously temporarily added for an indicated period of time or until other indicated conditions were satisfied.

If it instead determined in block 410 that the type of information received in block 405 is an indication to dynamically monitor one or more clusters (e.g., periodically or when triggered by a particular event), such as to determine whether any defined scaling criteria for the clusters are satisfied, and optionally with respect to the ongoing distributed execution of a particular indicated program or instead with respect to the ongoing distributed execution of some or all programs being executed by the DPE service, the routine continues to block 433. The routine retrieves information in block 433 related to any such defined scaling criteria for the one or more clusters being monitored, and then continues to block 435. In block 435, the routine gathers aggregate information regarding the usage of computing resources by the ongoing distributed execution of one or more programs on the one or more clusters, and optionally retrieves status information regarding that ongoing distributed execution of the one or more programs (e.g., status information previously received and stored with respect to block 455, status information that is dynamically obtained by interacting with some or all computing nodes of each cluster performing the distributed execution of one of the programs, etc.). As discussed elsewhere, the aggregate information regarding the usage of the computing resources may be obtained in various manners, including by interacting with some or all computing nodes of a cluster performing the distributed execution of a program to obtain information specific to those computing nodes, and then aggregating the various node-specific information. After block 435, the routine continues to block 438 to determine if the gathered aggregate computing resource usage information for the one or more programs indicates that any defined scaling criteria are satisfied, and to determine if any other current information indicates that any defined scaling criteria are satisfied, such as current price and availability of temporarily available computing nodes with respect to any defined scaling criteria that correspond to requests to add or remove such computing nodes at indicated price thresholds. In some embodiments, the gathered aggregate computing resource usage information may further be used in other manners, such as to determine if any computing resources of the DPE service are being over-utilized. Such over-utilization of computing resources by the ongoing distributed execution of the one or more programs may, for example, create a bottleneck for at least one of those one or more programs and/or for one or more other programs, and/or may be based on the one or more programs using more computing resources than are allocated to those programs or that are otherwise expected to be used by those one or more programs. After block 438, the routine continues to block 441 to, if any defined scaling criteria are determined to be satisfied (and/or if any over-utilization of computing resources is detected), take corresponding actions. If one or more defined scaling criteria for a particular cluster are determined to be satisfied, the actions in block 441 include initiating a request to perform corresponding dynamic scaling of the cluster, as described in greater details with respect to blocks 470-479, and in FIG. 8 with respect to requests to add or remove temporarily available computing nodes. In some embodiments and situations, such actions may also include, for example, initiating throttling of the use of the computing resources by at least one of the one or more programs, and/or may include modifying the amount of computing resources available to those one or more programs (e.g., to increase an allocation of computing resources available to those one or more programs, such that the current computing resource usage does not exceed the increased allocation), whether on the current computing nodes of one or more clusters or by modifying the computing nodes of the one or more clusters.

If it instead determined in block 410 that the type of information received in block 405 is another type of request, the routine continues instead to block 485 to perform the other indicated request as appropriate. Such other requests may include, for example, administrative operations with respect to users, such as users registering with the DPE service, users checking account information or other information of the DPE service, users tracking ongoing execution of their programs (e.g., by receiving some or all information about the intermediate state or other status of one or more of the execution jobs for the program), users providing payment with respect to currently or previously requested program executions or other provided functionality, etc.

After blocks 430, 441, 450, 455, 465, 469, 472, 475, 479, 480, or 485, the routine continues to block 490 to optionally perform one or more other tasks. Such other tasks may include, for example, one or more of the following: the DPE service automatically initiating the monitoring of the execution of various programs, such as by sending requests for status information to computing nodes (e.g., periodically, when indicated execution criteria are satisfied, etc.) and/or initiating the monitoring described with respect to blocks 433-441; automatically determining to temporarily terminate execution of execution jobs and/or to resume previously terminated execution of execution jobs in various circumstances, such as at scheduled times, to accommodate moving execution jobs between computing nodes, to maintain requested QoS levels for execution of a program (e.g., by maintaining execution of execution jobs within a maximum proximity to each other and/or to input data being used by the execution jobs, by maintaining a minimum proximity of execution to each other to enhance availability and reliability in the event of failure of multiple computing nodes in a single geographical location, etc.), to manage under-utilization and over-utilization of computing nodes (e.g., by modifying clusters and/or computing resources available to clusters), etc. After block 490, the routine continues to block 495 to determine whether to continue, such as until an explicit indication to terminate is received (e.g., from an operator of the DPE service). If it is determined to continue, the routine returns to block 405, and if not continues to block 499 and ends.

Figure 5:
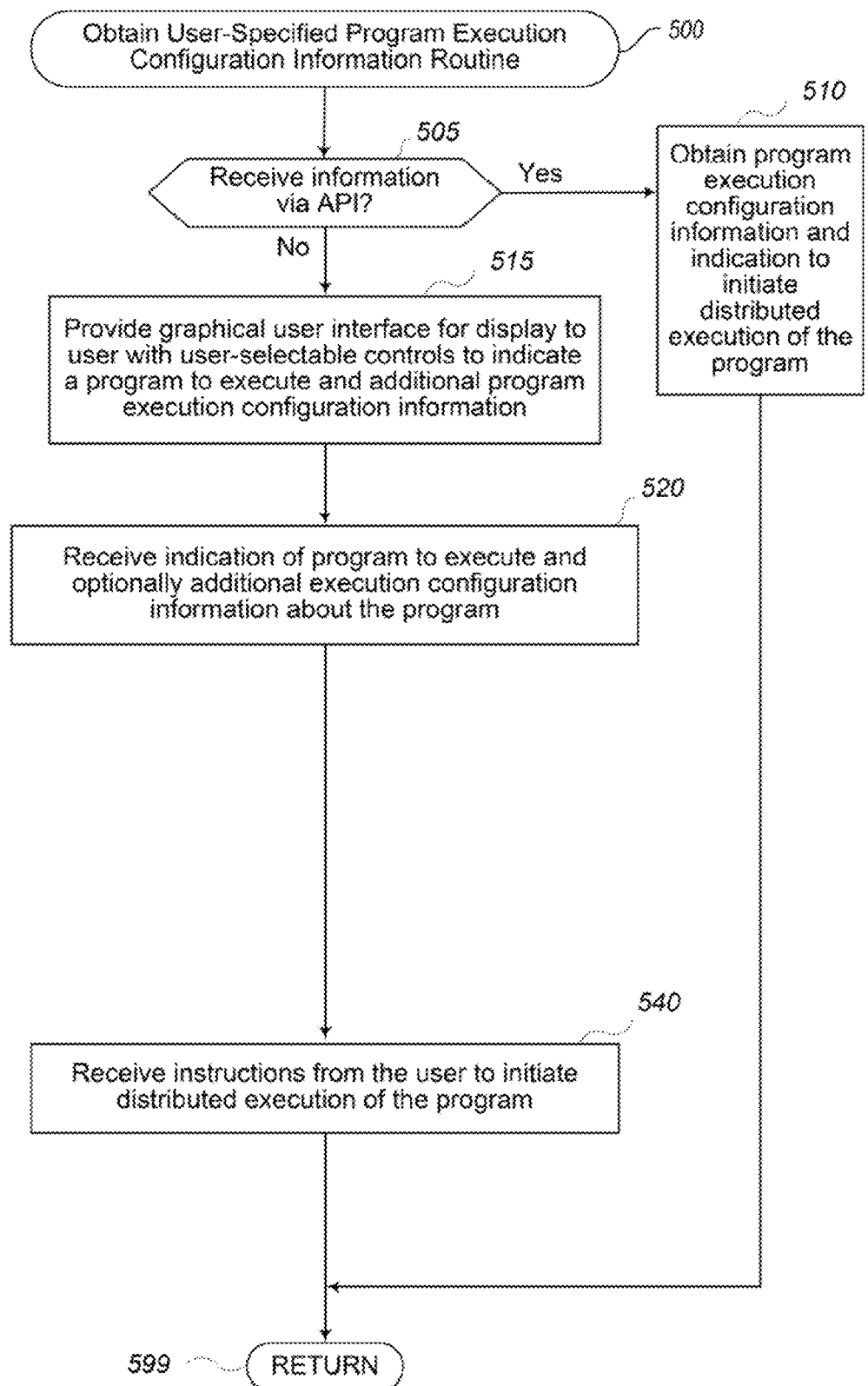
FIG. 5 illustrates a flow diagram of an example embodiment of a routine for obtaining user-specified program execution configuration information.

FIG. 5 is a flow diagram of an example embodiment of an Obtain User-Specified Program Execution Configuration Information routine 500. The routine may be provided by, for example, execution of the User Interaction Manager module 342 of the DPE system 340 of FIG. 3, or otherwise by the DPE service modules 110 and 180 of FIGS. 1A and 1B, respectively, and may be initiated by block 420 of FIG. 4. The routine 500 interacts with users to determine configuration information to be used to execute indicated programs in a distributed manner on multiple computing nodes, including to determine various execution configuration parameters and/or defined scaling criteria related to later dynamic scaling to be performed.

The routine begins in block 505, where an indication is received on behalf of a user regarding configuration information to be specified by the user regarding distributed execution of an indicated program. If it is determined in block 505 that the received indication is received via an API of the DPE service, the routine continues to block 510 to obtain and stored program execution configuration information via one or more API function calls, and to optionally store and aggregate such information over multiple API function calls. After the various program execution configuration information has been obtained, and an instruction is received via the API to initiate distributed execution of the indicated program in accordance with the specified configuration information, the routine in block 510 continues to block 599 and returns, including providing an indication of that specified configuration information and initiation instruction.

If it is instead determined in block 505 that the received indication is not received via an API, such as via a user interaction with a previously provided GUI of the DPE service or instead via a user request to obtain access to such a GUI, the routine continues instead to block 515 to provide (or update as appropriate) a GUI of the DPE service for display to the user, with the initial GUI screen(s) being configured to obtain information about an indicated program to execute and about various program execution configuration information. In block 520, the routine then receives information from one or more interactions of the user with the displayed GUI that indicates the program to be executed and optionally various other user-specified configuration information. While not illustrated here, in some embodiments the routine may further provide information to at least some users about recommended defined scaling criteria for dynamic scaling (e.g., based on a type of the program to be performed, on indicated objectives of the user, etc.) and/or about other recommended execution configuration parameters for distributed execution of the indicated program. As described in greater detail elsewhere, the information about the recommended execution configuration parameters may be used in various manners and times in various embodiments, including for display to the user (e.g., for use as modifiable default values for the execution configuration parameters, for use in providing a warning about other user-specified execution configuration parameters, etc.). In addition, the recommended execution configuration parameters may be determined in various manners in various embodiments, as discussed elsewhere. After the various configuration information has been provided, the routine receives instructions from the user in block 540 to initiate the distributed execution of the indicated program in accordance with the specified configuration information, and continues to block 599 and returns, including providing an indication of that specified configuration information and initiation instruction.

While not illustrated here, it will be appreciated that in some embodiments a user may begin the interactions described with respect to FIG. 5, and then decide to explicitly cancel the interactions or otherwise fail to complete the interactions. In such situations, the routine may exit without providing an indication of the program execution initiation instruction (and optionally without any configuration information specified by the user before the cancellation/completion failure), and the routine 400 in FIG. 4 may instead determine to skip block 430 due to the lack of the program execution initiation instruction.

Figure 6:
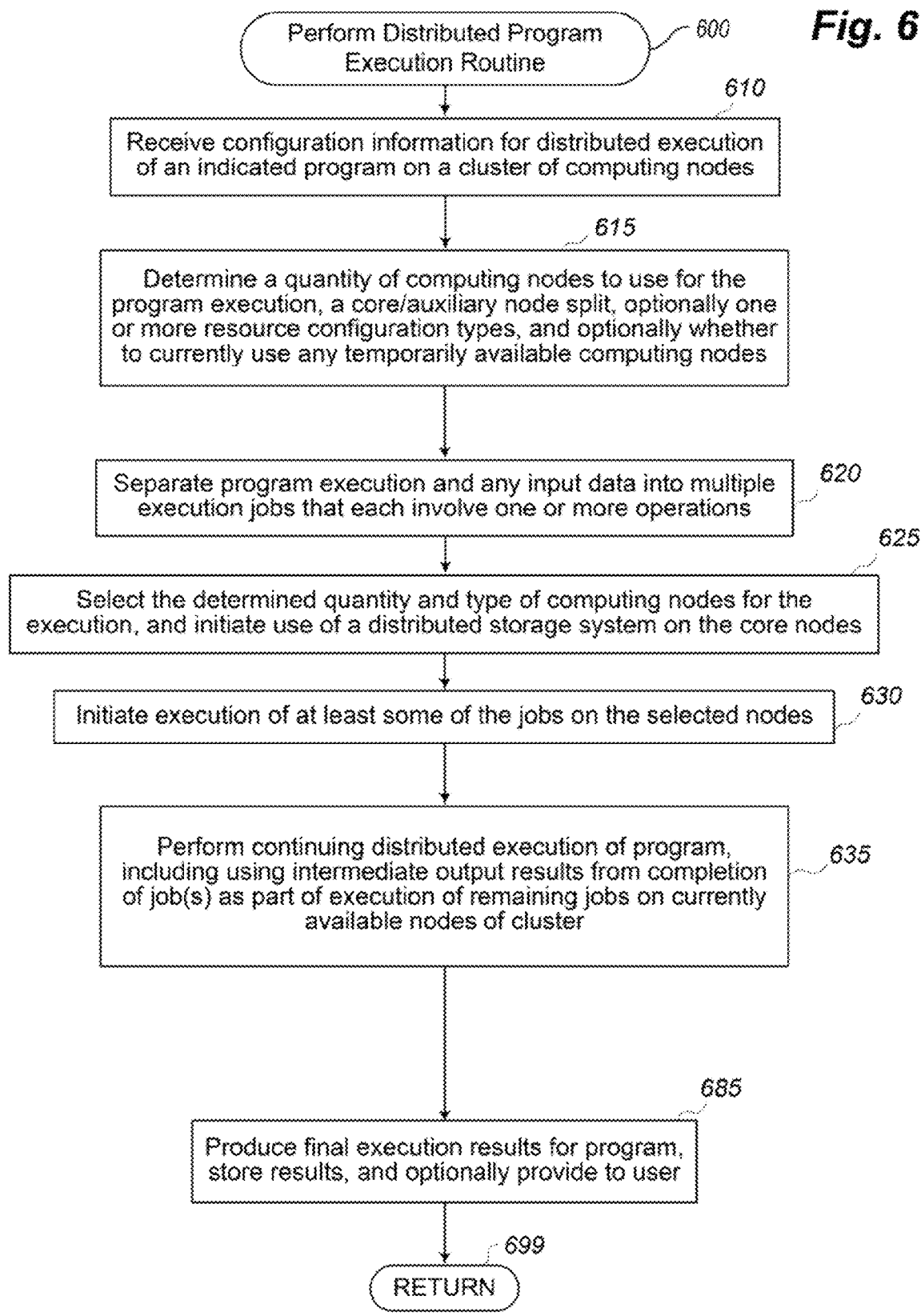
FIG. 6 illustrates a flow diagram of an example embodiment of a routine for performing distributed program execution.

FIG. 6 is a flow diagram of an example embodiment of a Perform Distributed Program Execution routine 600. The routine may be provided by, for example, execution of the DPE service modules 110 and 180 of FIGS. 1A and 1B, respectively, and/or the DPE system 340 of FIG. 3, and may be initiated by block 430 of FIG. 4. The routine 600 performs operations to execute indicated programs in a distributed manner on multiple computing nodes in accordance with specified configuration information.

The routine begins in block 610, where it receives program execution configuration information for use in executing an indicated program, such as from the output of routine 500 of FIG. 5. After block 610, the routine continues to block 615 to determine a quantity of computing nodes to be used in a cluster for the program execution, such as is specified in the received execution configuration information, or otherwise automatically determined (e.g., based on preferred or default configuration information, a number of computing nodes that are currently available from the DPE service, a number of computing nodes to correspond to a number of execution jobs into which the program execution will be separated, an amount of fees paid by a user on whose behalf the request is made, etc.). In addition, the routine in block 615 may determine other information regarding the initiation of the distributed program execution, such as whether some/all of the cluster computing nodes are to be used as core nodes and/or as auxiliary nodes, one or more resource configuration types to use for the initial computing nodes, a particular source of the computing nodes to be used based on an associated fee and/or associated use conditions for nodes from that source (e.g., whether any temporarily available computing nodes are currently available within a specified maximum price threshold, such as whether a bid request for such temporarily available computing nodes is currently satisfied), a particular geographical and/or network location of computing nodes to be used, etc. In block 620, the routine separates the program execution and any received input data into multiple execution jobs that each involves one or more operations to be performed. The actions in blocks 615 and 620 may be performed in various manners in various embodiments, as discussed in greater detail elsewhere. For example, the program execution separation may be performed in a manner specified in the program execution configuration information, in an automated manner based at least in part on the design of the program, etc. After block 620, the routine continues to block 625 to select the determined quantity of computing nodes for use in distributed execution of the program based on the information determined in block 615, and in block 630 initiates the execution of at least some of the execution jobs on the selected nodes. As discussed in greater detail elsewhere, in some embodiments a user may specify a variety of other types of information, such as may be received as part of the configuration information received in block 610 and used as part of the actions in blocks 615-630.

After block 630, the routine continues to block 635 to perform various continuing activities over time as part of performing the distributed execution of the program on the cluster of computing nodes. Such continuing activities may include determining at a later time that there are more execution jobs available to be executed at that time, and initiating execution of one or more of those execution jobs on currently available computing nodes of the cluster (e.g., based on the computing nodes of the cluster after any prior dynamic scaling has been performed, and which are not otherwise currently occupied in the distributed execution of the program), such as if those execution jobs had been waiting for output data from one or more of the completed execution jobs, or instead if there had initially been more execution jobs than available computing nodes. Such continuing activities may also include waiting for execution jobs to complete and to optionally provide corresponding output data, such as may be used as input data to other execution jobs and/or may be used as part or all of the final results for the execution of the program. In some embodiments, the computing nodes may supply such output information back to the routine 400, such as for storage in a long-term storage location of the DPE service, while in other embodiments the output results may instead be stored on the computing nodes (e.g., as part of a distributed storage system on multiple core computing nodes), and/or stored by the computing nodes on one or more long-term storage locations remote from the computing nodes. In addition, the continuing activities may include dynamically scaling the cluster or performing other cluster modifications, such as in response to user instructions or satisfaction of defined scaling criteria, as described in greater detail with respect to blocks 460-480 of FIG. 4C, and in FIG. 8 with respect to any temporarily available computing nodes being used or considered for use. In the illustrated embodiment, blocks 630-655 are illustrated as being performed in a synchronous manner in which the routine 600 waits for execution jobs to complete before performing other actions. It will be appreciated that in other embodiments the routine 600 may operate in other manners, such as in an asynchronous manner to perform other actions with respect to executing the current program and/or to executing other programs for other users. In addition, it will be appreciated that in some situations errors may occur that cause one or more execution jobs to fail to complete, such as due to problems with the computing node on which the execution job is being performed, due to a network connection with the computing node, due to an error in the software corresponding to performing the execution job, due to problems with input data to be used for the performance of the execution job, etc. In such situations, the routine may take various actions to correct the errors (e.g., by transferring the execution job to another computing node), but if an irreversible error occurs, the routine may terminate the further distributed execution of the program or may instead attempt to complete as much of the distributed execution of the program as possible and provide incomplete final results along with an indication that the program executed is completed with errors.

After all of the execution jobs have completed in block 635, the routine continues to block 685 to produce final execution results for the program, and to optionally store those final results and/or provide them to the user. The final execution results may be generated or otherwise produced in various manners in various embodiments, such as by combining output results from multiple execution jobs in various ways, selecting the output results from a single execution job to use, etc. After block 685, the routine continues to block 699 and returns.

Figure 7:
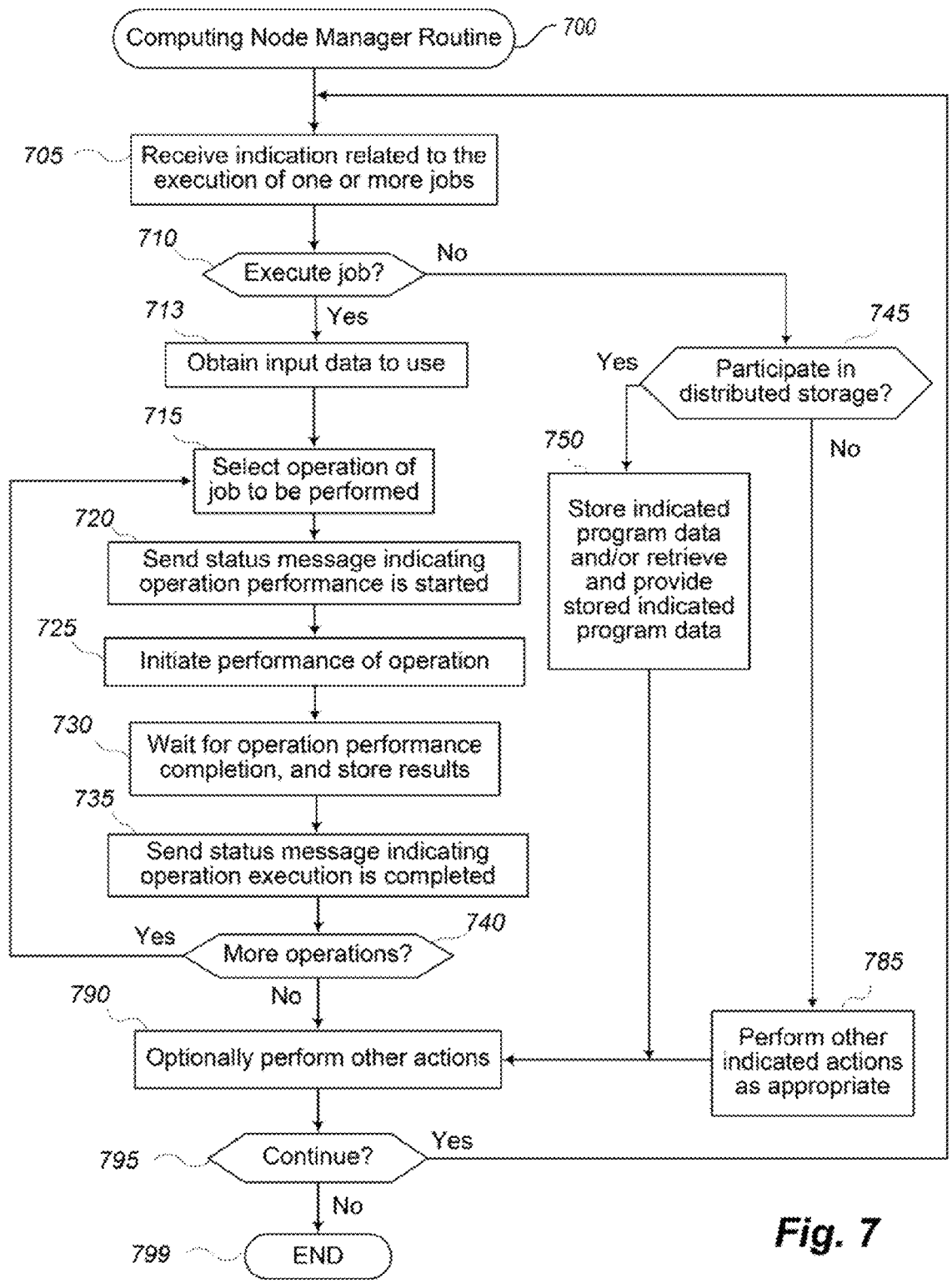
FIG. 7 illustrates a flow diagram of an example embodiment of a Computing Node Manager routine.

FIG. 7 is a flow diagram of an example of a Computing Node Manager routine 700. The routine may be provided by, for example, execution of module 179 of FIG. 1B, or of other management software executing on computing nodes 120 of FIG. 1A, computing systems 182 of FIG. 1B, computing nodes 360 of FIG. 3, etc. In the illustrated embodiment, the management software on a computing node manages some aspects of the execution of execution jobs on the computing node, while in other embodiments some or all of the functionality described with respect to FIG. 7 may instead be performed by the routine 400 of FIGS. 4A-4C, or instead by an execution job that is being executed on the computing node.

In the illustrated embodiment, the routine begins at block 705, where an indication is received related to the execution of one or more execution jobs on the computing node. The routine continues to block 710 to determine whether the indication is to initiate execution of an indicated execution job. If so, the routine continues to block 713 to obtain the input data to be used for the indicated execution job and to store it locally, and to determine the multiple operations to be performed for the execution job (e.g., based on the information received about the execution job in block 705 or that is otherwise retrieved from an external source). The input data to be used may be obtained in various manners, such as by being received in block 705, already being available on local storage (e.g., if the computing node is a core node whose local portion of the distributed storage system stores that input data), being retrieved from another computing node that is a core computing node (e.g., if the current computing node is an auxiliary node or is a core node whose local portion of the distributed storage system does not store that input data), etc. After block 713, the routine continues to block 715 to select the next operation to be performed, beginning with the first. Blocks 715-740 are illustrated in this example embodiment as being performed in a serial manner, such that each operation is individually performed in a synchronous manner before the next operation is initiated, although it will be appreciated that in other embodiments the operations may be performed in other manners, such as to execute some or all of the operations in parallel and/or in an asynchronous manner.

After block 715, the routine continues to block 720 to send a status message to the routine 400 indicating that the execution of the selected operation has begun, and in block 725 initiates the performance of the operation. In block 730, the routine waits for the completion of the performance of the operation, and optionally locally stores any intermediate results produced by the operation performance. In block 735, the routine then sends another status message to the routine 400 indicating that the performance of the operation is completed. In block 740, the routine then determines whether there are more operations to be performed, and if so returns to block 715.

If was instead determined in block 710 that the received indication in block 705 was not to execute an execution job, the routine continues to block 745 to determine whether the received indication in block 705 is to perform one or more activities related to participation in a distributed storage system, although such activities may be performed only for core nodes in at least some embodiments. If so, the routine continues to block 750 to take actions to perform one or more such activities. The actions may include storing indicated data in a local portion of the distributed storage system and/or retrieving and providing such locally stored data to a requester (e.g., to another computing node with respect to block 713 of a routine performed for that other computing node), and may further include taking various activities to establish the participation of the computing node in the distributed storage system when the use of the cluster is first initiated.

If was instead determined in block 745 that the received indication in block 705 was not to participate in the distributed storage system for the cluster, the routine continues instead to block 785 to perform one or more other indicated operations as appropriate. For example, the information received in block 705 may be a request for status information from the routine 400, and if so block 785 may obtain and provide that status information to the routine 400. Alternatively, the information in block 705 may be an indication to terminate execution of the execution job, and the actions performed in block 785 may include corresponding actions (e.g., to clear intermediate state information that was temporarily stored on the computing node, such as after that information has been persistently stored elsewhere). In addition, actions performed with respect to block 785 may include a request from the routine 400 to initiate such persistent storage of intermediate state from partial execution of operations for a currently executing execution job, and if so the actions in block 785 may include performing such actions (whether immediately or instead after a short time to allow completion of performance of one or more operations). Similarly, actions performed with respect to block 785 may include a request from the routine 400 to throttle or otherwise modify computing resource usage by the computing node, and if so the actions in block 785 may include performing such actions. Furthermore, in some embodiments and situations, different execution jobs may coordinate in various manners, such as by exchanging information of interest, and the information in block 705 may be such information from another execution job of the program or a request from such other execution job for information from the current execution job.

After blocks 750 or 785, or if it is instead determined in block 740 that there are no more operations to be performed, the routine continues to block 790 to optionally perform one or more other tasks, such as to coordinate with other execution jobs of the program if appropriate, to take administrative actions as part of executing the execution job, etc. After block 790, the routine continues to block 795 to determine whether to continue, such as until an explicit indication to terminate is received (e.g., from the routine 400 or from a human operator of the DPE service). If it is determined to continue, the routine returns to block 705, and if not continues to block 799 and ends.

Figure 8:
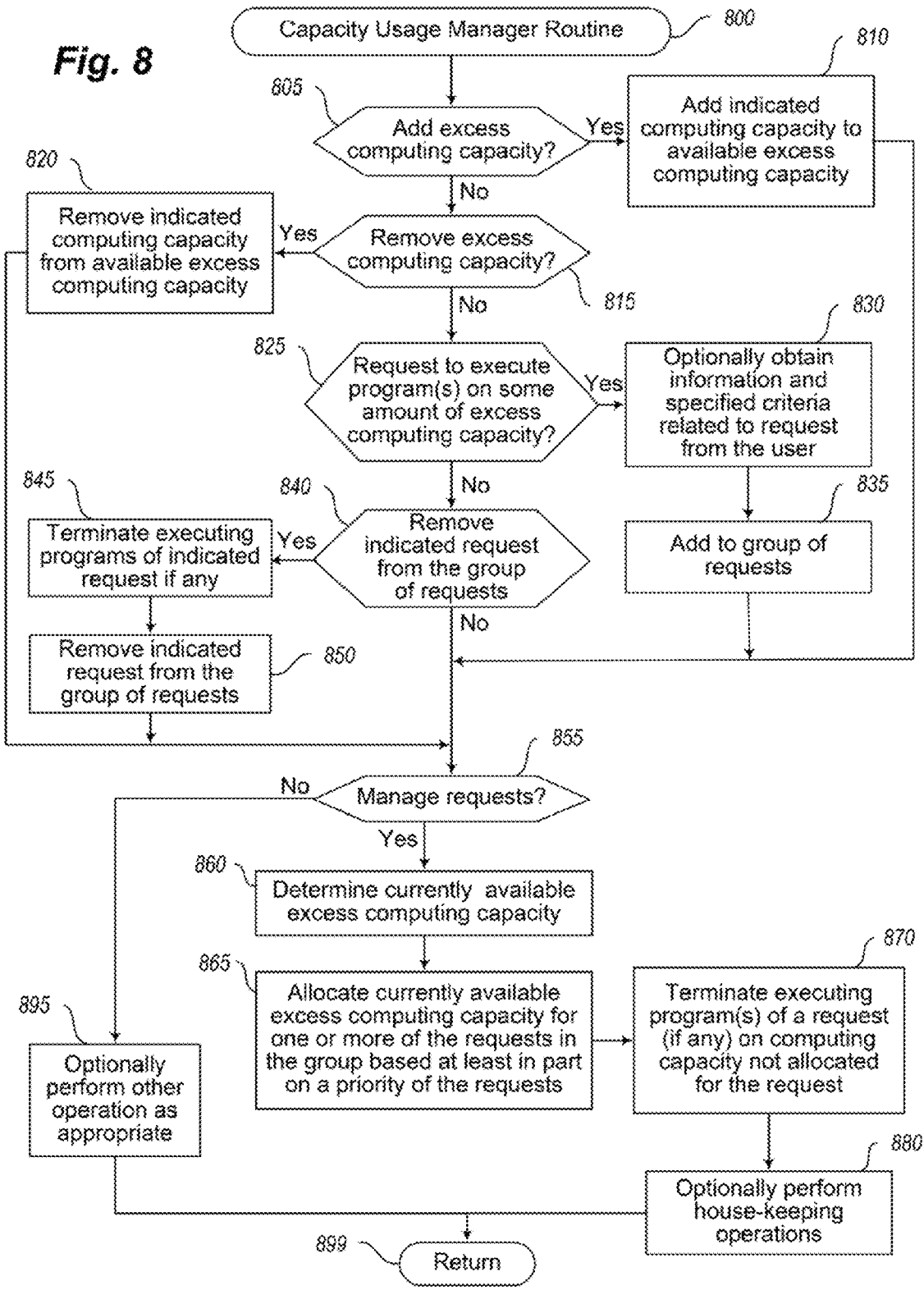
FIG. 8 illustrates a flow diagram of an example embodiment of a Capacity Usage Manager routine.

FIG. 8 is a flow diagram of an example embodiment of a Capacity Usage Manager routine 800. The routine may be provided by, for example, execution of one of the other modules 349 of FIG. 3 and/or by execution of the DPE service modules 110 and 180 of FIGS. 1A and 1B, respectively. In the illustrated embodiment, the routine manages bids and other requests to use temporarily available excess capacity computing nodes, such as may be initiated by client instructions and/or satisfaction of defined scaling criteria for clusters, although in the other embodiments may instead by performed as part of routine 400 of FIGS. 4A-4C. In addition, in the illustrated embodiment the routine 800 is performed periodically (e.g., as initiated by block 490 of routine 400), although in other embodiments may be executed in a continuous manner.

In the illustrated embodiment, upon invocation of the routine 800, a request, information and/or other indication related to excess capacity use is provided to the routine. At block 805, the routine determines whether an indication is received to add one or more computing nodes to available excess program execution capacity, such as based on information obtained with respect to monitoring activities that are performed (e.g., with respect to block 490 of routine 400). If so, the routine continues to block 810 to add the indicated computing node(s) to the available program execution capacity, such as to a corresponding pool of temporarily available computing nodes. In some embodiments, multiple pools may be provided, such that, for example, computing nodes of different resource configuration types may be available as excess capacity nodes and may be grouped into distinct excess capacity pools. If it is instead determined at block 805 that an indication to add available excess program execution capacity is not received, the routine continues to block 815 to determine whether an indication is received to remove one or more computing nodes from the available excess program execution capacity, and if so, the routine continues to block 820 to remove the computing node(s) from the available excess program execution capacity, such that those computing nodes (or an equivalent amount of program execution capacity) is no longer available. As discussed elsewhere, such removal may include removing computing nodes from client clusters and terminating execution of execution jobs on those computing nodes.

If it is instead determined in block 815 that an indication to remove available program execution capacity is not received, the routine continues instead to block 825 to determine whether a request is received to use one or more available excess capacity computing nodes to perform distributed execution of a program as part of a client cluster (or a previously scheduled request for such use has been triggered). If so, the routine continues to block 830 to optionally obtain or receive information related to the requested use, such as indications of an amount and/or type of program execution capacity requested (e.g., including minimum and maximum amounts), a bid amount (e.g., including minimum and maximum bid amounts), an expiration time, etc. In addition, in some embodiments, the routine may provide feedback of one or more types, such as indicating likely characteristics of the requested use (e.g., a likely time that the request will be satisfied, a likely duration of available use, etc.) and/or optional other information (e.g., suggested configurations). After block 830, the routine continues to block 835 to add the request to a group of current requests for execution on excess program execution capacity. In other embodiments, rather than add the request to a group of other requests, the routine may instead attempt to immediately satisfy the request, such as by determining whether there is available excess program execution capacity to satisfy the request at that immediate time, and initiating the use if so, or failing if not.

If it is instead determined at block 825 that a request to use available excess program execution capacity is not received, the routine continues to block 840 to determine whether a request to remove an indicated previous request is received (e.g., a indicated request that was previously added to the group of requests at block 835), such as a request from a client to cancel a current request for execution and/or a received indication that the request has otherwise expired, etc. If so, the routine continues to block 845 to terminate any current use associated with the indicated request, and then continues to block 850 to remove the indicated request from the group of requests, such that the indicated request will not subsequently be considered for satisfaction on excess program execution capacity.

After blocks 810, 820, 835 and 850, or if it was instead determined at block 840 that a request to remove an indicated request is not received, the routine continues to block 855 to determine whether to manage current requests for excess program execution capacity. For example, in some embodiments, an indication may have been passed into the routine 800 to manage the requests and/or may have been provided based upon a change in the available program execution capacity (e.g., by adding to or removing from the available program execution capacity in blocks 810 and 820, respectively), and/or a change in the current request for execution (e.g., by adding or removing requests in blocks 835 and 850, respectively), etc. If so, the routine continues to block 860 to determine an amount of currently available excess program execution capacity, such as including an amount of program execution capacity added and/or removed from the available program execution capacity at blocks 810 and 820, respectively. After block 860, the routine continues to block 865 to allocate currently available excess capacity computing nodes for use with one or more of the requests in the group based at least in part on priorities associated with the requests, such as to make the allocated excess capacity computing nodes available for use as part of the indicated cluster. For example, in some embodiments, the routine attempts to allocate to each request in the group a specified quantity of requested excess capacity computing nodes. In some such embodiments, if there is sufficient currently available excess program execution capacity to satisfy all the current requests in the group of requests, then each of the requests will be allocated a requested amount of the excess program execution capacity. In cases where there is not sufficient currently available excess program execution capacity to satisfy all the current requests, the routine prioritizes the requests and attempts to satisfy higher priority requests before lower priority requests. In various embodiments, priority may be based on one or more of a bid amount, a time at which the request was received, etc. In various embodiments, the routine may determine which of the currently available excess program execution capacity to allocate for use by the requests in various ways, such as described elsewhere.

After block 865, the routine continues to block 870 to terminate any previously initiated ongoing use associated with a request that was not allocated for further current use by the request in block 865, such as to reflect that the request has expired or was not sufficiently high priority to result in current ongoing satisfaction. After block 870, the routine continues to block 880 to optionally perform housekeeping operations. For example, in some embodiments, the routine may detect and indicate if there are any requests for execution in the group of requests that are expired or otherwise should be removed.

If it is instead determined at block 855 not to manage current requests for execution on excess program execution capacity, the routine continues to block 895 to optionally perform one or more other indicated operations as appropriate. After blocks 880 and 895, the routine continues to block 899 and returns.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
    initiating, by a configured computing system of a program execution service, distributed execution of an indicated program on a cluster of multiple computing nodes, wherein a first subset of the multiple computing nodes is used for a first type of processing for the cluster, and wherein a second subset of the multiple computing nodes is used for a distinct second type of processing for the cluster that includes providing distributed storage for data used during the execution of the indicated program on the cluster;
    determining, by the configured computing system and while execution of the indicated program is ongoing, to modify the multiple computing nodes in the cluster, including selecting to modify a quantity of computing nodes of the second subset to provide a change in an amount of the distributed storage; and
    initiating, by the configured computing system and based on the determining, a change in the quantity of the computing nodes of the second subset while the execution of the indicated program is ongoing to provide the change in the amount of the distributed storage, by adding one or more additional computing nodes to the second subset to increase the amount of the distributed storage.

2. The computer-implemented method of claim 1 wherein the first type of processing for the first subset of computing nodes includes performing computing operations for the execution of the indicated program by the cluster without providing the distributed storage.

3. The computer-implemented method of claim 2 wherein the initiating of the change in the quantity of the computing nodes further includes removing, by the configured computing system, one or more computing nodes from the first subset to reduce an amount of computing capabilities of the cluster.

4. The computer-implemented method of claim 2 wherein the initiating of the change in the quantity of the computing nodes further includes adding, by the configured computing system, one or more additional computing nodes to the first subset to increase an amount of computing capabilities of the cluster.

5. The computer-implemented method of claim 1 wherein the first type of processing for the first subset of computing nodes includes performing computing operations as part of the execution of the indicated program by the cluster without providing the distributed storage, and wherein the change in the quantity of the computing nodes of the second subset is performed without changing the computing nodes of the first subset.

6. The computer-implemented method of claim 5 wherein the second type of processing for the second subset of computing nodes further includes performing computing operations as part of the execution of the indicated program by the cluster while also providing the distributed storage.

7. The computer-implemented method of claim 1 further comprising, before the initiating of the execution of the indicated program, receiving configuration information from a client of the program execution service regarding the execution of the indicated program, and wherein the execution of the indicated program is performed on behalf of the client based on the received configuration information and includes executing a plurality of jobs of the indicated program on at least some of the multiple computing nodes of the cluster.

8. The computer-implemented method of claim 1 wherein the multiple computing nodes of the cluster are selected by the program execution service from a plurality of computing nodes provided by the program execution service that are configurable to perform distributed execution of programs for clients.

9. The computer-implemented method of claim 8 wherein the plurality of computing nodes include computing nodes of multiple distinct resource configuration types that each have a distinct configuration of one or more computing resources, and wherein the initiating of the change in the quantity of the computing nodes of the second subset includes selecting one of the multiple distinct resource configuration types and performing one or more modifications to the second subset involving one or more computing nodes of the selected one resource configuration type.

10. The computer-implemented method of claim 1 wherein the selecting to modify the quantity of computing nodes of the second subset includes selecting one of the first and second subsets based at least in part on whether the modifying of the quantity involves removing one or more computing nodes from the cluster or involves adding one or more computing nodes to the cluster, the second subset to be modified while maintaining a quantity of computing nodes of the first subset.

11. The computer-implemented method of claim 1 wherein the selecting to modify the quantity of computing nodes of the second subset includes selecting one of the first and second subsets based at least in part on whether the modifying of the quantity involves modifying storage-related computing capabilities or involves modifying execution-related computing capabilities.

12. The computer-implemented method of claim 1 wherein the determining to modify the multiple computing nodes in the cluster is performed based on an instruction received, while the execution of the indicated program is ongoing, from a client of the program execution service on whose behalf the execution of the indicated program is performed.

13. The computer-implemented method of claim 1 wherein the determining to modify the multiple computing nodes in the cluster is performed based on an automated determination while the execution of the indicated program is ongoing that one or more previously defined scaling criteria are satisfied.

14. The computer-implemented method of claim 13 wherein the one or more previously defined scaling criteria are satisfied based at least in part on a stage of the execution of the indicated program.

15. The computer-implemented method of claim 13 wherein the one or more previously defined scaling criteria are satisfied based at least in part on a monitored state of use of computing resources by the execution of the indicated program.

16. A non-transitory computer-readable medium having stored contents that configure a computing system to perform a method, the method comprising:
    initiating, by the configured computing system, distributed execution of an indicated program on a cluster of multiple computing nodes, wherein a first subset of the multiple computing nodes is used for a first type of processing for the cluster, and wherein a second subset of the multiple computing nodes is used for a distinct second type of processing for the cluster that includes providing distributed storage for data used during the execution of the indicated program on the cluster;
    determining, by the configured computing system and while execution of the indicated program is ongoing, to modify the multiple computing nodes in the cluster, including selecting to modify a quantity of computing nodes of the second subset to provide a change in an amount of the distributed storage; and
    initiating, by the configured computing system and based on the determining, a change in the quantity of the computing nodes of the second subset while the execution of the indicated program is ongoing, by adding one or more additional computing nodes to the second subset to increase the amount of the distributed storage.

17. The non-transitory computer-readable medium of claim 16 wherein the first type of processing for the first subset of computing nodes does not include providing the distributed storage, and wherein the stored contents include software instructions that, when executed, further cause the configured computing system to remove one or more computing nodes from the first subset to reduce an amount of computing capabilities of the cluster.

18. A system comprising:
    one or more processors of one or more computing systems; and
    one or more memories including software instructions that, when executed by at least one of the one or more processors, cause the at least one processor to:
        initiate distributed execution of an indicated program on a cluster of multiple computing nodes having a first subset that provides a first functionality and a second subset that provides a distinct second functionality involving providing distributed storage for data used during the execution of the indicated program on the cluster;
        determine, while execution of the indicated program is ongoing, to modify the multiple computing nodes in the cluster, including selecting to modify a quantity of computing nodes of the second subset to provide a change in an amount of the distributed storage; and
        initiate, based on the determining, a change in the quantity of the computing nodes of the second subset while the execution of the indicated program is ongoing, by adding one or more additional computing nodes to the second subset to increase the amount of the distributed storage.

19. The system of claim 18 wherein the first subset of computing nodes does not provide the distributed storage, and wherein the software instructions further cause the at least one processor to remove one or more computing nodes from the first subset to reduce an amount of computing capabilities of the cluster.

* * * * *